(12) United States Patent
Xue et al.

(10) Patent No.: US 12,474,787 B2
(45) Date of Patent: Nov. 18, 2025

(54) METHOD FOR CONTROLLING MOVEMENT OF CURSOR ON ELECTRONIC DEVICE, MOBILE DEVICE, AND ELECTRONIC DEVICE

(71) Applicant: Huawei Technologies Co., Ltd., Shenzhen (CN)

(72) Inventors: Qingfeng Xue, Xi'an (CN); Xuejun Xu, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 54 days.

(21) Appl. No.: 18/259,921

(22) PCT Filed: Dec. 10, 2021

(86) PCT No.: PCT/CN2021/137213
§ 371 (c)(1),
(2) Date: Aug. 16, 2024

(87) PCT Pub. No.: WO2022/143112
PCT Pub. Date: Jul. 7, 2022

(65) Prior Publication Data
US 2024/0402836 A1 Dec. 5, 2024

(30) Foreign Application Priority Data
Dec. 31, 2020 (CN) .......................... 202011638769.8

(51) Int. Cl.
*G06F 3/0346* (2013.01)
*G06F 3/04812* (2022.01)

(52) U.S. Cl.
CPC ........ *G06F 3/0346* (2013.01); *G06F 3/04812* (2013.01)

(58) Field of Classification Search
CPC .... G06F 3/0346; G06F 3/04812; G06F 3/038; G06F 3/0487; G08C 17/02
See application file for complete search history.

(56) References Cited

U.S. PATENT DOCUMENTS 11,363,500 B1 * 6/2022 Matsimanis ............ H04W 4/80
11,475,642 B2 * 10/2022 Fan .......................... G06F 17/16
(Continued)

FOREIGN PATENT DOCUMENTS

| CN | 102750811 A | 10/2012 |
| CN | 103634639 A | 3/2014 |

(Continued)

*Primary Examiner* — Ibrahim A Khan
(74) *Attorney, Agent, or Firm* — Conley Rose, P.C.

(57) ABSTRACT

An electronic device, includes one or more processors and a display screen including first, second, third, and fourth edges. The first edge and the second edge are parallel to a first direction, the third edge and the fourth edge are parallel to a second direction perpendicular to the first direction, and a cursor moves on the display screen with a mobile device. A computer program, when executed by the one or more processors, enables the electronic device to, when the cursor moves to the third edge and an intersection point between a straight line pointed to by the mobile device, when a plane on which the display screen is located is not between a straight line on which the third edge lies and a straight line on which the fourth edge lies, control the cursor to no longer move in the first direction with the mobile device.

20 Claims, 19 Drawing Sheets

(56) References Cited

U.S. PATENT DOCUMENTS

| | | | |
|---|---|---|---|
| 11,662,832 B1* | 5/2023 | Marks | H04W 4/80 345/156 |
| 2011/0069007 A1* | 3/2011 | Baxter | G06F 3/0383 345/158 |
| 2011/0267265 A1* | 11/2011 | Stinson | G06F 3/017 345/157 |
| 2015/0054740 A1* | 2/2015 | Berestov | G06F 3/017 345/157 |
| 2015/0109209 A1 | 4/2015 | Fu et al. | |
| 2016/0255393 A1 | 9/2016 | Yu et al. | |
| 2016/0313805 A1* | 10/2016 | Vroom | G06F 3/038 |
| 2016/0334884 A1 | 11/2016 | Solomon et al. | |
| 2016/0370871 A1* | 12/2016 | Booms | G06F 3/0346 |
| 2018/0322774 A1* | 11/2018 | Wang | G08C 17/02 |
| 2019/0220107 A1 | 7/2019 | Odgers et al. | |
| 2020/0269338 A1 | 8/2020 | Cross | |
| 2021/0349177 A1* | 11/2021 | Colafrancesco | G01S 5/08 |
| 2022/0116542 A1* | 4/2022 | Kim | H01Q 21/28 |
| 2022/0264172 A1* | 8/2022 | Matsimanis | H04W 4/021 |
| 2022/0308683 A1* | 9/2022 | Li | G06F 3/016 |
| 2023/0079351 A1* | 3/2023 | Kang | G08C 17/02 340/12.5 |
| 2023/0184878 A1* | 6/2023 | Kim | H04W 4/023 342/450 |

FOREIGN PATENT DOCUMENTS

| | | |
|---|---|---|
| CN | 104519387 A | 4/2015 |
| CN | 109410548 A | 3/2019 |
| CN | 209590639 U | 11/2019 |
| KR | 20110044040 A | 4/2011 |
| KR | 20120056698 A | 6/2012 |
| WO | 2014009933 A1 | 1/2014 |

* cited by examiner

METHOD FOR CONTROLLING MOVEMENT OF CURSOR ON ELECTRONIC DEVICE, MOBILE DEVICE, AND ELECTRONIC DEVICE

This is a National Stage of International Patent Application No. PCT/CN2021/137213 filed on Dec. 10, 2021, which claims priority to Chinese Patent Application No. 202011638769.8 filed on Dec. 31, 2020, which are hereby incorporated by reference in their entireties.

TECHNICAL FIELD

This disclosure relates to the communications field, and more specifically, to a method for controlling movement of a cursor on an electronic device, a mobile device, and an electronic device.

BACKGROUND

Electronic devices (such as smart televisions and personal computers) having large display screens are increasingly used, and common remote controls cannot meet use requirements. Therefore, mobile devices (such as an air mouse) that can implement a function of controlling and selecting a menu on a display screen of an electronic device emerge. When the mobile device is used, a cursor of a mouse appears on the display screen of the electronic device, and a user may move (or rotate) the mobile device to control movement of the cursor on the display screen, to select the menu on the display screen.

Currently, after a user implements calibration by aligning a mobile device with a center of a display screen of an electronic device, a position of the mobile device corresponds to a position of a cursor on the display screen, the mobile device faces the center of the display screen, and the cursor is in the center of the display screen. When the user rotates the mobile device, the position, on the display screen, of the cursor on the display screen also moves accordingly. After the cursor moves to an edge of the display screen, if the user continues to rotate the mobile device in a same direction, the cursor on the display screen does not move at the edge of the display screen. After the mobile device continues to be rotated by a specific angle, the mobile device is rotated in a reverse direction, to cause the cursor to be in the center of the display screen. In this case, the mobile device and the cursor on the display screen do not correspond to each other (in other words, the mobile device and the cursor are out of focus). The cursor is in the center of the display screen, but the mobile device is not aligned with the center of the display screen. In this case, the mobile device needs to be re-calibrated by using a calibration key on the mobile device. Consequently, user experience is poor.

SUMMARY

To resolve the foregoing technical problem, this application provides a method and system for controlling movement of a cursor on an electronic device, a mobile device, and an electronic device, to determine an angle range, where the angle range is a largest angle range in which the mobile device (for example, an air mouse) controls movement of a cursor on a display screen of the electronic device. When an actual angle between the mobile device and the display screen is within the angle range, the mobile device can control the movement of the cursor on the electronic device. When the actual angle between the mobile device and the display screen is beyond the angle range, the mobile device cannot control the movement of the cursor on the electronic device. This resolves a problem of out-of-focus between the mobile device and the cursor on the display screen, and a user does not need to perform re-calibration by repeatedly using a calibration key on the mobile device, to improve user experience.

According to a first aspect, an electronic device is provided. The electronic device includes a processor; a memory; a display screen, where the display screen includes a first edge, a second edge, a third edge, and a fourth edge, the first edge is parallel to the second edge, the third edge is parallel to the fourth edge, the first edge and the second edge are parallel to a first direction, the third edge and the fourth edge are parallel to a second direction, the first direction is perpendicular to the second direction, the display screen displays a cursor, and the cursor moves on the display screen with a mobile device; at least two ultra-wide band (UWB) base stations, where the at least two UWB base stations are distributed at different positions at front or back of the display screen, and all or a part of a perpendicular projection that is of each of the at least two ultra-wide band (UWB) base stations and that is on the display screen is located on the display screen; and a computer program, where the computer program is stored on the memory. When the computer program is executed by the processor, the electronic device is enabled to perform the following steps: receiving a cursor indication message of the mobile device, where the cursor indication message indicates a movement direction of the cursor on the display screen, and when the cursor moves to the third edge or the fourth edge, and an intersection point between a straight line in a direction to which the mobile device points and a plane on which the display screen is located is not between a straight line on which the third edge lies and a straight line on which the fourth edge lies, the cursor no longer moves in the first direction with the mobile device. The electronic device provided in the first aspect resolves a problem of out-of-focus between the mobile device and the cursor on the display screen, and a user does not need to perform re-calibration by repeatedly using a calibration key on the mobile device, to improve user experience. The third edge is used as an example to describe the straight line on which the third edge lies. When the third edge is a straight line, the straight line on which the third edge lies includes the third edge and an extension line of the third edge. When the third edge is a curve, the straight line on which the third edge lies includes the third edge and an extension line of an equivalent straight line of the third edge. The equivalent straight line is a straight line drawn by using average values of all points on the curve, namely, the third edge. The following concepts of the straight line on which the fourth edge lies, a straight line on which the first edge lies, and a straight line on which the second edge lies are the same as the foregoing concept of the straight line on which the third edge lies. Details are not described below again. The description "is not between a straight line on which the third edge lies and a straight line on which the fourth edge lies" includes neither a case of being on the straight line on which the third edge lies nor a case of being on the straight line on which the fourth edge lies. Correspondingly, a description "is not between the straight line on which the first edge lies and the straight line on which the second edge lies" is similar. Details are not described again.

For example, a shape of the display screen of the electronic device is a rectangle. The first direction is a horizontal direction of the display screen, and the second direction is a vertical direction of the display screen. The first edge is an upper edge (or an upper boundary) of the display screen, the second edge is a lower edge (or a lower boundary) of the display screen, the third edge is a left edge (or a left boundary) of the display screen, and the fourth edge is a right edge (or a right boundary) of the display screen.

For example, the electronic device may be a smart television, a projection device, a computer, various portable notebook computers, various tablet computers, and another electronic device having a display screen.

According to the first aspect, the electronic device further performs the following step: when the mobile device moves from outside of the third edge or the fourth edge to inside of the third edge or the fourth edge, and the intersection point between the straight line in the direction to which the mobile device points and the plane on which the display screen is located is between the straight line on which the third edge lies and the straight line on which the fourth edge lies, the cursor moves in the first direction with the mobile device. The description "is between the straight line on which the third edge lies and the straight line on which the fourth edge lies" includes the case of being on the straight line on which the third edge lies and the case of being on the straight line on which the fourth edge lies. Correspondingly, a description "is between the straight line on which the first edge lies and the straight line on which the second edge lies" is similar. Details are not described again.

According to the first aspect or the foregoing implementations of the first aspect, when the cursor moves to the first edge or the second edge, and the intersection point between the straight line in the direction to which the mobile device points and the plane on which the display screen is located is not between the straight line on which the first edge lies and the straight line on which the second edge lies, the cursor no longer moves in the second direction with the mobile device.

According to any one of the first aspect or the foregoing implementations of the first aspect, when the mobile device moves from outside of the first edge or the second edge to inside of the first edge or the second edge, and the intersection point between the straight line in the direction to which the mobile device points and the plane on which the display screen is located is between the straight line on which the first edge lies and the straight line on which the second edge lies, the cursor moves in the second direction with the mobile device.

According to any one of the first aspect or the foregoing implementations of the first aspect, after the receiving a cursor indication message of the mobile device, the electronic device further performs the following steps: obtaining an included angle, where the included angle is an included angle between the straight line in the direction to which the mobile device points and a perpendicular from the mobile device to the plane on which the display screen is located, the included angle includes a yaw angle and a roll angle, the roll angle represents an included angle that is in the first direction and that is between the straight line in the direction to which the mobile device points and the perpendicular from the mobile device to the plane on which the display screen is located, and the yaw angle represents an included angle that is in the second direction and that is between the straight line in the direction to which the mobile device points and the perpendicular from the mobile device to the plane on which the display screen is located; determining a first included angle and a second included angle, where the first included angle is an included angle between the perpendicular from the mobile device to the plane on which the display screen is located and a connecting line between the mobile device and the third edge, and the second included angle is an included angle between the perpendicular from the mobile device to the plane on which the display screen is located and a connecting line between the mobile device and the fourth edge; and when the roll angle is equal to the first included angle, determining that the cursor moves to the third edge in the first direction.

It should be understood that the first included angle (represented by $\alpha$) and the second included angle (represented by $\rho$) may be understood as a largest angle and a smallest angle at which the mobile device can control the cursor on the display screen in a horizontal direction dimension of the display screen. An included angle range $[\beta,\alpha]$ may be determined based on the first included angle $\alpha$ and the second included angle $\beta$. The included angle range represents an included angle range in which the mobile device can control movement of the cursor on the display screen in the horizontal direction dimension of the display screen. For example, a value of $\alpha$ may be defined as a positive value, and a value of $\beta$ may be defined as a negative value. It should be noted that the values of $\beta$ and a change accordingly each time the mobile device moves. In other words, each state of the mobile device may correspond to different values of R and a.

For example, the perpendicular between the mobile device and the plane on which the display screen is located (or from the mobile device to the plane of the display screen) may be understood as follows: A perpendicular is constructed from any point on the mobile device (for example, any point on a ultra-wideband (UWB) tag on the mobile device or a central point at top of the mobile device) as an endpoint (denoted as a point Q) of a line segment to the plane of the display screen, where an intersection point between the perpendicular and the display screen is the other endpoint (denoted as a point P) of the line segment, and the line segment QP is the perpendicular between the mobile device and the plane of the display screen (or from the mobile device to the plane of the display screen). In other words, the mobile device may be considered as a point, a perpendicular is constructed from the point to the plane of the display screen, and the perpendicular is the perpendicular between the mobile device and the plane of the display screen, where the perpendicular between the mobile device and the plane of the display screen is perpendicular to the display screen.

The straight line in the direction to which the mobile device points may be understood as follows: Any point on the mobile device (for example, any point on the UWB tag on the mobile device or the central point at the top of the mobile device) is used as a start point of the straight line, and a direction of the straight line is the direction to which the mobile device actually points. Generally, a direction that a top surface of the mobile device faces is the direction to which the mobile device actually points. For example, a direction that a top surface of a mobile phone faces is a direction to which the mobile phone points, and a direction that a transmitting part at a head of a remote control faces is a direction to which the remote control points. In addition, the start point of the straight line in the direction to which the mobile device points is the same as a start point (the point Q) of the perpendicular from the mobile device to the plane on which the display screen is located. The mobile device may rotate about the point (the point Q) in the first direction or the second direction. When the mobile device rotates about the point Q leftward or rightward in the first direction, the roll angle between the mobile device and the display screen changes. When the mobile device rotates about the point Q upward or downward in the second direction, the yaw angle between the mobile device and the display screen changes. In other words, the mobile device may be considered as a point, the point (the point Q) is used as the start point of the straight line in the direction to which the mobile device points, and the direction of the straight line (which may alternatively be understood as a ray using the point Q as a start point) is the direction to which the mobile device actually points.

According to any one of the first aspect or the foregoing implementations of the first aspect, the electronic device further performs the following steps: determining a first included angle and a second included angle, where the first included angle is an included angle between the perpendicular from the mobile device to the plane on which the display screen is located and a connecting line between the mobile device and the third edge, and the second included angle is an included angle between the perpendicular from the mobile device to the plane on which the display screen is located and a connecting line between the mobile device and the fourth edge; and when the roll angle is equal to the second included angle, determining that the cursor moves to the fourth edge.

According to any one of the first aspect or the foregoing implementations of the first aspect, the electronic device further performs the following steps: determining a third included angle and a fourth included angle, where the third included angle is an included angle between the perpendicular from the mobile device to the plane on which the display screen is located and a connecting line between the mobile device and the first edge, and the fourth included angle is an included angle between the perpendicular from the mobile device to the plane on which the display screen is located and a connecting line between the mobile device and the second edge; and when the yaw angle is equal to the third included angle, determining that the cursor moves to the first edge.

The third included angle (represented by S) and the fourth included angle (represented by ε) may be understood as a largest angle and a smallest angle at which the mobile device can control the cursor on the display screen in a vertical direction dimension of the display screen. An angle range [ε,δ] may be determined based on the third included angle δ and the fourth included angle F. The included angle range represents an included angle range in which the mobile device can control the movement of the cursor on the display screen in the vertical direction dimension of the display screen. For example, a value of δ may be defined as a positive value, and a value of ε may be defined as a negative value. It should be noted that the values of ε and δ change accordingly each time the mobile device moves. In other words, each state of the mobile device may correspond to different values of ε and δ.

According to any one of the first aspect or the foregoing implementations of the first aspect, the electronic device further performs the following steps: determining whether the roll angle is within the range between the first included angle and the second included angle, and determining whether the yaw angle is within the range between the third included angle and the fourth included angle; and when the roll angle is within the range between the first included angle and the second included angle and the yaw angle is within the range between the third included angle and the fourth included angle, controlling the movement of the cursor on the display screen based on rotation and/or movement of the mobile device; or when the roll angle is beyond the range between the first included angle and the second included angle and the yaw angle is beyond the range between the third included angle and the fourth included angle, controlling the cursor not to rotation of the mobile device. In this implementation, an angle range is determined, where the angle range is a largest angle range in which the mobile device (for example, an air mouse) controls the movement of the cursor on the display screen of the electronic device. When the roll angle of an actual angle between the mobile device and the display screen is within an angle range corresponding to the first direction, the mobile device can control movement of the cursor on the electronic device in the first direction. When the yaw angle of the actual angle between the mobile device and the display screen is within an angle range corresponding to the second direction, the mobile device can control movement of the cursor on the electronic device in the second direction. When the roll angle of the actual angle between the mobile device and the display screen is beyond the angle range corresponding to the first direction, and the yaw angle of the actual angle between the mobile device and the display screen is beyond the angle range corresponding to the first direction, the mobile device cannot control the movement of the cursor on the electronic device. This resolves the problem of out-of-focus between the mobile device and the cursor on the display screen, and the user does not need to perform re-calibration by repeatedly using the calibration key on the mobile device, to improve user experience.

According to any one of the first aspect or the foregoing implementations of the first aspect, after the receiving a cursor indication message of the mobile device, the electronic device further performs the following steps: sending distance measurement messages to the mobile device respectively through the at least two UWB base stations; receiving distance measurement response messages of the mobile device for the distance measurement messages respectively through the at least two UWB base stations; determining, in response to the distance measurement response messages, a distance between each of the at least two UWB base stations and the mobile device, a distance between every two of the at least two UWB base stations, a first included angle, and the second included angle, where the first included angle is an included angle between a perpendicular from the mobile device to the plane on which the display screen is located and a connecting line between the mobile device and the third edge, and the second included angle is an included angle between the perpendicular from the mobile device to the plane on which the display screen is located and a connecting line between the mobile device and the fourth edge; determining a tilt angle, where the tilt angle is an included angle between the straight line in the direction to which the mobile device points and the perpendicular from the mobile device to the plane on which the display screen is located; determining a yaw angle and a roll angle based on the tilt angle, where the roll angle represents an included angle that is in the first direction and that is between the straight line in the direction to which the mobile device points and the perpendicular from the mobile device to the plane on which the display screen is located, and the yaw angle represents an included angle that is in the second direction and that is between the straight line in the direction to which the mobile device points and the perpendicular from the mobile device to the plane on which the display screen is located; and after the roll angle is greater than the first included angle, the cursor no longer moves in the first direction with the mobile device.

For example, a shape of the display screen of the electronic device may be a rectangle. Three UWB base stations (a first UWB base station, a second UWB base station, and a third UWB base station) are disposed at the front or the back of the display screen. All or a part of a perpendicular projection that is of the first UWB base station and that is on the display screen is located at an intersection point between the third edge and the second edge. All or a part of a perpendicular projection that is of the second UWB base station and that is on the display screen is located at an intersection point between the third edge and the first edge. All or a part of a perpendicular projection that is of the third UWB base station and that is on the display screen is located at an intersection point between the second edge and the fourth edge.

In an implementation, the perpendicular projections that are of the first UWB base station and the second UWB base station and that are on the display screen are located at the left edge and the right edge (or the left boundary and the right boundary) of the display screen; and the perpendicular projections that are of the first UWB base station and the third UWB base station and that are on the display screen are located at the lower edge and the upper edge (or the lower boundary and the upper boundary) of the display screen.

For example, the UWB tag separately sends a first distance measurement message to the first UWB base station, the second UWB base station, and the third UWB base station. The first distance measurement message is for determining a distance between the UWB tag and the first UWB base station, a distance between the UWB tag and the second UWB base station, and a distance between the UWB tag and the third UWB base station.

The first UWB base station separately sends a second distance measurement message to the second UWB base station and the third UWB base station, where the second distance measurement message is for determining a distance between the first UWB base station and the second UWB base station and a distance between the first UWB base station and the third UWB base station.

The electronic device determines the first included angle, the second included angle, the third included angle, and the fourth included angle based on the distance between the UWB tag and the first UWB base station, the distance between the UWB tag and the second UWB base station, the distance between the UWB tag and the third UWB base station, the distance between the first UWB base station and the second UWB base station, and the distance between the first UWB base station and the third UWB base station.

It should be understood that a quantity of UWB base stations on the display screen may be greater than or equal to 2. For example, the quantity is 2, 4, or 5, as long as positions of the left and right boundaries and positions of the upper and lower boundaries of the display screen can be determined through the plurality of UWB base stations on the display screen. Because a perpendicular distance between each of the plurality of UWB base stations and the display screen is very short and may be ignored, position coordinates of the plurality of UWB base stations may be approximately equal to position coordinates of the positions of the boundaries of the display screen.

According to any one of the first aspect or the foregoing implementations of the first aspect, the electronic device further performs the following step: after the roll angle is greater than the second included angle and less than the first included angle, the cursor moves in the first direction with the mobile device.

According to any one of the first aspect or the foregoing implementations of the first aspect, the electronic device further performs the following step: after the roll angle is less than the second included angle, the cursor no longer moves in the first direction with the mobile device.

According to any one of the first aspect or the foregoing implementations of the first aspect, the second included angle is a negative value, and the first included angle is a positive value.

According to any one of the first aspect or the foregoing implementations of the first aspect, the electronic device further performs the following steps: determining a third included angle and a fourth included angle in response to the distance measurement response messages, where the third included angle is an included angle between the perpendicular from the mobile device to the plane on which the display screen is located and a connecting line between the mobile device and the first edge, and the fourth included angle is an included angle between the perpendicular from the mobile device to the plane on which the display screen is located and a connecting line between the mobile device and the second edge; and after the yaw angle is greater than the third included angle, the cursor no longer moves in the second direction with the mobile device.

According to any one of the first aspect or the foregoing implementations of the first aspect, the electronic device further performs the following step: after the yaw angle is greater than the fourth included angle and less than the third included angle, the cursor moves in the second direction with the mobile device.

According to any one of the first aspect or the foregoing implementations of the first aspect, the electronic device further performs the following step: after the yaw angle is less than the fourth included angle, the cursor no longer moves in the second direction with the mobile device.

According to any one of the first aspect or the foregoing implementations of the first aspect, the fourth included angle is a negative value, and the third included angle is a positive value.

According to any one of the first aspect or the foregoing implementations of the first aspect, the determining an included angle includes: receiving a current first direction measurement message of the mobile device; and determining the included angle based on the current first direction measurement message.

According to any one of the first aspect or the foregoing implementations of the first aspect, the determining the included angle based on the current first direction measurement message includes: receiving an initial first direction measurement message of the mobile device after the straight line in the direction to which the mobile device points is perpendicular to the display screen of the electronic device; determining an initial included angle based on the initial first direction measurement message; determining a current included angle based on the current first direction measurement message; and determining the included angle based on the current included angle and the initial included angle.

According to any one of the first aspect or the foregoing implementations of the first aspect, the determining the included angle based on the current included angle and the initial included angle includes: subtracting the initial included angle from the current included angle, to obtain the included angle.

According to any one of the first aspect or the foregoing implementations of the first aspect, the electronic device further includes a second direction sensor, where the second direction sensor is located at a position at the front or the back of the display screen, and all or a part of a perpendicular projection that is of the second direction sensor and that is on the display screen is located on the display screen. The determining the included angle based on the current first direction measurement message includes: determining the included angle based on the current first direction measurement message and a current second direction measurement message. The second direction sensor is an inertial measurement unit IMU. In this implementation, because the second direction sensor is further disposed on the display screen of the electronic device, an Euler angle of the display screen does not need to be calibrated. After the mobile device rotates, the mobile device may send the measurement message of a direction sensor on the mobile device to the electronic device, and the processor of the electronic device may determine the actual yaw angle and the actual roll angle between the mobile device and the display screen in combination with the measurement message of the direction sensor on the electronic device, so that accuracy is high.

According to any one of the first aspect or the foregoing implementations of the first aspect, the IMU is a 9-axis IMU, and the 9-axis IMU includes an accelerometer sensor, a gyroscope sensor, and a magnetic sensor. Alternatively, the IMU is a 6-axis IMU, and the 6-axis IMU includes an accelerometer sensor and a gyroscope sensor.

For example, when the mobile device is aligned with (or faces) a center of the display screen, an included angle between the mobile device and each of the left edge, the right edge, the upper edge, and the lower edge of the display screen is 0 degrees, in other words, the mobile device is perpendicular to the display screen.

According to any one of the first aspect or the foregoing implementations of the first aspect, if the actual yaw angle between the mobile device and the display screen is within the angle range [ε,δ] determined based on the third included angle δ and the fourth included angle ε, and the actual roll angle between the mobile device and the display screen is within the angle range [β,α] determined based on the first included angle α and the second included angle β, it is determined that the straight line in the direction to which the mobile device points is within a range of the display screen (to be specific, the straight line in the direction to which the mobile device points is within the range of the display screen in both the vertical direction dimension and the horizontal direction dimension of the display screen). Movement of the cursor in the vertical direction dimension and the horizontal direction dimension of the display screen can be controlled based on the rotation or the movement of the mobile device. In other words, the electronic device controls the movement of the cursor on the display screen based on the rotation of the mobile device.

According to any one of the first aspect or the foregoing implementations of the first aspect, if the actual yaw angle between the mobile device and the display screen is within the angle range [ε,δ] determined based on the third included angle S and the fourth included angle ε, and the actual roll angle between the mobile device and the display screen is beyond the angle range [β,α] determined based on the first included angle α and the second included angle β, in other words, the straight line in the direction to which the mobile device points is within the range of the display screen in the vertical direction dimension of the display screen, and is beyond the range of the display screen in the horizontal direction dimension of the display screen, the mobile device can control the movement of the cursor on the display screen in the vertical direction dimension of the display screen. In the vertical direction dimension of the display screen, the movement of the cursor on the display screen can be controlled based on the rotation or the movement of the mobile device. However, in the horizontal direction dimension of the display screen, the movement of the cursor on the display screen cannot be controlled based on the rotation or the movement of the mobile device. In other words, the electronic device controls the movement of the cursor on the display screen based on rotation of the mobile device in the vertical direction dimension of the display screen, and does not respond to rotation of the mobile device in the horizontal direction dimension of the display screen, so that the movement of the cursor cannot be controlled based on the rotation of the mobile device.

According to any one of the first aspect or the foregoing implementations of the first aspect, if the actual yaw angle between the mobile device and the display screen is beyond the angle range [ε,δ] determined based on the third included angle S and the fourth included angle ε, and the actual roll angle between the mobile device and the display screen is within the angle range [β,α] determined based on the first included angle α and the second included angle β, it is proved that the straight line in the direction to which the mobile device points is beyond the range of the display screen in the vertical direction dimension of the display screen, and is within the range of the display screen in the horizontal direction dimension of the display screen. The mobile device can control the movement on the display screen in the horizontal direction dimension of the display screen. In the horizontal direction dimension of the display screen, the movement of the cursor on the display screen can be controlled based on the rotation or the movement of the mobile device. In the vertical direction dimension of the display screen, the movement of the cursor on the display screen cannot be controlled based on the rotation or the movement of the mobile device. In other words, the electronic device controls the movement of the cursor on the display screen based on the rotation or the movement of the mobile device in the horizontal direction dimension of the display screen, and does not respond to the rotation or the movement of the mobile device in the vertical direction dimension of the display screen, so that the movement of the cursor cannot be controlled based on the rotation or the movement of the mobile device.

According to any one of the first aspect or the foregoing implementations of the first aspect, if the actual yaw angle between the mobile device and the display screen is beyond the angle range [ε,δ] determined based on the third included angle δ and the fourth included angle ε, and the actual roll angle between the mobile device and the display screen is beyond the angle range [β,α] determined based on the first included angle α and the second included angle β, it is determined that the straight line in the direction to which the mobile device points is beyond the range of the display screen (to be specific, the straight line in the direction to which the mobile device points is beyond the range of the display screen in both the vertical direction dimension and the horizontal direction dimension of the display screen). The movement of the cursor in both the vertical direction dimension and the horizontal direction dimension of the display screen cannot be controlled based on the rotation or the movement of the mobile device. In other words, the electronic device responds to the rotation or the movement of the mobile device in neither the vertical direction dimension nor the horizontal direction dimension of the display screen, so that the movement of the cursor cannot be controlled based on the rotation or the movement of the mobile device.

According to a second aspect, a mobile device is provided. The mobile device includes: a processor, a memory, a UWB tag, a first direction sensor, and a computer program, where the computer program is stored in the memory. When the computer program is executed by the processor, the mobile device is enabled to perform the following steps: sending a cursor indication message to an electronic device, where the cursor indication message indicates a movement direction of a cursor on a display screen of the electronic device; receiving, through the UWB tag, distance measurement messages respectively sent by at least two UWB base stations; sending distance measurement response messages respectively to the at least two UWB base stations through the UWB tag in response to the distance measurement messages; and after the mobile device is powered on, sending a current first direction measurement message to the electronic device through the first direction sensor, where the current first direction measurement message is a message that is output by the first direction sensor.

In this way, a distance between the UWB tag and each UWB base station on the display screen of the electronic device may be determined, to determine a yaw angle and a roll angle. The yaw angle represents an angle at which the mobile device tilts relative to a left boundary or a right boundary of the display screen, and the roll angle represents an angle at which the mobile device tilts relative to an upper boundary or a lower boundary of the display screen. Then, it is further determined whether the roll angle is within a range between a first included angle and a second included angle, and whether the yaw angle is within a range between a third included angle and a fourth included angle. If the roll angle is beyond the range between the first included angle and the second included angle, and the yaw angle is beyond the range between the third included angle and the fourth included angle, the mobile device cannot control movement of the cursor on the electronic device. This resolves a problem of out-of-focus between the mobile device and the cursor on the display screen.

According to the second aspect, in a possible implementation of the second aspect, the first direction sensor is an inertial measurement unit IMU.

According to the second aspect or the foregoing implementation of the second aspect, the IMU is a 9-axis IMU, and the 9-axis IMU includes an accelerometer sensor, a gyroscope sensor, and a magnetic sensor. Alternatively, the IMU is a 6-axis IMU, and the 6-axis IMU includes an accelerometer sensor and a gyroscope sensor.

According to a third aspect, a method for controlling movement of a cursor on an electronic device is provided. The method is applied to an electronic device. The electronic device includes a display screen and at least two UWB base stations. The display screen includes a first edge, a second edge, a third edge, and a fourth edge, the first edge is parallel to the second edge, the third edge is parallel to the fourth edge, the first edge and the second edge are parallel to a first direction, the third edge and the fourth edge are parallel to a second direction, the first direction is perpendicular to the second direction, the display screen displays a cursor, and the cursor moves on the display screen with a mobile device. The at least two UWB base stations are distributed at different positions at front or back of the display screen, and all or a part of a perpendicular projection that is of each of the at least two UWBs and that is on the display screen is located on the display screen. The method includes: receiving a cursor indication message of the mobile device, where the cursor indication message indicates a movement direction of the cursor on the display screen, and when the cursor moves to the third edge or the fourth edge, and an intersection point between a straight line in a direction to which the mobile device points and a plane on which the display screen is located is not between a straight line on which the third edge lies and a straight line on which the fourth edge lies, the cursor no longer moves in the first direction with the mobile device. The method provided in the third aspect resolves a problem of out-of-focus between the mobile device and the cursor on the display screen, and a user does not need to perform re-calibration by repeatedly using a calibration key on the mobile device, to improve user experience.

For example, the display screen of the electronic device is a rectangle, the first direction is a horizontal direction of the display screen, and the second direction is a vertical direction of the display screen. In addition, the first edge is an upper edge (or an upper boundary) of the display screen, the second edge is a lower edge (or a lower boundary) of the display screen, the third edge is a left edge (or a left boundary) of the display screen, and the fourth edge is a right edge (or a right boundary) of the display screen.

According to the third aspect, in a possible implementation of the third aspect, the method further includes: when the mobile device moves from outside of the third edge or the fourth edge to inside of the third edge or the fourth edge, and the intersection point between the straight line in the direction to which the mobile device points and the plane on which the display screen is located is between the straight line on which the third edge lies and the straight line on which the fourth edge lies, the cursor moves in the first direction with the mobile device.

According to the third aspect or the foregoing implementation of the third aspect, the method further includes: when the cursor moves to the first edge or the second edge, and the intersection point between the straight line in the direction to which the mobile device points and the plane on which the display screen is located is not between a straight line on which the first edge lies and a straight line on which the second edge lies, the cursor no longer moves in the second direction with the mobile device.

According to any one of the third aspect or the foregoing implementations of the third aspect, the method further includes: when the mobile device moves from outside of the first edge or the second edge to inside of the first edge or the second edge, and the intersection point between the straight line in the direction to which the mobile device points and the plane on which the display screen is located is between the straight line on which the first edge lies and the straight line on which the second edge lies, the cursor moves in the second direction with the mobile device.

According to any one of the third aspect or the foregoing implementations of the third aspect, after the receiving a cursor indication message of the mobile device, the method further includes: obtaining tilt angle, where the tilt angle is an included angle between the straight line in the direction to which the mobile device points and a perpendicular from the mobile device to the plane on which the display screen is located, the tilt angle includes a yaw angle and a roll angle, the roll angle represents an included angle that is in the first direction and that is between the straight line in the direction to which the mobile device points and the perpendicular from the mobile device to the plane on which the display screen is located, and the yaw angle represents an included angle that is in the second direction and that is between the straight line in the direction to which the mobile device points and the perpendicular from the mobile device to the plane on which the display screen is located; determining a first included angle and a second included angle, where the first included angle is an included angle between the perpendicular from the mobile device to the plane on which the display screen is located and a connecting line between the mobile device and the third edge, and the second included angle is an included angle between the perpendicular from the mobile device to the plane on which the display screen is located and a connecting line between the mobile device and the fourth edge; and when the roll angle is equal to the first included angle, determining that the cursor moves to the third edge. It should be understood that the first included angle (represented by α) and the second included angle (represented by β) may be understood as a largest angle and a smallest angle at which the mobile device can control the cursor on the display screen in a horizontal direction dimension of the display screen. An included angle range [β,α] may be determined based on the first included angle α and the second included angle β. The included angle range represents an included angle range in which the mobile device can control movement of the cursor on the display screen in the horizontal direction dimension of the display screen. For example, a value of α may be defined as a positive value, and a value of β may be defined as a negative value.

According to any one of the third aspect or the foregoing implementations of the third aspect, the method further includes: when the roll angle is equal to the second included angle, determining that the cursor moves to the fourth edge.

According to any one of the third aspect or the foregoing implementations of the third aspect, the method further includes: determining a third included angle and a fourth included angle, where the third included angle is an included angle between the perpendicular from the mobile device to the plane on which the display screen is located and a connecting line between the mobile device and the first edge, and the fourth included angle is an included angle between the perpendicular from the mobile device to the plane on which the display screen is located and a connecting line between the mobile device and the second edge; and when the yaw angle is equal to the third included angle, determining that the cursor moves to the first edge.

The third included angle (represented by δ) and the fourth included angle (represented by ε) may be understood as a largest angle and a smallest angle at which the mobile device can control the cursor on the display screen in a vertical direction dimension of the display screen. An angle range [ε,δ] may be determined based on the third included angle δ and the fourth included angle ε. The included angle range represents an included angle range in which the mobile device can control the movement of the cursor on the display screen in the vertical direction dimension of the display screen. For example, a value of δ may be defined as a positive value, and a value of ε may be defined as a negative value.

According to any one of the third aspect or the foregoing implementations of the third aspect, the method further includes: determining whether the roll angle is within the range between the first included angle and the second included angle, and determining whether the yaw angle is within the range between the third included angle and the fourth included angle; and when the roll angle is within the range between the first included angle and the second included angle and the yaw angle is within the range between the third included angle and the fourth included angle, controlling the movement of the cursor on the display screen based on rotation or movement of the mobile device; or when the roll angle is beyond the range between the first included angle and the second included angle and the yaw angle is beyond the range between the third included angle and the fourth included angle, controlling the cursor not to rotation or movement of the mobile device. In this implementation, when an actual angle between the mobile device and the display screen is within the angle range, the mobile device can control the movement of the cursor on the electronic device. When the actual angle between the mobile device and the display screen is beyond the angle range, the mobile device cannot control the movement of the cursor on the electronic device.

In other words, if the straight line in the direction to which the mobile device points is within a range of the display screen, the mobile device can control the movement of the cursor on the display screen. If the straight line in the direction to which the mobile device points is beyond the range of the display screen, the mobile device cannot control the movement of the cursor on the display screen. This resolves the problem of out-of-focus between the mobile device and the cursor on the display screen, and the user does not need to perform re-calibration by repeatedly using the calibration key on the mobile device, to improve user experience.

According to any one of the third aspect or the foregoing implementations of the third aspect, after the receiving a cursor indication message of the mobile device, the method further includes: sending distance measurement messages to the mobile device respectively through the at least two UWB base stations; receiving distance measurement response messages of the mobile device for the distance measurement messages respectively through the at least two UWB base stations; determining, in response to the distance measurement response messages, a distance between each of the at least two UWB base stations and the mobile device, a distance between every two of the at least two UWB base stations, a first included angle, and a second included angle, where the first included angle is an included angle between a perpendicular from the mobile device to the plane on which the display screen is located and a connecting line between the mobile device and the third edge, and the second included angle is an included angle between the perpendicular from the mobile device to the plane on which the display screen is located and a connecting line between the mobile device and the fourth edge; determining a tilt angle, where the tilt angle is an included angle between the straight line in the direction to which the mobile device points and the perpendicular from the mobile device to the plane on which the display screen is located; determining a yaw angle and a roll angle based on the tilt angle, where the roll angle represents an included angle that is in the first direction and that is between the straight line in the direction to which the mobile device points and the perpendicular from the mobile device to the plane on which the display screen is located, and the yaw angle represents an included angle that is in the second direction and that is between the straight line in the direction to which the mobile device points and the perpendicular from the mobile device to the plane on which the display screen is located; and after the roll angle is greater than the first included angle, the cursor no longer moves in the first direction with the mobile device.

For example, the display screen of the electronic device may be a rectangle, and three UWB base stations (a first UWB base station, a second UWB base station, and a third UWB base station) are disposed on the display screen. The first UWB base station and the second UWB base station are respectively located at the left edge and the right edge (or the left boundary and the right boundary) of the display screen, and the first UWB base station and the third UWB base station are respectively located at the lower edge and the upper edge (or the lower boundary and the upper boundary) of the display screen. In other words, the first UWB base station is located at a lower left edge of the display screen, the third UWB base station is located at an upper left edge of the display screen, and the second UWB base station is located at a lower right edge of the display screen. Alternatively, in other words, all or a part of a perpendicular projection that is of the first UWB base station and that is on the display screen is located at an intersection point between the third edge and the second edge;

all or a part of a perpendicular projection that is of the second UWB base station and that is on the display screen is located at an intersection point between the third edge and the first edge; and all or a part of a perpendicular projection that is of the third UWB base station and that is on the display screen is located at an intersection point between the second edge and the fourth edge.

For example, the UWB tag separately sends a first distance measurement message to the first UWB base station, the second UWB base station, and the third UWB base station, where the first distance measurement message is for determining a distance between the UWB tag and the first UWB base station, a distance between the UWB tag and the second UWB base station, and a distance between the UWB tag and the third UWB base station.

The first UWB base station separately sends a second distance measurement message to the second UWB base station and the third UWB base station, where the second distance measurement message is for determining a distance between the first UWB base station and the second UWB base station and a distance between the first UWB base station and the third UWB base station.

The electronic device determines the first included angle, the second included angle, the third included angle, and the fourth included angle based on the distance between the UWB tag and the first UWB base station, the distance between the UWB tag and the second UWB base station, the distance between the UWB tag and the third UWB base station, the distance between the first UWB base station and the second UWB base station, and the distance between the first UWB base station and the third UWB base station.

It should be understood that a quantity of UWB base stations on the display screen may be greater than or equal to 2, for example, 2, 4, or 5, as long as positions of the left and right boundaries and positions of the upper and lower boundaries of the display screen can be determined through the plurality of UWB base stations on the display screen.

According to any one of the third aspect or the foregoing implementations of the third aspect, the method further includes: after the roll angle is greater than the second included angle and less than the first included angle, the cursor moves in the first direction with the mobile device.

According to any one of the third aspect or the foregoing implementations of the third aspect, the method further includes:

after the roll angle is less than the second included angle, the cursor no longer moves in the first direction with the mobile device.

According to any one of the third aspect or the foregoing implementations of the third aspect, the second included angle is a negative value, and the first included angle is a positive value.

According to any one of the third aspect or the foregoing implementations of the third aspect, the method further includes: further determining a third included angle and a fourth included angle in response to the distance measurement response messages, where the third included angle is an included angle between the perpendicular from the mobile device to the plane on which the display screen is located and a connecting line between the mobile device and the first edge, and the fourth included angle is an included angle between the perpendicular from the mobile device to the plane on which the display screen is located and a connecting line between the mobile device and the second edge; and after the yaw angle is greater than the third included angle, the cursor no longer moves in the second direction with the mobile device.

According to any one of the third aspect or the foregoing implementations of the third aspect, the method further includes: after the yaw angle is greater than the fourth included angle and less than the third included angle, the cursor moves in the second direction with the mobile device.

According to any one of the third aspect or the foregoing implementations of the third aspect, the method further includes: after the yaw angle is less than the fourth included angle, the cursor no longer moves in the second direction with the mobile device.

According to any one of the third aspect or the foregoing implementations of the third aspect, the fourth included angle is a negative value, and the third included angle is a positive value.

According to any one of the third aspect or the foregoing implementations of the third aspect, the determining an included angle includes: receiving a current first direction measurement message of the mobile device; and determining the included angle based on the current first direction measurement message.

According to any one of the third aspect or the foregoing implementations of the third aspect, the determining the included angle based on the current first direction measurement message includes: receiving an initial first direction measurement message of the mobile device after the straight line in the direction to which the mobile device points is perpendicular to the display screen of the electronic device; determining an initial included angle based on the initial first direction measurement message; determining a current included angle based on the current first direction measurement message; and determining the included angle based on the current included angle and the initial included angle.

According to any one of the third aspect or the foregoing implementations of the third aspect, the determining the included angle based on the current included angle and the initial included angle includes: subtracting the initial included angle from the current included angle, to obtain the included angle.

According to any one of the third aspect or the foregoing implementations of the third aspect, the electronic device further includes a second direction sensor, where the second direction sensor is located at a position at the front or the back of the display screen, and all or a part of a perpendicular projection that is of the second direction sensor and that is on the display screen is located on the display screen. The determining the included angle based on the current first direction measurement message includes: determining the included angle based on the current first direction measurement message and a current second direction measurement message. The second direction sensor is an inertial measurement unit IMU. In this implementation, because the second direction sensor is further disposed on the electronic device, an Euler angle of the display screen does not need to be calibrated. After the mobile device rotates or moves, the mobile device may send the measurement message of a first direction sensor to the electronic device, and the processor of the electronic device may determine an actual yaw angle and an actual roll angle between the mobile device and the display screen in combination with the measurement message of the second direction sensor, so that accuracy is high.

According to any one of the third aspect or the foregoing implementations of the third aspect, the IMU is a 9-axis IMU, and the 9-axis IMU includes an accelerometer sensor, a gyroscope sensor, and a magnetic sensor. Alternatively, the IMU is a 6-axis IMU, and the 6-axis IMU includes an accelerometer sensor and a gyroscope sensor.

According to any one of the third aspect or the foregoing implementations of the third aspect, if the actual yaw angle between the mobile device and the display screen is within the angle range [ε,δ] determined based on the third included angle δ and the fourth included angle ε, and the actual roll angle between the mobile device and the display screen is within the angle range [β,α] determined based on the first included angle α and the second included angle β, it is determined that the straight line in the direction to which the mobile device points is within the range of the display screen (to be specific, the straight line in the direction to which the mobile device points is within the range of the display screen in both the vertical direction dimension and the horizontal direction dimension of the display screen), and movement of the cursor in the vertical direction dimension and the horizontal direction dimension of the display screen can be controlled based on the rotation or the movement of the mobile device. The movement of the cursor on the display screen is controlled based on the rotation or the movement of the mobile device.

According to any one of the third aspect or the foregoing implementations of the third aspect, if the actual yaw angle between the mobile device and the display screen is within the angle range [ε,δ] determined based on the third included angle δ and the fourth included angle ε, and the actual roll angle between the mobile device and the display screen is beyond the angle range [β,α] determined based on the first included angle α and the second included angle β, in other words, the straight line in the direction to which the mobile device points is within the range of the display screen in the vertical direction dimension of the display screen, and is beyond the range of the display screen in the horizontal direction dimension of the display screen, the mobile device can control the movement of the cursor on the display screen in the vertical direction dimension of the display screen, and cannot control the movement of the cursor on the display screen in the horizontal direction dimension of the display screen. In other words, the movement of the cursor on the display screen is controlled based on the rotation or the movement of the mobile device in the vertical direction dimension of the display screen, and the cursor does not respond to the rotation or the movement of the mobile device in the horizontal direction dimension of the display screen.

According to any one of the third aspect or the foregoing implementations of the third aspect, if the actual yaw angle between the mobile device and the display screen is beyond the angle range [ε,δ] determined based on the third included angle δ and the fourth included angle ε, and the actual roll angle between the mobile device and the display screen is within the angle range [β,α] determined based on the first included angle α and the second included angle β, it is proved that the straight line in the direction to which the mobile device points is beyond the range of the display screen in the vertical direction dimension of the display screen, and is within the range of the display screen in the horizontal direction dimension of the display screen. In the horizontal direction dimension of the display screen, the movement of the cursor on the display screen can be controlled based on the rotation or the movement of the mobile device. In the vertical direction dimension of the display screen, the movement of the cursor on the display screen cannot be controlled based on the rotation or the movement of the mobile device.

According to any one of the third aspect or the foregoing implementations of the third aspect, if the actual yaw angle between the mobile device and the display screen is beyond the angle range [ε,δ] determined based on the third included angle δ and the fourth included angle ε, and the actual roll angle between the mobile device and the display screen is beyond the angle range [ε,α] determined based on the first included angle α and the second included angle β, it is determined that the straight line in the direction to which the mobile device points is beyond the range of the display screen (to be specific, the straight line in the direction to which the mobile device points is beyond the range of the display screen in both the vertical direction dimension and the horizontal direction dimension of the display screen). Movement of the cursor in the vertical direction dimension and the horizontal direction dimension of the display screen cannot be controlled based on the rotation or the movement of the mobile device.

According to a fourth aspect, a method for controlling movement of a cursor on an electronic device is provided. The method is applied to a mobile device. A cursor corresponding to the mobile device is displayed on the display screen of the electronic device according to any one of the first aspect or the foregoing implementations of the first aspect, and the mobile device includes a UWB tag and a first direction sensor. The method includes: sending a cursor indication message to the electronic device, where the cursor indication message indicates a movement direction of the cursor on the display screen of the electronic device; receiving, through the UWB tag, distance measurement messages respectively sent by the at least two UWB base stations; sending distance measurement response messages respectively to the at least two UWB base stations through the UWB tag in response to the distance measurement messages; and after the mobile device is powered on, sending a current first direction measurement message to the electronic device through the first direction sensor, where the current first direction measurement message is a message that is output by the first direction sensor. In this way, a distance between the UWB tag and each UWB base station on the display screen of the electronic device may be determined, to determine a yaw angle and a roll angle. The yaw angle represents an angle at which the mobile device tilts relative to a left boundary or a right boundary of the display screen. The roll angle represents an angle at which the mobile device tilts relative to an upper boundary or a lower boundary of the display screen. Then, it is further determined whether the roll angle is within a range between a first included angle and a second included angle, and whether the yaw angle is within a range between a third included angle and a fourth included angle. If the roll angle is beyond the range between the first included angle and the second included angle, and the yaw angle is beyond the range between the third included angle and the fourth included angle, the mobile device cannot control movement of the cursor on the electronic device. This resolves a problem of out-of-focus between the mobile device and the cursor on the display screen.

According to the fourth aspect, in a possible implementation of the fourth aspect, the first direction sensor is an inertial measurement unit IMU.

According to the fourth aspect or the foregoing implementation of the fourth aspect, the IMU is a 9-axis IMU, and the 9-axis IMU includes an accelerometer sensor, a gyroscope sensor, and a magnetic sensor. Alternatively, the IMU is a 6-axis IMU, and the 6-axis IMU includes an accelerometer sensor and a gyroscope sensor.

According to a fifth aspect, a method for controlling movement of a cursor on an electronic device is provided. The method is applied to a control system. The control system includes a mobile device and an electronic device. The electronic device includes a display screen and at least two UWB base stations, and the display screen includes a first edge, a second edge, a third edge, and a fourth edge. The first edge is parallel to the second edge, the third edge is parallel to the fourth edge, the first edge and the second edge are parallel to a first direction, the third edge and the fourth edge are parallel to a second direction, the first direction is perpendicular to the second direction, and the display screen displays a cursor. The cursor moves on the display screen with the mobile device. The at least two UWB base stations are distributed at different positions at front or back of the display screen, and all or a part of a perpendicular projection that is of each of the at least two UWBs and that is on the display screen is located on the display screen. The mobile device includes a UWB tag and a first direction sensor. The method includes: The mobile device sends a cursor indication message to the electronic device, where the cursor indication message indicates a movement direction of the cursor on the display screen of the electronic device. The electronic device receives the cursor indication message of the mobile device. The electronic device sends distance measurement messages to the mobile device respectively through the at least two UWB base stations. The mobile device receives, through the UWB tag, the distance measurement messages respectively sent by the at least two UWB base stations. The mobile device sends distance measurement response messages respectively to the at least two UWB base stations through the UWB tag in response to the distance measurement messages. The electronic device receives the distance measurement response messages of the mobile device for the distance measurement messages respectively through the at least two UWB base stations. The electronic device determines, in response to the distance measurement response messages, a distance between each of the at least two UWB base stations and the mobile device, a distance between every two of the at least two UWB base stations, a first included angle, and a second included angle, where the first included angle is an included angle between a perpendicular from the mobile device to the plane on which the display screen is located and a connecting line between the mobile device and the third edge, and the second included angle is an included angle between the perpendicular from the mobile device to the plane on which the display screen is located and a connecting line between the mobile device and the fourth edge. The electronic device determines a tilt angle, where the tilt angle is an included angle between a straight line in the direction to which the mobile device points and the perpendicular from the mobile device to the plane on which the display screen is located. The electronic device determines a yaw angle and a roll angle based on the tilt angle, where the roll angle represents an included angle that is in the first direction and that is between the straight line in the direction to which the mobile device points and the perpendicular from the mobile device to the plane on which the display screen is located, and the yaw angle represents an included angle that is in the second direction and that is between the straight line in the direction to which the mobile device points and the perpendicular from the mobile device to the plane on which the display screen is located. After the roll angle is greater than the first included angle, the cursor no longer moves in the first direction with the mobile device.

According to the method for controlling movement of a cursor on an electronic device provided in the fifth aspect, a first angle range in the first direction and a second angle range in the second direction are determined. The first angle range is a largest angle range in which the mobile device (for example, an air mouse) controls the cursor on the display screen of the electronic device to move in the first direction, and the second angle range is a largest angle range in which the mobile device (for example, the air mouse) controls the cursor on the display screen of the electronic device to move in the second direction. If an actual angle between the mobile device and the display screen in the first direction is within the first angle range, the mobile device can control movement of the cursor on the electronic device in the first direction. If an actual angle between the mobile device and the display screen in the second direction is within the second angle range, the mobile device can control movement of the cursor on the electronic device in the second direction. If the actual angle between the mobile device and the display screen in the first direction is beyond the first angle range, the mobile device cannot control the movement of the cursor on the electronic device in the first direction. If the actual angle between the mobile device and the display screen in the second direction is beyond the second angle range, the mobile device cannot control the movement of the cursor on the electronic device in the second direction. The first direction is perpendicular to the second direction. This resolves a problem of out-of-focus between the mobile device and the cursor on the display screen, and a user does not need to perform re-calibration by repeatedly using a calibration key on the mobile device, to improve user experience.

With reference to the fifth aspect, in a possible implementation of the fifth aspect, the method further includes: after the roll angle is greater than the second included angle and less than the first included angle, the cursor moves in the first direction with the mobile device.

According to the fifth aspect or the foregoing implementation of the fifth aspect, the method further includes: after the roll angle is less than the second included angle, the cursor no longer moves in the first direction with the mobile device.

According to any one of the fifth aspect or the foregoing implementations of the fifth aspect, the method further includes: The electronic device further determines a third included angle and a fourth included angle in response to the distance measurement response messages, where the third included angle is an included angle between the perpendicular from the mobile device to the plane on which the display screen is located and a connecting line between the mobile device and the first edge, and the fourth included angle is an included angle between the perpendicular from the mobile device to the plane on which the display screen is located and a connecting line between the mobile device and the second edge. After the yaw angle is greater than the third included angle, the cursor no longer moves in the second direction with the mobile device.

According to any one of the fifth aspect or the foregoing implementations of the fifth aspect, the method further includes: after the yaw angle is greater than the fourth included angle and less than the third included angle, the cursor moves in the second direction with the mobile device.

According to any one of the fifth aspect or the foregoing implementations of the fifth aspect, the method further includes:

after the yaw angle is less than the fourth included angle, the cursor no longer moves in the second direction with the mobile device.

According to any one of the fifth aspect or the foregoing implementations of the fifth aspect, the second included angle is a negative value, and the first included angle is a positive value; and the fourth included angle is a negative value, and the third included angle is a positive value.

According to a sixth aspect, a system for controlling movement of a cursor on an electronic device is provided. The system includes a mobile device and an electronic device. The electronic device includes a display screen and at least two UWB base stations, and the display screen includes a first edge, a second edge, a third edge, and a fourth edge. The first edge is parallel to the second edge, and the third edge is parallel to the fourth edge. The first edge and the second edge are parallel to a first direction, and the third edge and the fourth edge are parallel to a second direction. The first direction is perpendicular to the second direction. The display screen displays a cursor, and the cursor moves on the display screen with the mobile device. The at least two UWB base stations are distributed at different positions at front or back of the display screen. All or a part of a perpendicular projection that is of each of the at least two UWBs and that is on the display screen is located on the display screen. The mobile device includes a UWB tag and a first direction sensor. The electronic device is configured to perform the step performed by the electronic device according to any one of the third aspect or the implementations of the third aspect. The mobile device is configured to perform the step performed by the mobile device according to any one of the fourth aspect or the implementations of the fourth aspect.

Another implementation of the sixth aspect corresponds to another implementation of the fifth aspect. Details are not described herein again.

For technical effects corresponding to any one of the sixth aspect and the implementations of the sixth aspect, refer to the technical effects corresponding to any one of the fifth aspect and the implementations of the fifth aspect. Details are not described herein again.

According to a seventh aspect, a computer-readable storage medium is provided. The computer-readable storage medium stores a computer program (which may also be referred to as instructions or code). When the computer program is executed by an electronic device, the electronic device is enabled to perform the method according to any one of the third aspect and the implementations of the third aspect.

For technical effects corresponding to any one of the seventh aspect and the implementations of the seventh aspect, refer to the technical effects corresponding to any one of the third aspect and the implementations of the third aspect. Details are not described herein again.

According to an eighth aspect, a computer-readable storage medium is provided. The computer-readable storage medium stores a computer program (which may also be referred to as instructions or code). When the computer program is executed by a mobile device, the mobile device is enabled to perform the method according to any one of the fourth aspect and the implementations of the fourth aspect.

For technical effects corresponding to the eighth aspect, refer to the technical effects corresponding to any one of the fourth aspect and the implementations of the fourth aspect. Details are not described herein again.

According to a ninth aspect, a chip is provided. The chip includes a processor and a memory. The processor is configured to read and execute a computer program stored in the memory, to perform the method according to any one of the third aspect and the implementations of the third aspect.

For technical effects corresponding to any one of the ninth aspect and the implementations of the ninth aspect, refer to the technical effects corresponding to any one of the third aspect and the implementations of the third aspect. Details are not described herein again.

According to a tenth aspect, a chip is provided. The chip includes a processor and a memory. The processor is configured to read and execute a computer program stored in the memory, to perform the method according to any one of the fourth aspect and the implementations of the fourth aspect.

For technical effects corresponding to any one of the tenth aspect and the implementations of the tenth aspect, refer to the technical effects corresponding to any one of the fourth aspect and the implementations of the fourth aspect. Details are not described herein again.

According to an eleventh aspect, a computer program product is provided. The computer program product includes a computer program (which may also be referred to as instructions or code). When the computer program is executed by an electronic device, the electronic device is enabled to perform the method according to any one of the third aspect and the implementations of the third aspect.

For technical effects corresponding to any one of the eleventh aspect and the implementations of the eleventh aspect, refer to the technical effects corresponding to any one of the third aspect and the implementations of the third aspect. Details are not described herein again.

According to a twelfth aspect, a computer program product is provided. The computer program product includes a computer program (which may also be referred to as instructions or code). When the computer program is executed by a mobile device, the mobile device is enabled to perform the method according to any one of the fourth aspect and the implementations of the fourth aspect.

For technical effects corresponding to any one of the twelfth aspect and the implementations of the twelfth aspect, refer to the technical effects corresponding to any one of the fourth aspect and the implementations of the fourth aspect. Details are not described herein again.

According to the method for controlling movement of a cursor on an electronic device, the mobile device, and the electronic device provided in this disclosure, the first angle range in the first direction and the second angle range in the second direction are determined. The first angle range is the largest angle range in which the mobile device (for example, the air mouse) controls the cursor on the display screen of the electronic device to move in the first direction, and the second angle range is the largest angle range in which the mobile device (for example, the air mouse) controls the cursor on the display screen of the electronic device to move in the second direction. If the actual angle between the mobile device and the display screen in the first direction is within the first angle range, the mobile device can control the movement of the cursor on the electronic device in the first direction. If the actual angle between the mobile device and the display screen in the second direction is within the second angle range, the mobile device can control the movement of the cursor on the electronic device in the second direction. If the actual angle between the mobile device and the display screen in the first direction is beyond the first angle range, the mobile device cannot control the movement of the cursor on the electronic device in the first direction. If the actual angle between the mobile device and the display screen in the second direction is beyond the second angle range, the mobile device cannot control the movement of the cursor on the electronic device in the second direction. The first direction is perpendicular to the second direction. This resolves the problem of out-of-focus between the mobile device and the cursor on the display screen, and the user does not need to perform re-calibration by repeatedly using the calibration key on the mobile device, to improve user experience.

DESCRIPTION OF EMBODIMENTS

Figure 1:
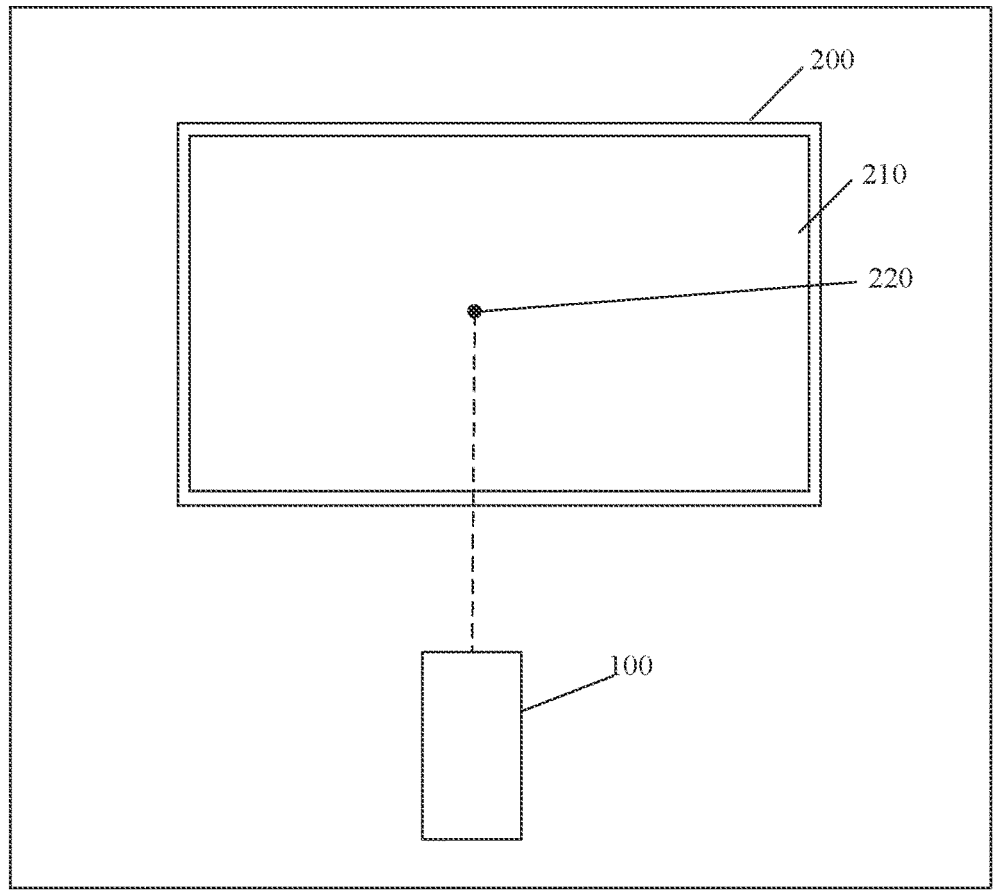
FIG. 1 is a schematic diagram of an architecture of a system usable in an embodiment.

The following clearly describes technical solutions in embodiments of this disclosure with reference to the accompanying drawings.

Terms used in the following embodiments are merely intended to describe specific embodiments, but are not intended to limit this disclosure. The terms "one", "a", "the", "the foregoing", and "this" of singular forms used in this specification and the appended claims are also intended to include expressions such as "one or more", unless otherwise specified in the context clearly. It should be further understood that in embodiments of this disclosure, "one or more" means one or more than two (including two); and "and/or" describes an association relationship between associated objects, and indicates that three relationships may exist. For example. A and/or B may indicate the following three cases: Only A exists, both A and B exist, and only B exists, where A and B may be singular or plural. The character "/" generally indicates an "or" relationship between associated objects.

Reference to "an embodiment", "some embodiments", or the like described in this specification indicates that one or more embodiments of this disclosure include a specific feature, structure, or characteristic described with reference to the embodiment. Therefore, statements such as "in an embodiment". "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "contain", "have", and their variants all mean "include but are not limited to", unless otherwise specifically emphasized in another manner.

"A plurality of" in embodiments of this disclosure indicates two or more. It should be noted that in descriptions of embodiments of this disclosure, terms such as "first" and "second" are merely intended for distinction in description, but should not be construed as indicating or implying relative importance or indicating or implying a sequence.

The technical solutions in embodiments of this disclosure may be applied to various communication systems, for example, a global system for mobile communications (global system for mobile communications, GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, and a 5th generation (5G) system or a new radio (NR) system.

An electronic device in embodiments of this disclosure may be an electronic device having a large display screen.

For example, the electronic device in embodiments of this disclosure may be a smart television, a projection device that can emit a projection on a wall, a computer, various portable notebook computers, various tablet computers, and another electronic device having a display screen. Optionally, the electronic device may alternatively be a personal digital assistant (PDA) having a large display screen, a handheld device, a computing device, a vehicle-mounted device, or a wearable device having a large display screen, an electronic device in a 5G network, an electronic device in an evolved public land mobile network (PLMN), or the like. This is not limited in embodiments of this disclosure.

A mobile device in embodiments of this disclosure can implement a function of controlling and selecting a menu on a display screen of an electronic device. For example, the mobile device may be an air mouse, a smart remote control, or a smartphone. This is not limited herein in embodiments of this disclosure. An example in which the mobile device is the air mouse is used in the following descriptions.

Electronic devices (such as smart televisions) having large display screens are increasingly used, and common remote controls cannot meet use requirements. Therefore, the air mouse (which may also be referred to as a smart mouse, an air mouse remote control, or the like, where the air mouse is uniformly used below) emerges. The air mouse is a wireless mouse with features such as a small size, good portability, latest ergonomic design for comfortable use, wireless connectivity, and being unrestricted by space. The air mouse can be used as not only a remote control but also a wireless mouse, and is a mouse not necessarily on a desktop. When the air mouse is used, a pointer (which may also be referred to as a cursor) of a mouse appears on a display screen of an electronic device, and a user may use the air mouse to move the pointer on the display screen, to select a menu on the display screen. Alternatively, an application (APP) on a mobile device (for example, a mobile phone) may be used, so that the mobile device is simulated as an air mouse, to select a menu or content on the display screen.

FIG. 1 is a schematic diagram of an architecture of a system usable in an embodiment of this disclosure. As shown in FIG. 1, the system includes an air mouse 100 and an electronic device 200. The electronic device 200 includes a display screen 210. After a communication connection is established between the air mouse 100 and the electronic device 200, a user may select, by using the air mouse 100, various program menus displayed on the display screen 210. For example, as shown in FIG. 1, after the connection is established between the air mouse 100 and the electronic device 200, a cursor 220 corresponding to the air mouse appears on the display screen 210 (where a dashed line in FIG. 1 is an extension line of a direction to which the air mouse 100 points). In a process in which the user uses the air mouse 100, the user may rotate or move the air mouse 100, so that the cursor 220 corresponding to the air mouse 100 moves on the display screen 210, and finally is at a position of a program menu that the user needs to select and that is on the display screen 210. In this way, the needed program menu on the display screen 210 is selected by using the air mouse 100.

Figure 2:
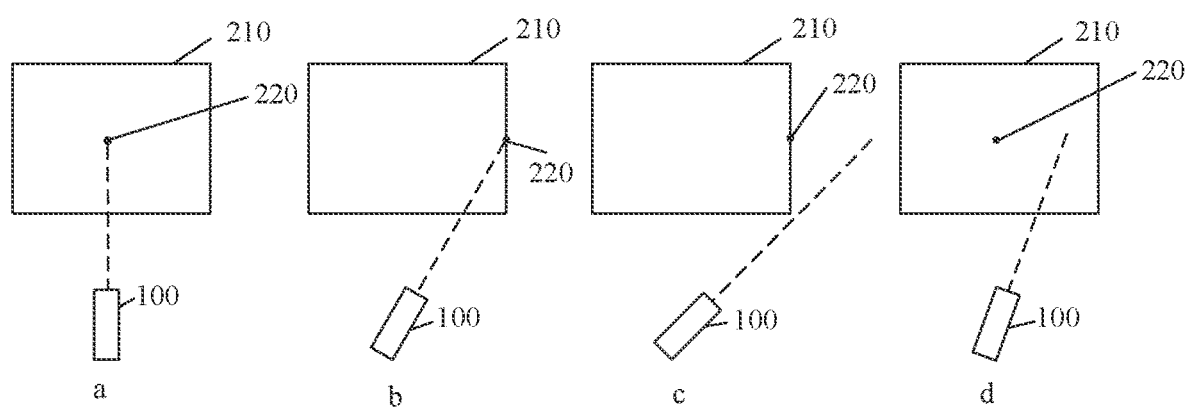
FIG. 2 is a schematic diagram of a working process of an air mouse according to this disclosure.

FIG. 2 is a schematic diagram of a working process of the air mouse in the system shown in FIG. 1. As shown in a in FIG. 2, calibration is performed after the air mouse 100 faces a center of the display screen 210. In this case, a position of the air mouse 100 corresponds to a position of the cursor 220 on the display screen 210. For example, the air mouse 100 points to the center of the display screen 210 (as shown by a dashed line in a in FIG. 2, where the dashed line may also be referred to as an extension line of a direction to which the air mouse 100 points, and the extension line of the direction to which the air mouse 100 points extends to the center of the display screen 210), and the cursor 220 is also at the center of the display screen 210. As shown in b in FIG. 2, a user rotates the air mouse 100 rightward and keeps the rotation of the air mouse 100 in a horizontal plane, and the cursor 220 that corresponds to the air mouse 100 and that is on the display screen 210 also correspondingly moves rightward until the cursor 220 reaches a right edge of the display screen. As shown in c in FIG. 2, after the cursor 220 moves to the right edge of the display screen, the air mouse 100 continues to be rotated rightward and the rotation of the air mouse 100 is kept in the horizontal plane, and the cursor 220 keeps still at the right edge of the display screen 210. After the air mouse 100 is rotated rightward for a specific angle, the air mouse 100 is rotated leftward and the rotation of the air mouse 100 is kept in the horizontal plane. In this case, the cursor 220 starts to move leftward from the right edge of the display screen 210. As shown in d in FIG. 2, when the cursor 220 moves to the center of the display screen 210, an extension line of a direction to which the air mouse 100 points does not extend to the center of the display screen 210. This is different from the case shown in a in FIG. 2. Instead, the extension line extends to a position between the center of the display screen 210 and the right edge of the display screen 210. In other words, when the cursor 220 is located at the center of the display screen 210, the direction to which the air mouse 100 points (refer to a pointing direction shown by a dashed line in d in FIG. 2) is different from the direction to which the air mouse 100 initially points (refer to a pointing direction shown by the dashed line in a in FIG. 2), and a correspondence between the direction to which the air mouse 100 points and the position of the cursor 220 on the display screen 210 changes. This is referred to as out-of-focus of the air mouse. In other words, the cursor has returned to the center of the screen, but the air mouse is not aligned with the center of the screen. In this way, the air mouse needs to be re-calibrated by using a calibration key on the air mouse. This brings poor experience to the user.

In view of this, this disclosure provides a method for controlling movement of a cursor on an electronic device, a mobile device, and an electronic device, to determine a largest angle range in which the mobile device (for example, an air mouse) controls movement of a cursor on a display screen of the electronic device. When an actual angle between the mobile device and the display screen is within the angle range, the mobile device can control the movement of the cursor on the electronic device. When the actual angle between the mobile device and the display screen is beyond the angle range, the mobile device cannot control the movement of the cursor on the electronic device. In other words, if a straight line in a direction to which the mobile device points is within a range of the display screen, the mobile device can control the movement of the cursor on the display screen. If the straight line in the direction to which the mobile device points is beyond the range of the display screen, the mobile device cannot control the movement of the cursor on the display screen. This resolves a problem of out-of-focus between the mobile device and the cursor on the display screen, and a user does not need to perform re-calibration by repeatedly using a calibration key on the mobile device, to improve user experience.

Figure 3:
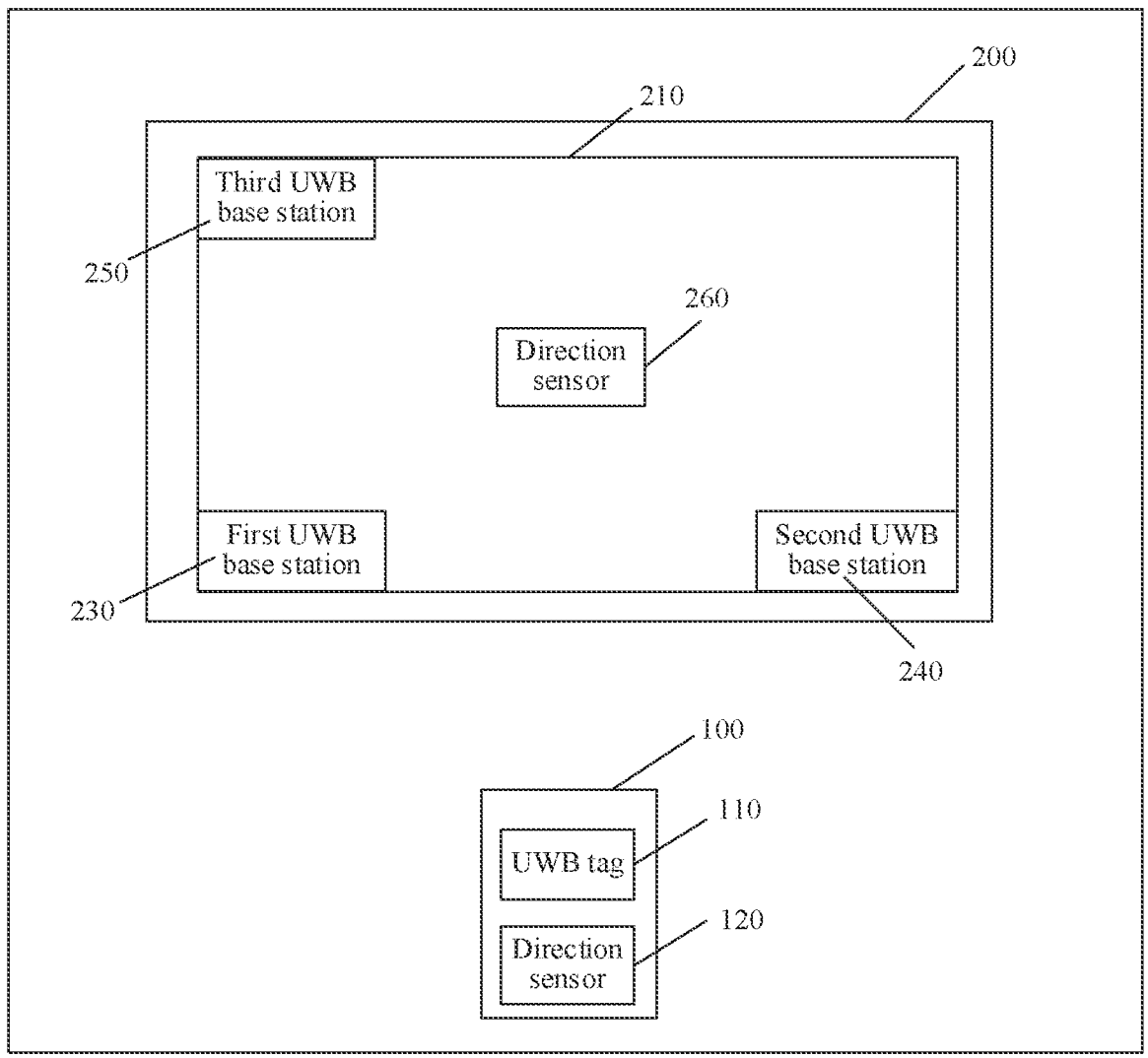
FIG. 3 is another schematic diagram of an architecture of a system usable in an embodiment.

With reference to FIG. 3, the following further describes the method that is for controlling movement of a cursor on an electronic device and that is provided in this disclosure.

The method may be applied to a system, shown in FIG. 3, including a mobile device 100 and an electronic device 200. As shown in FIG. 3, the electronic device 200 includes a display screen 210, and a first ultra-wideband (UWB) base station 230, a second UWB base station 240, and a third UWB base station 250 are disposed on the display screen 210. A UWB tag 110 and a direction sensor 120 are disposed on the mobile device 100.

To be specific, at least two UWB base stations on the electronic device may be distributed at different positions at front or back of the display screen, and all or a part of a perpendicular projection that is of each of the at least two UWB base stations and that is on the display screen is located on the display screen.

Optionally, in this embodiment, a direction sensor 260 may also be disposed on the display screen 210 of the electronic device 200.

As shown in FIG. 3, the first UWB base station 230 and the second UWB base station 240 are respectively located at a left edge and a right edge (or a left boundary and a right boundary) of the display screen 210, and the first UWB base station 230 and the third UWB base station 250 are respectively located at a lower edge and an upper edge (or a lower boundary and an upper boundary) of the display screen 210. As shown in FIG. 3, the first UWB base station 230 is located at a lower left edge of the display screen 210, the second UWB base station 240 is located at a lower right edge of the display screen 210, and the third UWB base station 250 is located at an upper left edge of the display screen 210. The direction sensor 260 is disposed on the display screen 210. Optionally, the direction sensor 260 may alternatively not be disposed on the display screen 210.

In other words, all or a part of a perpendicular projection that is of the first UWB base station and that is on the display screen is located at an intersection point between the third edge and the second edge:

all or a part of a perpendicular projection that is of the second UWB base station and that is on the display screen is located at an intersection point between the third edge and the first edge; and all or a part of a perpendicular projection that is of the third UWB base station and that is on the display screen is located at an intersection point between the second edge and the fourth edge.

It should be understood that in this embodiment of this disclosure, positions of the first UWB base station 230, the second UWB base station 240, and the third UWB base station 250 on the display screen 210 may be interchanged. This is not limited herein in this embodiment of this disclosure.

Optionally, in embodiments of this disclosure, the direction sensor may include an inertial measurement unit (IMU). For example, the direction sensor may be a 9-axis IMU including an accelerometer sensor, a gyroscope sensor, and a magnetic sensor. Alternatively, the direction sensor may be a 6-axis IMU including an accelerometer sensor and a gyroscope sensor. This is not limited herein in embodiments of this disclosure.

In this disclosure, the display screen of the electronic device may also be referred to as a screen of the electronic device, and the two descriptions may be interchanged. In embodiments of this disclosure, both the display screen and the screen refer to the display screen of the electronic device (for example, a smart television).

It should be understood that, in embodiments of this disclosure, a specific shape of the display screen of the electronic device is not limited. For example, the shape of the display screen may be a rectangle, or may be a parallelogram, a hexagon, an octagon, a decagon, or a circle. This is not limited herein in embodiments of this disclosure.

It should be further understood that, in embodiments of this disclosure, a quantity of UWB base stations on the display screen may be greater than or equal to 2, for example, 2, 4, or 5, as long as positions of the left and right boundaries and positions of the upper and lower boundaries of the display screen can be determined through the plurality of UWB base stations on the display screen. This is not limited herein in embodiments of this disclosure.

An example in which the shape of the display screen of the electronic device is the rectangle is used in the following descriptions.

The rectangular display screen includes a first edge, a second edge, a third edge, and a fourth edge. The first edge is parallel to the second edge, the third edge is parallel to the fourth edge, the first edge and the second edge are parallel to a first direction, the third edge and the fourth edge are parallel to a second direction, and the first direction is perpendicular to the second direction. An example in which the first direction is a horizontal direction of the display screen, the second direction is a vertical direction of the display screen, the first edge is the upper edge (or the upper boundary) of the display screen, the second edge is the lower edge (or the lower boundary) of the display screen, the third edge is the left edge (or the left boundary) of the display screen, and the fourth edge is the right edge (or the right boundary) of the display screen is used in the following descriptions.

It should be further understood that, in embodiments of this disclosure, a communication connection may be established between the electronic device and the mobile device in a plurality of different manners such as a Wi-Fi connection and a Bluetooth connection, so that information or a message can be transmitted between the electronic device and the mobile device.

Figure 4:
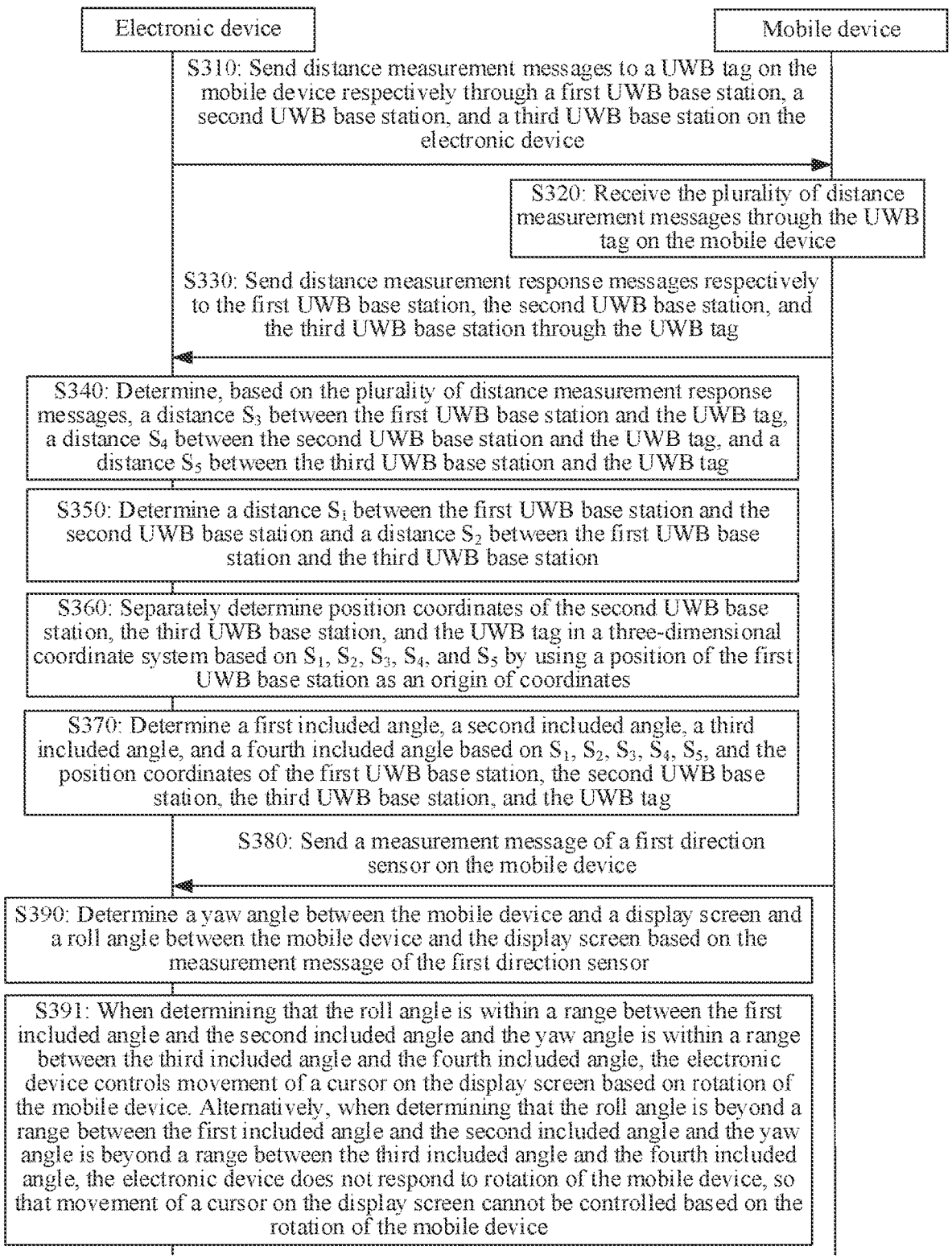
FIG. 4 is a schematic diagram of a method for controlling movement of a cursor on an electronic device according to an embodiment.

FIG. 4 is a schematic diagram of a method for controlling movement of a cursor on an electronic device according to this disclosure. The method shown in FIG. 4 may be applied to the system shown in FIG. 3.

A communication connection may be established between an electronic device and a mobile device in a plurality of different manners such as a Wi-Fi connection and a Bluetooth connection. As shown in FIG. 4, the method 300 includes the following steps.

S310: The electronic device sends distance measurement messages to a UWB tag on the mobile device respectively through a first UWB base station, a second UWB base station, and a third UWB base station.

S320: The UWB tag on the mobile device receives the plurality of distance measurement messages.

S330: After the UWB tag on the mobile device receives the plurality of distance measurement messages, the mobile device sends distance measurement response messages respectively to the first UWB base station, the second UWB base station, and the third UWB base station through the UWB tag.

S340: The electronic device determines, based on the plurality of distance measurement response messages, a distance $S_3$ between the first UWB base station and the UWB tag, a distance $S_4$ between the second UWB base station and the UWB tag, and a distance $S_5$ between the third UWB base station and the UWB tag.

S350: The electronic device determines a distance $S_1$ between the first UWB base station and the second UWB base station and a distance $S_2$ between the first UWB base station and the third UWB base station.

S360: The electronic device separately determines position coordinates of the second UWB base station, the third UWB base station, and the UWB tag in a three-dimensional coordinate system based on $S_1$, $S_2$, $S_3$, $S_4$, and $S_5$ by using a position of the first UWB base station as an origin of coordinates.

S370: The electronic device determines a first included angle, a second included angle, a third included angle, and a fourth included angle based on $S_1$, $S_2$, $S_3$, $S_4$, $S_5$, and the position coordinates of the first UWB base station, the second UWB base station, the third UWB base station, and the UWB tag. The first included angle is an included angle between a perpendicular from the mobile device to the plane on which the display screen is located and a connecting line between the mobile device and a third edge (a left edge). The second included angle is an included angle between the perpendicular from the mobile device to the plane on which the display screen is located and a connecting line between the mobile device and a fourth edge (a right edge). The third included angle is an included angle between the perpendicular from the mobile device to the plane on which the display screen is located and a connecting line between the mobile device and a first edge (an upper edge). The fourth included angle is an included angle between the perpendicular from the mobile device to the plane on which the display screen is located and a connecting line between the mobile device and a second edge (a lower edge).

S380: The mobile device sends a measurement message (a first direction measurement message) of a first direction sensor on the mobile device to the electronic device.

S390: The electronic device determines a yaw angle between the mobile device and the display screen and a roll angle between the mobile device and the display screen based on the measurement message of the first direction sensor.

The roll angle between the mobile device and the display screen represents an included angle that is in a first direction (a horizontal direction) and that is between a straight line in a direction to which the mobile device points and the perpendicular from the mobile device to the plane on which the display screen is located.

The yaw angle between the mobile device and the display screen represents an included angle that is in a second direction (a vertical direction) and that is between the straight line in the direction to which the mobile device points and the perpendicular from the mobile device to the plane on which the display screen is located.

Optionally, in another possible implementation, if a second direction sensor is deployed on the electronic device, S390 may be replaced with the following step:

The electronic device determines an actual yaw angle between an air mouse and the display screen and an actual roll angle between the air mouse and the display screen based on the measurement message of the first direction sensor and a measurement message (a second direction measurement message) of the second direction sensor.

S391: When the electronic device determines that the roll angle is within a range between the first included angle and the second included angle and the yaw angle is within a range between the third included angle and the fourth included angle, the electronic device controls movement of a cursor on the display screen based on rotation of the mobile device. Alternatively, when the electronic device determines that the roll angle is beyond a range between the first included angle and the second included angle and the yaw angle is beyond a range between the third included angle and the fourth included angle, the electronic device does not respond to rotation of the mobile device, so that movement of a cursor on the display screen cannot be controlled based on the rotation of the mobile device.

Optionally, before S310, the mobile device may further send a cursor indication message to the electronic device, where the cursor indication message indicates a movement direction of the cursor on the display screen. In other words, before the electronic device performs S310, the mobile device may communicate with the electronic device. Information or a message transmitted in this communication process notifies the electronic device that the mobile device needs to control the movement direction of the cursor on the display screen of the electronic device.

It should be noted that in the procedure shown in FIG. 4, both the mobile device and the electronic device perform real-time measurement, real-time communication, and real-time determining.

In embodiments of this disclosure, the perpendicular between the mobile device and a plane of the display screen (or from the mobile device to a plane of the display screen) may be understood as follows: A perpendicular is constructed from any point on the mobile device (for example, any point on the UWB tag on the mobile device or a central point at top of the mobile device) as an endpoint (denoted as a point Q) of a line segment to the plane of the display screen, where an intersection point between the perpendicular and the display screen is the other endpoint (denoted as a point P) of the line segment, and the line segment QP is the perpendicular between the mobile device and the plane of the display screen (or from the mobile device to the plane of the display screen). In other words, the mobile device may be considered as a point, a perpendicular is constructed from the point to the plane of the display screen, and the perpendicular is the perpendicular between the mobile device and the plane of the display screen, where the perpendicular between the mobile device and the plane of the display screen is perpendicular to the display screen.

The straight line in the direction to which the mobile device points may be understood as follows: Any point on the mobile device (for example, any point on the UWB tag on the mobile device or the central point at the top of the mobile device) is used as a start point of the straight line, and a direction of the straight line is the direction to which the mobile device actually points. In addition, the start point of the straight line in the direction to which the mobile device points is the same as a start point (the point Q) of the perpendicular from the mobile device to the plane on which the display screen is located. The mobile device may rotate about the point (the point Q) in the first direction or the second direction. When the mobile device rotates about the point Q leftward or rightward in the first direction, the roll angle between the mobile device and the display screen changes. When the mobile device rotates about the point Q upward or downward in the second direction, the yaw angle between the mobile device and the display screen changes. In other words, the mobile device may be considered as a point, the point (the point Q) is used as the start point of the straight line in the direction to which the mobile device points, and the direction of the straight line (which may alternatively be understood as a ray using the point Q as a start point) is the direction to which the mobile device actually points In the following descriptions, an example in which the mobile device is an air mouse is used to describe the steps of the method 300 that is for controlling movement of a cursor on an electronic device and that is provided in this disclosure. It should be understood that this should not impose any limitation on the mobile device in embodiments of this disclosure. For example, the mobile device may alternatively be a smartphone, a remote control, or another wearable device.

In embodiments of this disclosure, a distance between two UWB base stations and a distance between the UWB base station and the UWB tag may be determined according to a UWB distance measurement principle. First, the UWB distance measurement principle is briefly described.

Figure 5:
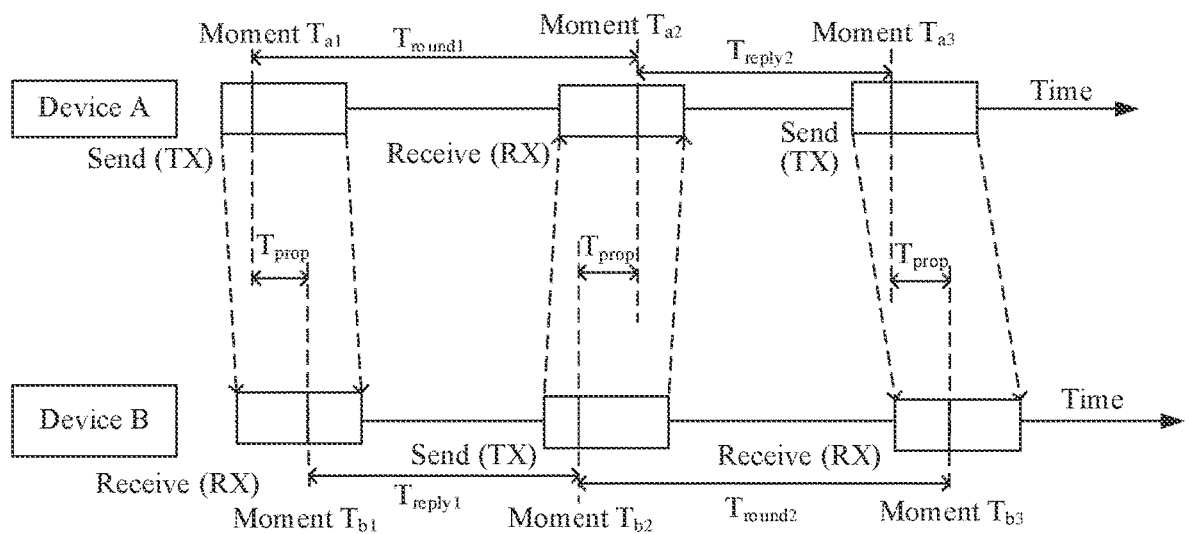
FIG. 5 is a schematic diagram of determining a distance between two devices by using a UWB technology and a two-way time-of-flight method.

UWB distance measurement means performing measurement on a distance between two devices by mainly using a time-of-flight (time-of-flight, TOF) distance measurement method. In the distance measurement method, a distance between nodes is measured by using a time-of-flight of a signal between two asynchronous transceivers. FIG. 5 is a schematic diagram of determining a distance between two devices by using a two-way time-of-flight method. As shown in FIG. 5, a device A first sends a data packet to a device B, and records a moment $T_{a1}$ at which the data packet is sent. A time length for transmitting the data packet between the device A and the device B is $T_{prop}$. After receiving the data packet, the device B records a moment $T_{b1}$ at which the data packet is received. Then, the device B sends another data packet to the device A at a moment $T_{b2}$ after waiting for a time length $TW_{reply1}$. A time length for transmitting the data packet between the device A and the device B is $T_{prop}$. After receiving the data packet, the device A records a moment $T_{a2}$ at which the data packet is received. Then, the device A sends still another data packet to the device B at a moment $T_{a3}$ after waiting for a time length $T_{reply2}$. A time length for transmitting the data packet between the device A and the device B is $T_{prop}$. After receiving the data packet, the device B records a moment $T_{b3}$ at which the data packet is received. A time length between the moment $T_{a1}$ and the moment $T_{a2}$ is $T_{round1}$, and a time length between the moment $T_{b2}$ and the moment $T_{b3}$ is $T_{round2}$. In this case, a time-of-flight $\hat{T}_{prop}$ of the data packet over the air may be determined according to the following formula (1):

$$\hat{T}_{trop} = \frac{T_{round1} \times T_{round2} - T_{reply1} \times T_{reply2}}{T_{round1} + T_{round2} + T_{reply1} + T_{reply2}} \quad (1)$$

According to the formula (1), the time-of-flight $\hat{T}_{prop}$ of the data packet over the air may be calculated, and a distance between the device A and the device B may be obtained by multiplying $\hat{T}_{prop}$ by a speed of light.

Figure 6:
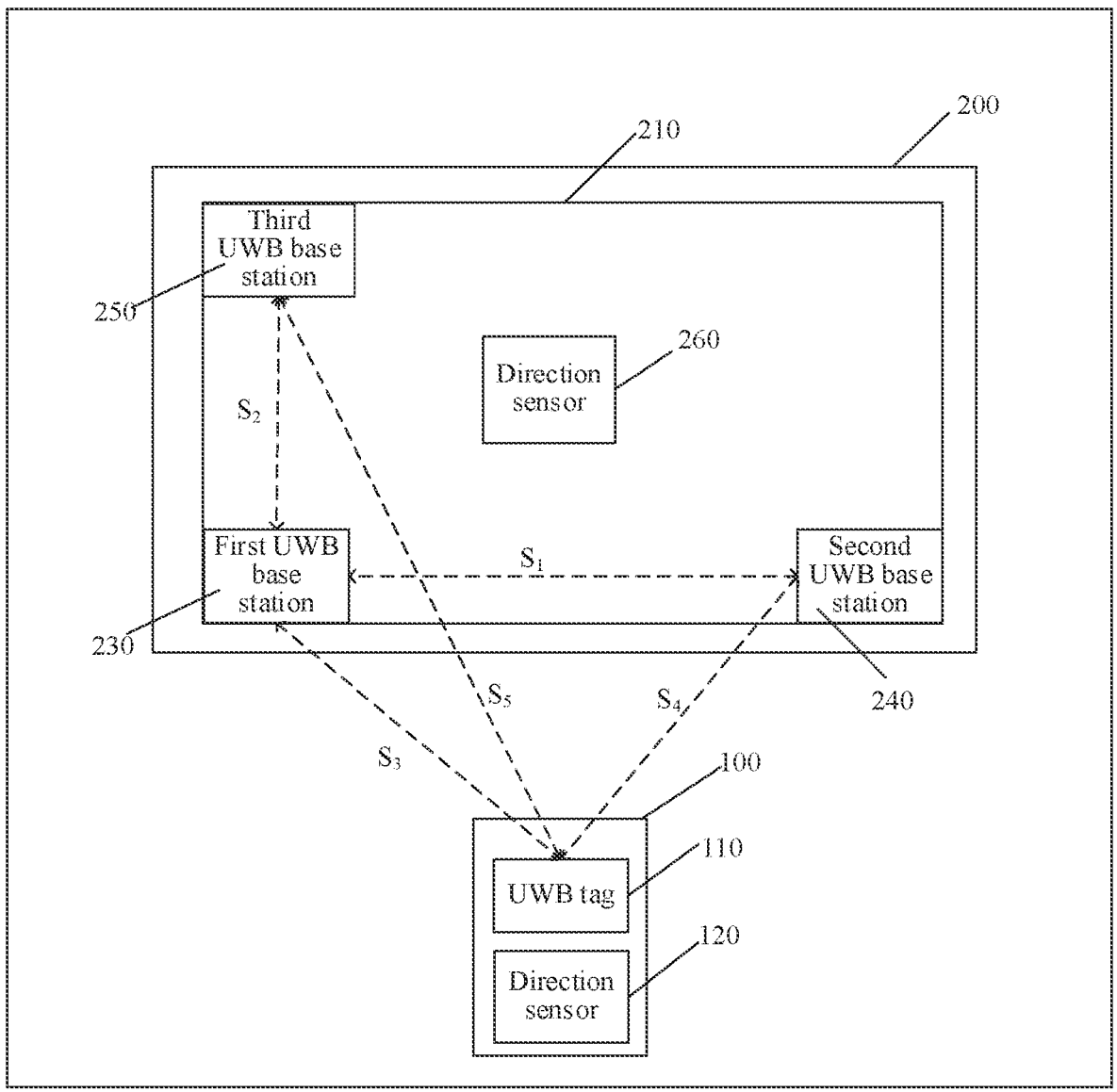
FIG. 6 is a schematic diagram of relative positions of a UWB tag and UWB base stations on a display screen according to an embodiment.

FIG. 6 is a schematic diagram of relative positions of the UWB tag and the UWB base stations on the display screen according to this embodiment of this disclosure. As shown in FIG. 6, according to the foregoing UWB distance measurement principle, the following distances may be measured:

the distance $S_1$ between the first UWB base station 230 and the second UWB base station 240;
the distance $S_2$ between the first UWB base station 230 and the third UWB base station 250;
the distance $S_3$ between the first UWB base station 230 and the UWB tag 110;
the distance $S_4$ between the second UWB base station 240 and the UWB tag 110; and the distance $S_5$ between the third UWB base station 250 and the UWB tag 110.

Figure 7:
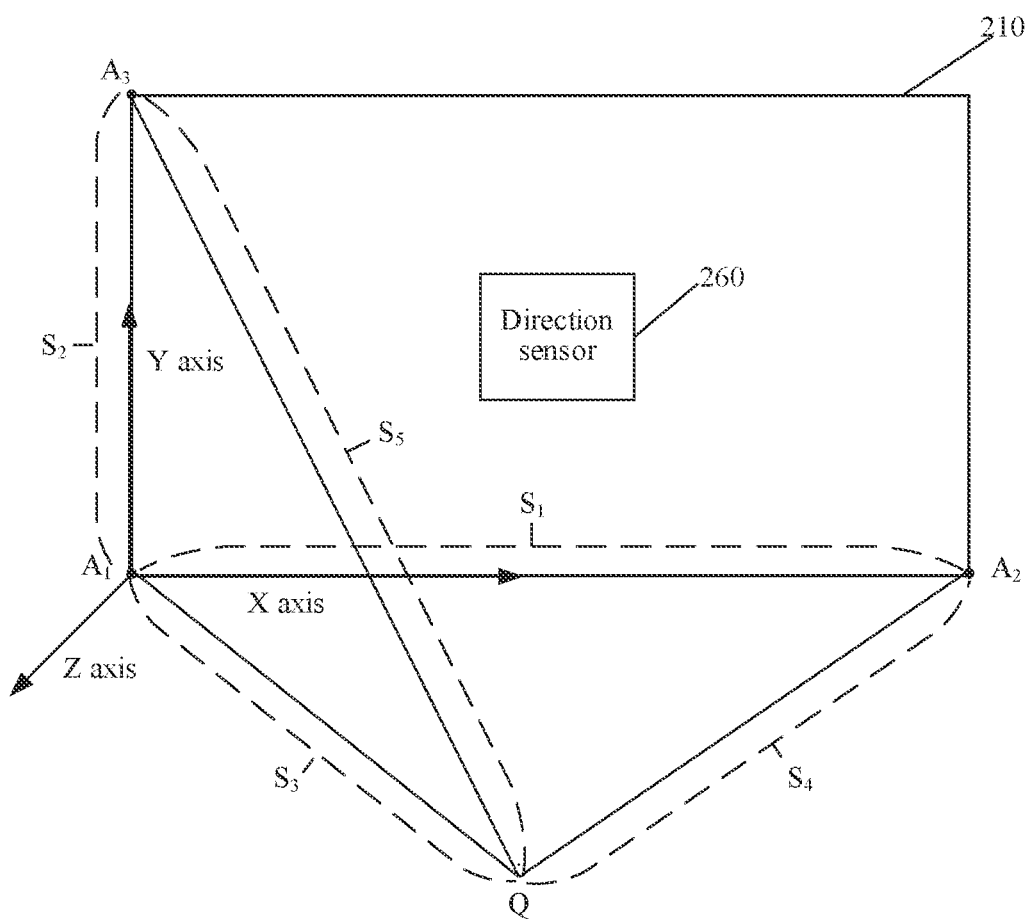
FIG. 7 is a schematic diagram of relative positions of an air mouse and an electronic device according to an embodiment.

For example, in this embodiment of this disclosure, FIG. 7 is a schematic diagram of a relative position relationship between the air mouse and the electronic device. FIG. 7 shows relative positions of an X axis, a Y axis, and a Z axis on the display screen of the electronic device. The Z axis is perpendicular to a surface of the display screen 210 of the electronic device, the X axis and the Y axis are on a same plane, and the Z axis is perpendicular to the plane on which the X axis and the Y axis lie.

As shown in FIG. 7, a point $A_j$ represents the position of the first UWB base station 230 on the display screen 210 (where the point $A_1$ may be any point on the first UWB base station 230), a point $A_2$ represents a position of the second UWB base station 240 on the display screen 210 (where the point $A_2$ may be any point on the second UWB base station 240), a point $A_3$ represents a position of the third UWB base station 250 on the display screen 210 (where the point $A_3$ may be any point on the third UWB base station 250), and a point Q represents a position of the air mouse, where the point Q may be any point on the air mouse (for example, any point on the UWB tag 110 disposed on the air mouse). $|A_1Q|$ represents the distance between the first UWB base station 230 and the UWB tag 110, namely, $S_3$ in FIG. 7; $|A_2Q|$ represents the distance between the second UWB base station 240 and the UWB tag 110, namely. $S_4$ in FIG. 7; $|A_3Q|$ represents the distance between the third UWB base station 250 and the UWB tag 110, namely, $S_5$ s in FIG. 7; $|A_4A_2|$ represents the distance between the first UWB base station 230 and the second UWB base station 240, namely, $S_1$ in FIG. 7; and $|A_1A_3|$ represents the distance between the first UWB base station 230 and the third UWB base station 250, namely, $S_2$ in FIG. 7. In this embodiment of this disclosure, position coordinates of the first UWB base station 230 are set to (0, 0, 0). In other words, in a coordinate system shown in FIG. 7, position coordinates of the point $A_1$ are (0, 0, 0).

In S310 to S360, when the distance is measured by using the UWB distance measurement principle, the electronic device controls the first UWB base station 230 on the display screen 210 of the electronic device to send a first distance measurement message to the second UWB base station 240. The second UWB base station 240 may send, based on the first distance measurement message, a first response message in response to the first distance measurement message to the first UWB base station 230. The electronic device may determine the distance $S_1$ between the first UWB base station 230 and the second UWB base station 240 based on a time difference between the first distance measurement message and the first response message, to further determine position coordinates of the second UWB base station 240 (namely, position coordinates of the point $A_2$ in the coordinate system shown in FIG. 7).

The electronic device controls the first UWB base station 230 on the display screen 210 of the electronic device to send a second distance measurement message to the third UWB base station 250. The third UWB base station 250 may send, based on the second distance measurement message, a second response message in response to the second distance measurement message to the first UWB base station 230. The electronic device may determine the distance $S_2$ between the first UWB base station 230 and the third UWB base station 250 based on a time difference between the second distance measurement message and the second response message, to further determine position coordinates of the third UWB base station 250 (namely, position coordinates of the point $A_3$ in the coordinate system shown in FIG. 7).

The electronic device controls the first UWB base station 230 on the display screen 210 of the electronic device to send a third distance measurement message to the UWB tag 110 on the air mouse. The UWB tag 110 on the air mouse may send, based on the third distance measurement message, a third response message in response to the third distance measurement message to the first UWB base station 230. The electronic device may determine the distance $S_1$ between the first UWB base station 230 and the UWB tag 110 (or the air mouse 100, where this is the same as a case below) based on a time difference between the third distance measurement message and the third response message.

The electronic device controls the second UWB base station 240 on the display screen 210 of the electronic device to send a fourth distance measurement message to the UWB tag 110 on the air mouse. The UWB tag 110 on the air mouse may send, based on the fourth distance measurement message, a fourth response message in response to the fourth distance measurement message to the second UWB base station 230. The electronic device may determine the distance $S_4$ between the second UWB base station 240 and the UWB tag 110 based on a time difference between the fourth distance measurement message and the fourth response message.

The electronic device controls the third UWB base station 250 on the display screen 210 of the electronic device to send a fifth distance measurement message to the UWB tag 110 on the air mouse. The UWB tag 110 on the air mouse may send, based on the fifth distance measurement message, a fifth response message in response to the fifth distance measurement message to the third UWB base station 230. The electronic device may determine the distance $S_5$ between the third UWB base station 250 and the UWB tag 110 based on a time difference between the fifth distance measurement message and the fifth response message.

The electronic device may further determine position coordinates of the UWB tag 110 (namely, position coordinates of the point Q in the coordinate system shown in FIG. 7) based on $S_3$ to $S_5$.

After determining $S_1$ to $S_5$ and the relative position coordinates of the first UWB base station 230, the second UWB base station 240, the third UWB base station 250, and the UWB tag 110, the electronic device may further determine a relative position relationship between the first UWB base station 230, the second UWB base station 240, the third UWB base station 250, and the UWB tag 110. The electronic device may determine values of the first included angle to the fourth included angle based on the distance between the UWB tag 110 and each of the first UWB base station 230, the second UWB base station 240, and the third UWB base station 250, the distance between the first UWB base station 230 and each of the second UWB base station 240 and the third UWB base station 250, and the relative position relationship. The following specifically describes a process in which the electronic device determines the values of the first included angle to the fourth included angle.

It should be understood that, in this embodiment of this disclosure, the distances $S_1$ to $S_5$ may be periodically measured. For example, calculation is performed every 20 ms. It should be understood that, in this embodiment of this disclosure, a length of a periodicity for calculating the distances $S_1$ to $S_5$ is not limited, and a value of the periodicity may alternatively be another time length. This is not limited herein in this embodiment of this disclosure. For example, the value of the periodicity may be predefined.

In S370, in this embodiment of this disclosure, the first included angle (represented by α) is the included angle between the perpendicular between the air mouse and the display screen and the connecting line between the air mouse and the third edge (the left edge), and the second included angle (represented by D) is the included angle between the perpendicular between the air mouse and the display screen and the connecting line between the air mouse and the fourth edge (the right edge).

The perpendicular between the air mouse and the plane of the display screen (or from the air mouse to the plane of the display screen) may be understood as follows: A perpendicular is constructed from any point on the air mouse 100 (for example, any point on the UWB tag on the air mouse or a central point at top of the air mouse) as an endpoint (denoted as a point Q) of a line segment to the plane of the display screen 210, where an intersection point between the perpendicular and the display screen 210 is the other endpoint (denoted as a point P) of the line segment, and a line segment QP is the perpendicular between the air mouse and the plane of the display screen (or from the air mouse to the plane of the display screen). In other words, the air mouse may be considered as a point, a perpendicular is constructed from the point to the plane of the display screen, and the perpendicular is the perpendicular between the air mouse and the plane of the display screen, where the perpendicular between the air mouse and the plane of the display screen is perpendicular to the display screen. The line segment QP shown in FIG. 8 is the perpendicular between the air mouse 100 and the plane of the display screen 210 (or from the air mouse 100 to the plane of the display screen 210).

The connecting line between the air mouse 100 and the third edge (the left edge) of the display screen 210 may be understood as: A straight line (where the straight line is in the horizontal direction) that is parallel to the first edge (the upper edge) or the second edge (the lower edge) and that passes through a point P is constructed, where the point P is the intersection point between the display screen and the perpendicular between the air mouse 100 and the plane of the display screen 210. As shown in FIG. 8, an intersection point between the straight line and the third edge (the left edge) is denoted as W, and an intersection point between the straight line and the fourth edge (the right edge) is denoted as N. In this case, the connecting line between the air mouse 100 and the third edge (the left edge) may be understood as: a connecting line between the point Q and the point W, namely, a line segment QW. The connecting line between the air mouse 100 and the fourth edge (the right edge) may be understood as, a connecting line between the point Q and the point N, namely, a line segment QN. The line segment QW shown in FIG. 8 is the connecting line between the air mouse 100 and the third edge (the left edge), and the line segment QN is the connecting line between the air mouse 100 and the fourth edge (the left edge). As shown in FIG. 8, the first included angle α is ∠PQW, and the second included angle β is ∠PQN.

Figure 8:
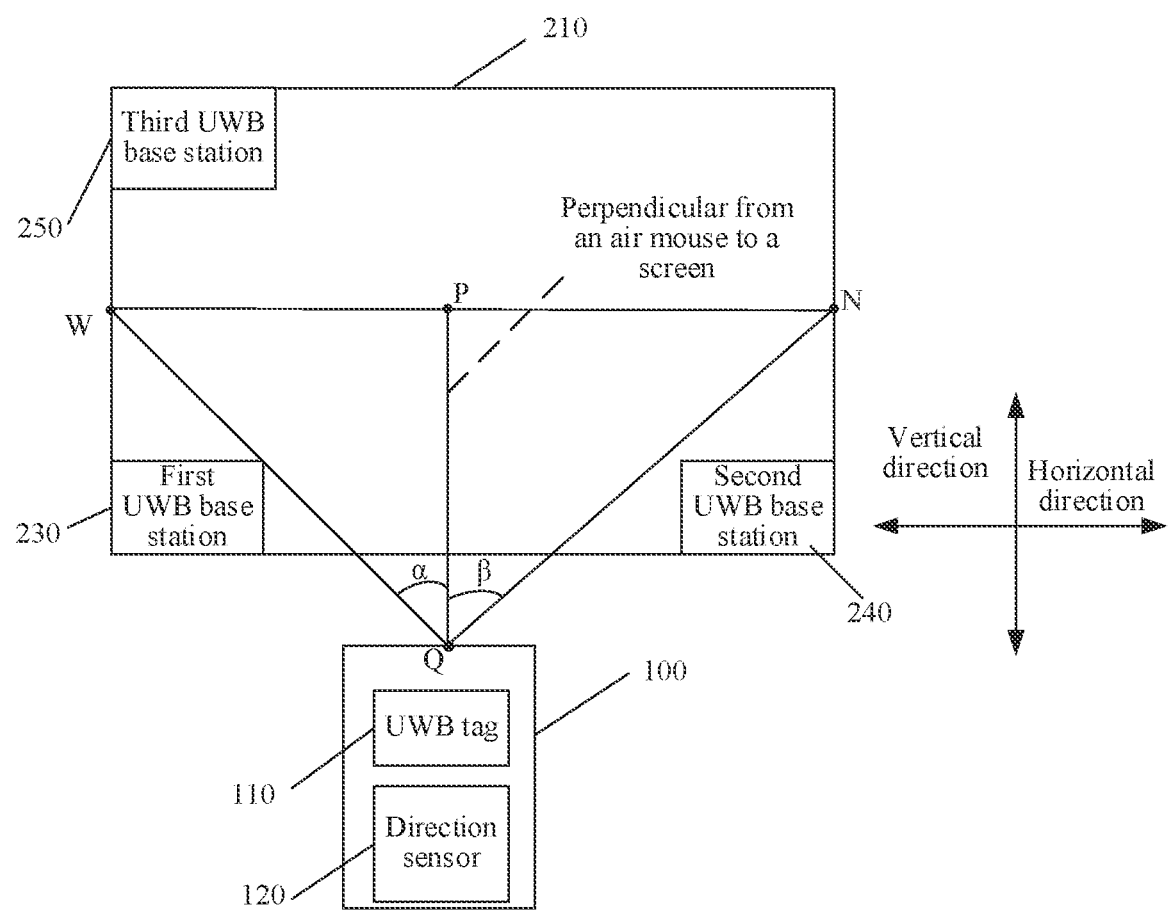
FIG. 8 is a schematic diagram of a first included angle α and a second included angle s according to an embodiment.

The first included angle α and the second included angle β may be understood as: a largest angle at which the air mouse rotates leftward and a largest angle at which the air mouse rotates rightward when the air mouse is located at a position shown in FIG. 8 (in other words, coordinates remain unchanged), to control the cursor on the display screen in a horizontal direction dimension of the display screen. A positive value indicates leftward rotation, and a negative value indicates rightward rotation. For example, if the first included angle α is +75° (also referred to as +75 degrees), and the second included angle β is −40° (also referred to as −40 degrees), it indicates that the largest angle at which the air mouse rotates leftward and the largest angle at which the air mouse rotates rightward when the air mouse is located at the position shown in FIG. 8 (in other words, the coordinates remain unchanged) are respectively 75 degrees and 40 degrees, to control the cursor on the display screen in the horizontal direction dimension of the display screen.

Figure 9:
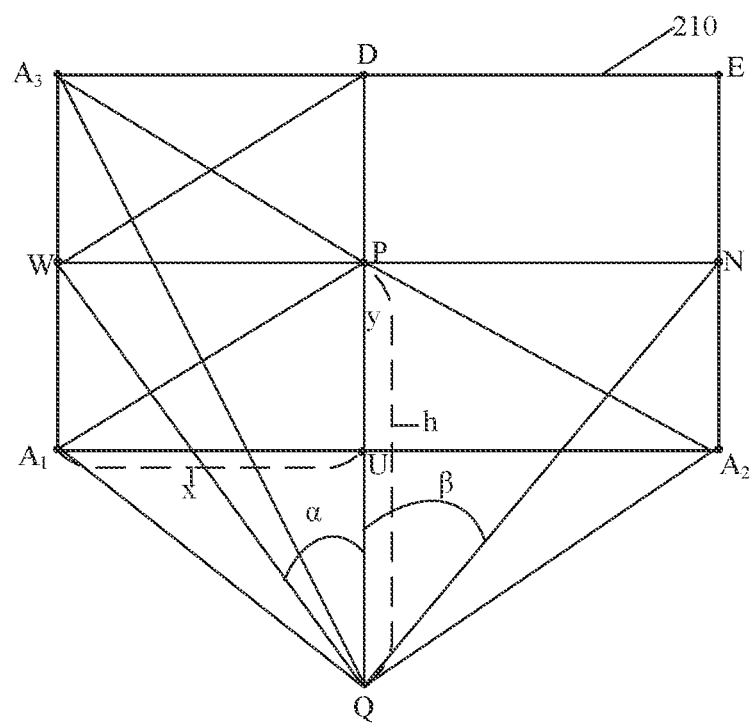
FIG. 9 is a schematic diagram of a process of determining a first included angle α and a second included angle β according to an embodiment.

FIG. 9 is a schematic diagram of a process of determining the first included angle α and the second included angle β based on the distances $S_1$ to $S_5$ and the relative position relationship. As shown in FIG. 9, a point $A_1$ represents a position of the first UWB base station 230 on the display screen 210 (where the point $A_1$ may be any point on the first UWB base station 230), a point $A_2$ represents a position of the second UWB base station 240 on the display screen 210 (where the point $A_2$ may be any point on the second UWB base station 240), a point $A_3$ represents a position of the third UWB base station 250 on the display screen 210 (where the point $A_3$ may be any point on the third UWB base station 250), and a point Q represents a position of the air mouse 100, where the point Q is any point on the air mouse 100 (for example, any point on the UWB tag 110 on the air mouse 100). A point P represents the intersection point between the display screen 210 and the perpendicular between the air mouse 100 and the display screen 210. A line segment QP represents the perpendicular between the air mouse 100 and the plane of the display screen 210. The line segment QP is perpendicular to the display screen 210, and h represents a length of the line segment QP. A perpendicular from the point P to the lower edge (namely, a line segment $A_1A_2$) of the display screen 210 is constructed, and an intersection point between the perpendicular from the point P to the lower edge of the display screen 210 and the lower edge of the display screen 210 is a point U. Herein, y represents a length of a line segment PU. The line segment PU is perpendicular to the line segment $A_1A_2$. Herein, x represents a length of a line segment $A_1U$. $|A_1Q|$ represents the distance between the first UWB base station 230 and the UWB tag 110, namely, $S_1$; $|A_2Q|$ represents the distance between the second UWB base station 240 and the UWB tag 110, namely, $S_4$; $|A_3Q|$ represents the distance between the third UWB base station 250 and the UWB tag 110, namely, $S_5$; $|A_1A_2|$ represents the distance between the first UWB base station 230 and the second UWB base station 240, namely, $S_1$; and $|A_1A_3|$ represents the distance between the first UWB base station 230 and the third UWB base station 250, namely, $S_2$.

As shown in FIG. 9, an intersection point between a perpendicular from the point P to the left edge of the display screen 210 and the left edge of the display screen 210 is W, and a line segment PW is perpendicular to a line segment $A_3A_1$. An intersection point between a perpendicular from the point P to the right edge of the display screen 210 and the right edge of the display screen 210 is N, and a line segment PN is perpendicular to a line segment $A_2E$. A perpendicular from the point P to the upper edge (namely, a line segment $A_3E$) of the display screen 210 is constructed, an intersection point between the perpendicular from the point P to the upper edge of the display screen 210 and the upper edge of the display screen 210 is a point D. and a line segment PD is perpendicular to a line segment $A_3E$. A triangle $A_3PQ$ is a right triangle, and $\angle A_3PQ$ is a right angle. The point W and the point D are connected to form a line segment WD, where a triangle WPD is a right triangle, and $\angle WPD$ is a right angle. A triangle WPQ is a right triangle, and $\angle WPQ$ is a right angle. A triangle NPQ is a right triangle, and $\angle NPQ$ is a right angle. $A_1$ and P are connected to construct an auxiliary line, and $A_2$ and P are connected to construct an auxiliary line. A triangle $A_1PU$ is a right triangle, and $\angle A_1UP$ is a right angle. A triangle $A_1PQ$ is a right triangle, and $\angle A_1PQ$ is a right angle. A triangle $A_2PU$ is a right triangle, and $\angle A_2UP$ is a right angle. A triangle $A_2PQ$ is a right triangle, and $\angle A_2PQ$ is a right angle. A quadrangle $WPUA_1$ is a rectangle, and a quadrangle $NPUA_2$ is a rectangle. A quadrangle $WPDA_3$ is a rectangle. A length of the line segment WD is equal to a length of a line segment $A_3P$.

In the example shown in FIG. 9, there are the following formulas:

$$x^2 + y^2 = |A_1Q|^2 - h^2 \qquad (2)$$

$$x^2 + (|A_1A_3| - y)^2 = |A_1Q|^2 - h^2 \qquad (3)$$

$$y^2 + (|A_1A_2| - x)^2 = |A_2Q|^2 - h^2 \qquad (4)$$

A formula (5) is obtained by subtracting the formula (4) from the formula (2):

$$x^2 - (|A_1A_2| - x)^2 = |A_1Q|^2 - |A_2Q|^2 \qquad (5)$$

The formula (5) is simplified to obtain a formula (6):

$$x = \frac{|A_1Q|^2 - |A_2Q|^2 + |A_1A_2|^2}{2 \times |A_1A_2|} \qquad (6)$$

A formula (7) is obtained by subtracting the formula (3) from the formula (2):

$$y^2 - (|A_1A_3| - y)^2 = |A_1Q|^2 - |A_3Q|^2 \qquad (7)$$

The formula (7) is simplified to obtain a formula (8):

$$y = \frac{|A_1Q|^2 - |A_3Q|^2 + |A_1A_3|^2}{2 \times |A_1A_3|} \qquad (8)$$

In this way, values of x and y are obtained.

According to a trigonometric function relationship, in the right triangle WPQ, because a length segment WP is also x, the following formula (9) exists:

$$\sin(\alpha) = \frac{x}{|WQ|} = \frac{x}{\sqrt{x^2 + h^2}} \qquad (9)$$

A formula (10) is obtained according to the formula (2) and the formula (9):

$$\sin(\alpha) = \frac{x}{\sqrt{|A_1Q|^2 - y^2}} \qquad (10)$$

According to the trigonometric function relationship, in the right triangle NPQ, because a length of a line segment NP is $||A_1A_2|-x|$, the following formula (11) exists:

$$\sin(\beta) = \frac{|A_1A_2|-x}{|NQ|} = \frac{|A_1A_2|-x}{\sqrt{(|A_1A_2|-x)^2 + h^2}} \quad (11)$$

A formula (12) is obtained according to the formula (4) and the formula (11):

$$\sin(\beta) = \frac{|A_1A_2|-x}{\sqrt{|A_2Q|^2 - y^2}} \quad (12)$$

In this case, the values of the first included angle α and the second included angle β may be determined, as presented in a formula (13) and a formula (14):

$$\alpha = \arcsin\left(\frac{x}{\sqrt{|A_1Q|^2 - y^2}}\right) \quad (13)$$

$$\beta = \arcsin\left(\frac{|A_1A_2|-x}{\sqrt{|A_2Q|^2 - y^2}}\right) \quad (14)$$

x and y are essentially an X-axis coordinate and a Y-axis coordinate of the point Q respectively. In other words, x and y may be considered as an X-axis coordinate and a Y-axis coordinate of the air mouse 100 respectively, or may be considered as an X-axis coordinate and a Y-axis coordinate of the UWB tag 110 respectively.

As shown in FIG. 9, the first included angle α is equivalent to an angle obtained by rotating the line segment QP anticlockwise to a position of a line segment QW, and the second included angle β is equivalent to an angle obtained by rotating the line segment QP clockwise to a position of a line segment QN. Therefore, optionally, in this embodiment of this disclosure, a value of α may be defined as a positive value, and a value of β may be defined as a negative value. For example, α may be +75° (also referred to as +75 degrees), and β is −40° (also referred to as −40 degrees). If the air mouse 100 is considered as a point and perpendicularly projected to the display screen 210, and a projection position of the air mouse 100 on the display screen 210 is at the center of the display screen 210 (in other words, the point P is at the center of the display screen 210, and the length of the line segment WP is equal to a length of the line segment PN), an absolute value of β is equal to an absolute value of α. For example, α may be +60°, and β is −60°. If the air mouse 100 is considered as a point and perpendicularly projected to the display screen 210, and a projection position of the air mouse 100 on the display screen 210 is not at the center of the display screen 210, an absolute value of β is not equal to an absolute value of α. For example, if the air mouse 100 is considered as a point and perpendicularly projected to the display screen 210, and a projection position of the air mouse 100 on the display screen 210 is close to the left edge of the display screen 210, in other words, the length of the line segment WP is less than a length of the line segment PN, an absolute value of β is greater than an absolute value of α. For example, α may be +45°, and β is −60°. If the air mouse 100 is considered as a point and perpendicularly projected to the display screen 210, and a projection position of the air mouse 100 on the display screen 210 is close to the right edge of the display screen 210, in other words, the length of the line segment WP is greater than a length of the line segment PN, an absolute value of β is less than an absolute value of α. For example, α may be +65°, and β is −45°. In other words, the second included angle β may be a negative value, and the first included angle α may be a positive value.

It should be further understood that in embodiments of this disclosure, the first included angle α and the second included angle β may be understood as the largest angle at which the air mouse rotates leftward and the largest angle at which the air mouse rotates rightward when the air mouse is located at the position shown in FIG. 8 or FIG. 9 (in other words, the coordinates remain unchanged), to control the cursor on the display screen in the horizontal direction dimension of the display screen. The positive value indicates the leftward rotation, and the negative value indicates the rightward rotation. The electronic device may determine an included angle range based on the first included angle α and the second included angle, where the included angle range is [β,α]. The included angle range represents an angle range in which the air mouse rotates leftward and rightward in the horizontal direction dimension of the display screen when the X-axis coordinate and a Z-axis coordinate of the air mouse remain unchanged, to control leftward and rightward movement of the cursor on the display screen. For example, α is +75°, and β is −40°. In this case, the included angle range is [−40°,+75°]. In other words, any angle that is greater than or equal to −40° and less than or equal to +75° is within the included angle range.

It should be further understood that in embodiments of this disclosure, for negative-angle comparison, for example, for comparison between two negative angles, a larger absolute value of a negative angle indicates a smaller negative angle. For example, −40°>−50°, and −40°<−30°. In this case, −30°∈[(−40°,+75°], and −50°∈[−40°,+75°].

Optionally, in embodiments of this disclosure, both the value of α and the value of β may be defined as positive values, where the value of α is greater than the value of β.

In this embodiment of this disclosure, the third included angle (represented by δ) is the included angle between the perpendicular between the air mouse and the display screen and the connecting line between the air mouse and the first edge, and the fourth included angle (represented by ε) is the included angle between the perpendicular between the air mouse and the display screen and the connecting line between the air mouse and the second edge. For descriptions of the perpendicular between the air mouse and the display screen, refer to the foregoing descriptions of the perpendicular between the air mouse and the plane of the display screen (or from the air mouse to the plane of the display screen). Details are not described herein again. A line segment QP shown in FIG. 10 is the perpendicular between the air mouse 100 and the plane of the display screen 210 (or from the air mouse 100 to the plane of the display screen 210).

The connecting line between the air mouse 100 and the first edge (the upper edge) of the display screen 210 may be understood as: A straight line (where the straight line is in the horizontal direction) that is parallel to the third edge (the left edge) or the fourth edge (the right edge) and that passes through the point P is constructed, where the point P is the intersection point between the display screen and the perpendicular between the air mouse 100 and the plane of the display screen 210. As shown in FIG. 10, an intersection point between the straight line and the first edge (the upper edge) is denoted as D, and an intersection point between the straight line and the second edge (the lower edge) is denoted as U. In this case, the connecting line between the air mouse 100 and the first edge (the upper edge) may be understood as: a connecting line between the point Q and the point D, namely, a line segment QD. The connecting line between the air mouse 100 and the second edge (the lower edge) may be understood as: a connecting line between the point Q and the point U, namely, a line segment QU. The line segment QD shown in FIG. 10 is the connecting line between the air mouse 100 and the first edge (the upper edge), and the line segment QU is the connecting line between the air mouse 100 and the second edge (the lower edge). As shown in FIG. 10, the third included angle δ is ∠PQD, and the fourth included angle ε is ∠LPQU.

Figure 10:
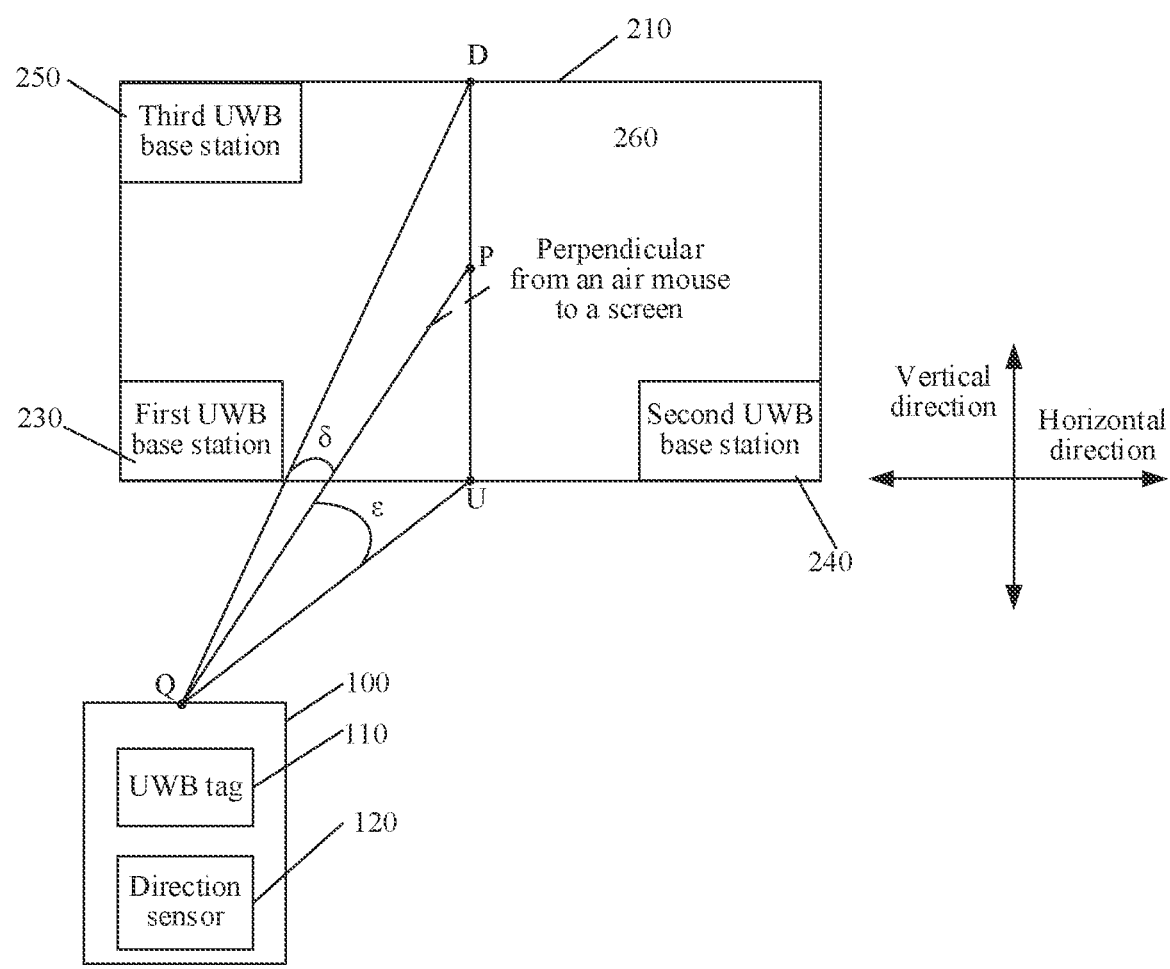
FIG. 10 is a schematic diagram of a third included angle δ and a fourth included angle s according to an embodiment.

The third included angle δ and the fourth included angle ε may be understood as: a largest angle at which the air mouse rotates upward and a largest angle at which the air mouse rotates downward when the air mouse is located at a position shown in FIG. 10 (in other words, coordinates remain unchanged), to control the cursor on the display screen in a vertical direction dimension of the display screen. A positive value indicates upward rotation, and a negative value indicates downward rotation. FIG. 10 is a schematic diagram of the third included angle δ and the fourth included angle s.

Figure 11:
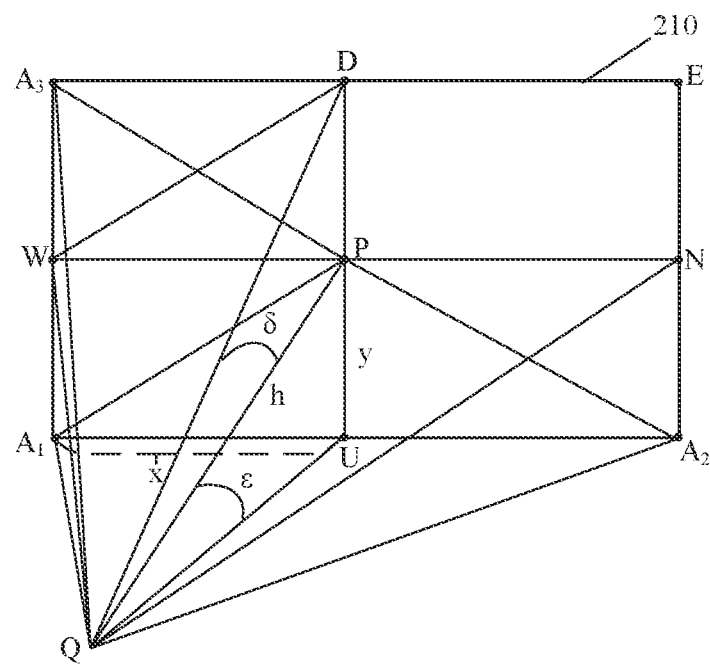
FIG. 11 is a schematic diagram of a process of determining a third included angle δ and a fourth included angle ε according to an embodiment.

FIG. 11 is a schematic diagram of a process in which the electronic device determines the third included angle δ and the fourth included angle E based on the distances $S_1$ to $S_5$ and the relative position relationship. As shown in FIG. 11, a point $A_1$ represents a position of the first UWB base station 230 on the display screen 210 (where the point $A_1$ may be any point on the first UWB base station 230), a point $A_2$ represents a position of the second UWB base station 240 on the display screen 210 (where the point $A_2$ may be any point on the second UWB base station 240), a point $A_3$ represents a position of the third UWB base station 250 on the display screen 210 (where the point $A_3$ may be any point on the third UWB base station 250), and a point Q represents a position of the air mouse 100, where the point Q may be any point on the air mouse 100 (for example, any point on the UWB tag 110 included by the air mouse 100). A point P represents the intersection point between the display screen 210 and the perpendicular between the air mouse 100 and the display screen 210. A line segment QP represents the perpendicular between the air mouse 100 and the plane of the display screen 210. The line segment QP is perpendicular to the display screen 210, and h represents a length of the line segment QP. A perpendicular from the point P to the lower edge (namely, a line segment $A_1A_2$) of the display screen 210 is constructed, and an intersection point between the perpendicular from the point P to the lower edge of the display screen 210 and the lower edge of the display screen 210 is a point U. Herein, y represents a length of a line segment PU. The line segment PU is perpendicular to the line segment $A_1A_2$. Herein, x represents a length of a line segment $A_1U$.

As shown in FIG. 11. $|A_1Q|$ represents the distance between the first UWB base station 230 and the UWB tag 110, namely, $S_3$; $|A_2Q|$ represents the distance between the second UWB base station 240 and the UWB tag 110, namely, $S_4$; $|A_3Q|$ represents the distance between the third UWB base station 250 and the UWB tag 110, namely, $S_5$; $|A_1A_2|$ represents the distance between the first UWB base station 230 and the second UWB base station 240, namely, $S_1$; and $|A_1A_3|$ represents the distance between the first UWB base station 230 and the third UWB base station 250, namely, $S_2$. A perpendicular from the point P to the upper edge (namely, a line segment $A_3E$) of the display screen 210 is constructed, an intersection point between the perpendicular from the point P to the upper edge of the display screen 210 and the upper edge of the display screen 210 is a point D, and a line segment PD is perpendicular to the line segment $A_3E$. An intersection point between a perpendicular from the point P to the left edge of the display screen 210 and the left edge of the display screen 210 is W, and a line segment PW is perpendicular to a line segment $A_3A_1$. An intersection point between a perpendicular from the point P to the right edge of the display screen 210 and the right edge of the display screen 210 is N, and a line segment PN is perpendicular to a line segment $A_2E$.

In FIG. 11, $A_1$ and P are connected to construct an auxiliary line, a triangle $A_1PU$ is a right triangle, and ∠$A_1UP$ is a right angle. $A_2$ and P are connected to construct an auxiliary line, a triangle $A_2PU$ is a right triangle, and ∠$A_2UP$ is a right angle. A triangle $A_1PQ$ is a right triangle, and ∠$A_1PQ$ is a right angle. A triangle $A_2PQ$ is a right triangle, and ∠$A_2PQ$ is a right angle. A triangle QPU is a right triangle, and ∠QPU is a right angle. A triangle QPD is a right triangle, and ∠QPD is a right angle.

In FIG. 11, a triangle WPQ is a right triangle, and ∠WPQ is a right angle. A triangle NPQ is a right triangle, and ∠NPQ is a right angle. $A_1$ and P are connected to construct the auxiliary line, and $A_2$ and P are connected to construct the auxiliary line. The triangle $A_1PU$ is the right triangle, and ∠$A_1UP$ is the right angle. The triangle $A_1PQ$ is the right triangle, and ∠$A_1PQ$ is the right angle. The triangle $A_2PU$ is the right triangle, and ∠$A_2UP$ is the right angle. The triangle $A_2$ PQ is the right triangle, and ∠$A_2PQ$ is the right angle. A quadrangle $WPUA_1$ is a rectangle. A quadrangle $NPUA_2$ is a rectangle. A quadrangle $WPDA_3$ is a rectangle. A length of a line segment WD is equal to a length of a line segment $A_3P$.

In the example shown in FIG. 11, there are the following formulas:

$$x^2 + y^2 = |A_1Q|^2 - h^2 \quad (2)$$

$$x^2 + (|A_1A_3| - y)^2 = |A_3Q|^2 - h^2 \quad (3)$$

$$y^2 + (|A_1A_2| - x)^2 = |A_2Q|^2 - h^2 \quad (4)$$

A formula (15) is obtained by subtracting the formula (3) from the formula (2):

$$y^2 - (|A_1A_3| - y)^2 = |A_1Q|^2 - |A_3Q|^2 \quad (15)$$

The formula (15) is simplified to obtain a formula (16):

$$y = \frac{|A_1Q|^2 - |A_3Q|^2 + |A_1A_3|}{2 \times |A_1A_3|} \quad (16)$$

A value of x may be calculated by using the foregoing formula (6).

In this way, values of x and y can be obtained.

According to the trigonometric function relationship, in a right triangle DPQ, because a length of a line segment DP is $||A_1A_1|-y|$, the following formula (17) exists:

$$\sin(\delta) = \frac{|A_1A_3| - y}{|DQ|} = \frac{|A_1A_3| - y}{\sqrt{(|A_1A_3| - y)^2 + h^2}} \quad (17)$$

A formula (18) is obtained according to the formula (3) and the formula (17):

$$\sin(\delta) = \frac{|A_1A_3| - y}{\sqrt{|A_3Q|^2 - x^2}} \quad (18)$$

According to the trigonometric function relationship, in a right triangle PQU, because the length of the line segment PU is y, the following formula (19) exists:

$$\sin(\varepsilon) = \frac{y}{|QU|} = \frac{y}{\sqrt{y^2 + h^2}} \quad (19)$$

A formula (20) is obtained according to the formula (2) and the formula (19):

$$\sin(\varepsilon) = \frac{y}{\sqrt{|A_1Q|^2 - x^2}} \quad (20)$$

The values of the third included angle δ and the fourth included angle ε may be determined according to the foregoing formula (18) and formula (20), as presented in the formula (21) and the formula (22):

$$\delta = \arcsin\left(\frac{|A_1A_3| - y}{\sqrt{|A_3Q|^2 - x^2}}\right) \quad (21)$$

$$\varepsilon = \sin\left(\frac{y}{\sqrt{|A_1Q|^2 - x^2}}\right) \quad (22)$$

x and y are essentially an X-axis coordinate and a Y-axis coordinate of the point Q respectively. In other words, x and y may be considered as an X-axis coordinate and a Y-axis coordinate of the air mouse 100 respectively, or may be considered as an X-axis coordinate and a Y-axis coordinate of the UWB tag 110 respectively.

As shown in FIG. 11, the third included angle δ is equivalent to an angle obtained by rotating the line segment QP anticlockwise to a position of a line segment QD, and the fourth included angle ε is equivalent to an angle obtained by rotating the line segment QP clockwise to a position of a line segment QU. Therefore, in this embodiment of this disclosure, the value of S may be defined as a positive value, and the value of s may be defined as a negative value. For example, 5 may be +45° (which may be also referred to as +45 degrees), and E is −50° (which may also be referred to as −50 degrees). If the air mouse 100 is considered as a point and perpendicularly projected to the display screen 210, and a projection position of the air mouse 100 on the display screen 210 is at the center of the display screen 210 (in other words, the point P is at the center of the display screen 210, and the length of the line segment DP is equal to the length of the line segment PU), an absolute value of S is equal to an absolute value of ε. For example, δ may be +60°, and ε is −60°. If the air mouse 100 is considered as a point and perpendicularly projected to the display screen 210, and a projection position of the air mouse 100 on the display screen 210 is not at the center of the display screen 210 (in other words, the point P is not at the center of the display screen 210, and the length of the line segment DP is not equal to the length of the line segment PU), an absolute value of S is not equal to an absolute value of c. For example, if a projection position of the air mouse 100 on the display screen 210 is close to the upper edge of the display screen 210, and the length of the line segment DP is less than the length of the line segment PU, an absolute value of s is greater than an absolute value of δ. For example, δ may be +30°, and a is −70°. If a projection position of the air mouse 100 on the display screen 210 is close to the lower edge of the display screen 210, and the length of the line segment DP is greater than the length of the line segment PU, an absolute value of ε is less than an absolute value of δ. For example, δ may be +65°, and ε is −45°. In other words, the fourth included angle s may be a negative value, and the third included angle δ may be a positive value.

It should be further understood that, in this embodiment of this disclosure, the third included angle δ and the fourth included angle E are a largest angle at which the air mouse rotates upward and a largest angle at which the air mouse rotates downward when the air mouse is located at the position shown in FIG. 10 or FIG. 11 (in other words, the coordinates remain unchanged), to control the cursor on the display screen in the vertical direction dimension of the display screen. The positive value indicates the upward rotation, and the negative value indicates the downward rotation.

An included angle range may be determined based on the third included angle δ and the fourth included angle ε, and the included angle range is [ε,δ]. The included angle range represents an angle range in which the air mouse rotates upward and downward in the vertical direction dimension of the display screen when the Y-axis coordinate and the Z-axis coordinate of the air mouse remain unchanged, to control upward and downward movement of the cursor on the display screen. For example, δ is +45°, and ε is −50°. In this case, the included angle range is [−50°,+45°]. In other words, any angle that is greater than or equal to −50° and less than or equal to +50° is within the included angle range.

Optionally, in this embodiment of this disclosure, both the value of δ and the value of ε may be defined as positive values. The value of δ is greater than the value of ε.

After the electronic device determines the first included angle α, the second included angle β, the third included angle δ, and the fourth included angle ε, and after the air mouse rotates (or moves), the electronic device may obtain an actual angle at which the air mouse rotates, and may determine whether the actual angle at which the air mouse rotates falls within the included angle range determined based on the first included angle α and the second included angle β and the included angle range determined based on the third included angle δ and the fourth included angle ε, to determine whether the air mouse can control movement of the cursor on the display screen, in other words, whether the cursor on the display screen can move with the rotation of the air mouse.

It should be understood that, in this embodiment of this disclosure, the electronic device may periodically calculate the values of the first included angle α, the second included angle β, the third included angle δ, and the fourth included angle ε. For example, calculation is performed every 20 ms. It should be understood that, in this embodiment of this disclosure, a value of α periodicity for calculating the values of the first included angle α, the second included angle β, the third included angle δ, and the fourth included angle ε is not limited. The value of the periodicity may alternatively be another time length. This is not limited herein in this embodiment of this disclosure. Optionally, the value of the periodicity may be predefined.

The following describes a process in which the electronic device determines the actual angle at which the air mouse rotates, namely, a process of S380 and S390.

First, a concept of a Euler angle is briefly described. Euler angles include: a yaw angle, a pitch angle, and a roll angle.

Figure 12:
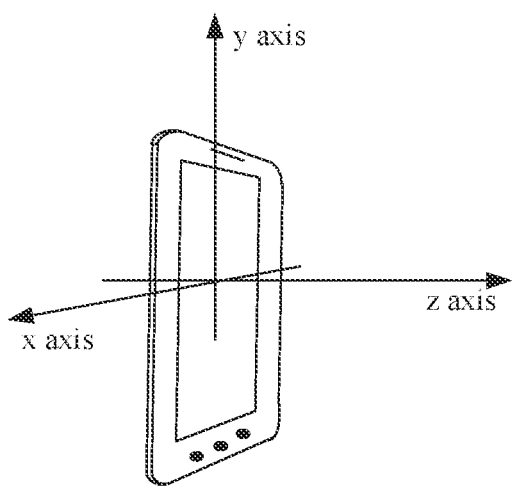
FIG. 12 is a schematic diagram of reference coordinate axes according to an embodiment.

FIG. 12 uses a mobile phone as an example to describe meanings of the yaw angle (represented by γ), the pitch angle (represented by η), and the roll angle (represented by θ). In FIG. 12, a y axis and an x axis are directions parallel to a plane of a display screen of the mobile phone, and a z axis is a direction perpendicular to the display screen of the mobile phone. The y axis is a direction of a length of the mobile phone, and the x axis is a direction of a width of the mobile phone.

Figure 13:
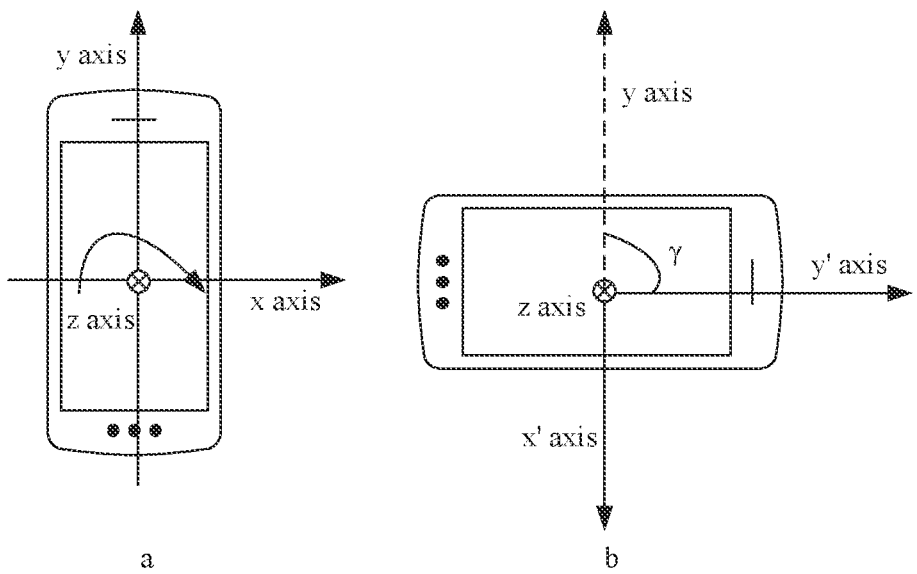
FIG. 13 is a schematic diagram of a yaw angle according to an embodiment.

The yaw angle γ represents an angle at which the mobile phone rotates about the z axis shown in FIG. 12. FIG. 13 is a schematic diagram showing that the mobile phone rotates (rotates) about the z axis in FIG. 12 by 90 degrees. Herein, a in FIG. 13 is a schematic diagram in which the mobile phone has not rotated about the z axis, and b in FIG. 13 is a schematic diagram in which the mobile phone has rotated about the z axis. After the mobile phone rotates about the z axis (where a direction indicated by an arrow on the z axis in a in FIG. 13 is a rotation direction of the mobile phone), a position of a y axis changes to a position of a y' axis in b in FIG. 13, a position of an x axis changes to a position of an x' axis in b in FIG. 13, and a value of γ is equivalent to an included angle that is of the y axis and that is obtained through the rotation of the mobile phone about the z axis (namely, an included angle between the y axis and the y' axis in b in FIG. 13). Rotation of the mobile phone about the z axis by 0 degrees indicates a north direction (North), rotation of the mobile phone about the z axis by 90 degrees indicates an east direction (East), rotation of the mobile phone about the z axis by 180 degrees indicates a south direction (South), and rotation of the mobile phone about the z axis by 270 degrees indicates a west direction (West).

Figure 14:
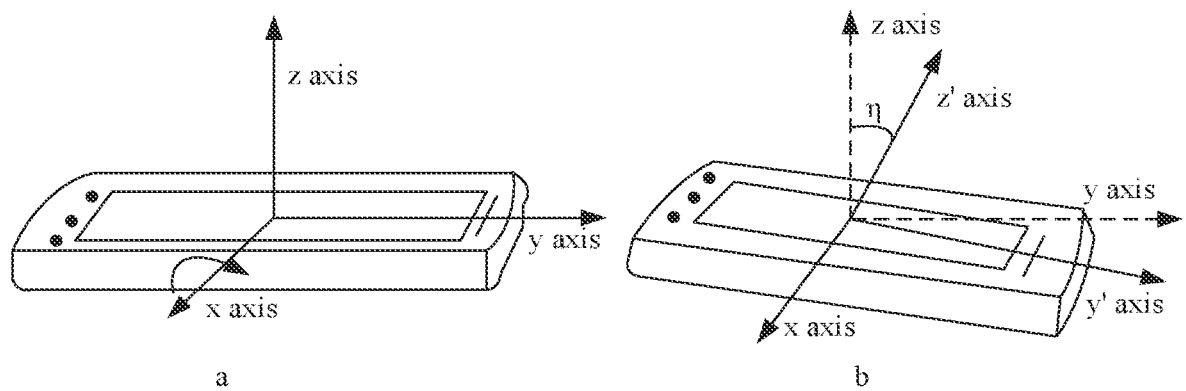
FIG. 14 is a schematic diagram of a pitch angle according to an embodiment.

The pitch angle r) is an angle at which the mobile phone rotates or rotates about the x axis in FIG. 12. A value of the pitch angle changes when the mobile phone rotates or rotates about the x axis. FIG. 14 is a schematic diagram showing that the mobile phone rotates about the x axis in FIG. 12. As shown in FIG. 14, a in FIG. 14 is a schematic diagram in which the mobile phone has not rotated about the x axis, and b in FIG. 14 is a schematic diagram in which the mobile phone has rotated about the x axis. After the mobile phone rotates about the x axis (where a direction indicated by an arrow on the x axis in a in FIG. 14 is a rotation direction of the mobile phone), a position of a z axis changes to a position of a z' axis in b in FIG. 14, a position of a y axis changes to a position of a y' axis in b in FIG. 14, and the value of q is equivalent to an included angle that is of the z axis and that is obtained through the rotation of the mobile phone about the x axis (an included angle between the z axis and the z' axis in b in FIG. 14). A value range of the pitch angle η is [−180°, 180°]. For example, if the mobile phone is placed on a desktop and the desktop is completely horizontal, the value of q is 0 degrees. The mobile phone is raised from top until the mobile phone rotates about the x axis by 180 degrees. In this case, the display screen of the mobile phone faces downward and touches the desktop horizontally. During the rotation, the value of q changes from 0 degrees to −180 degrees. In other words, when the mobile phone is raised, the value of q gradually decreases until the value is equal to −180 degrees. If the mobile phone is raised from bottom until the mobile phone rotates about the x axis by 180 degrees, the value of q changes from 0 degrees to 180 degrees.

Figure 15:
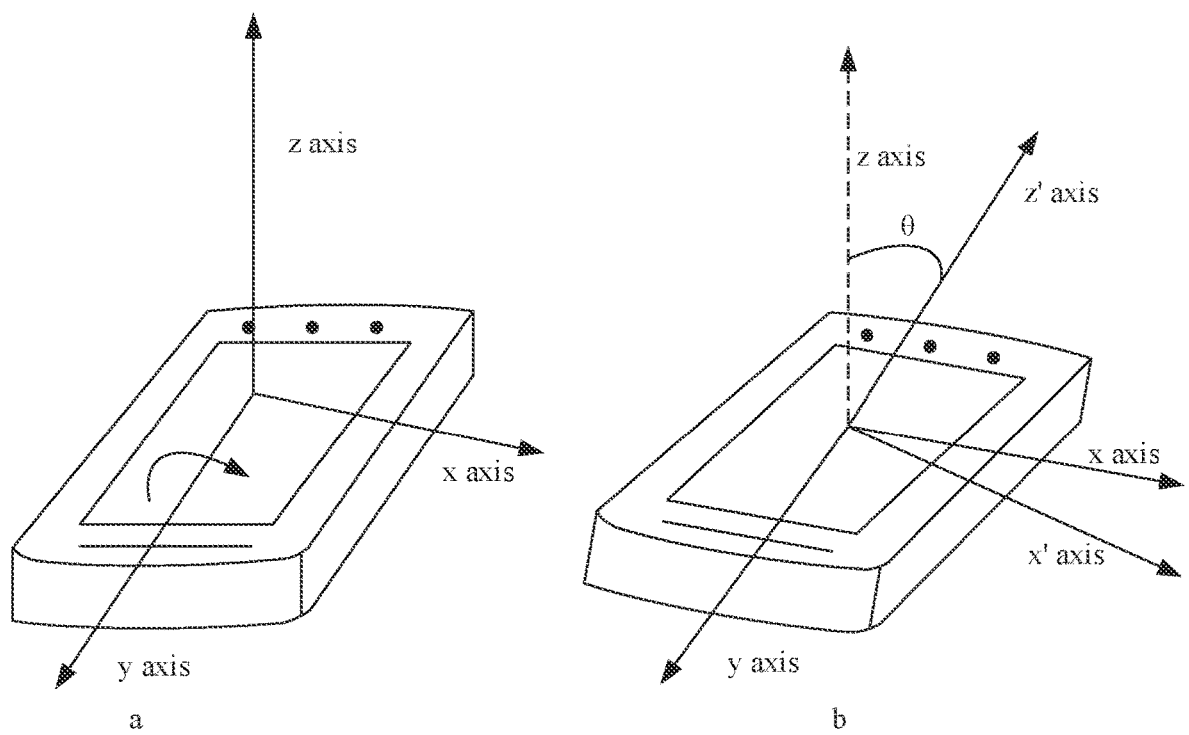
FIG. 15 is a schematic diagram of a roll angle according to an embodiment.

The roll angle θ is an angle at which the mobile phone rotates or rotates about the y axis in FIG. 12. A value range of θ is [−90°, 90°]. FIG. 15 is a schematic diagram showing that the mobile phone rotates about the y axis in FIG. 12. Herein, a in FIG. 15 is a schematic diagram in which the mobile phone has not rotated about the y axis, and b in FIG. 15 is a schematic diagram in which the mobile phone has rotated about the y axis. As shown in FIG. 15, after the mobile phone rotates about the y axis (where a direction indicated by an arrow on the y axis in a in FIG. 15 is a rotation direction of the mobile phone), a position of a z axis changes to a position of a z' axis in b in FIG. 15, a position of an x axis changes to a position of an x' axis in b in FIG. 15, and a value of θ is equivalent to an included angle that is of the z axis and that is obtained through the rotation of the mobile phone about the y axis (an included angle between the z axis and the z' axis in b in FIG. 15). It is assumed that the display screen of the mobile phone is horizontally placed face-up on the desktop. If the desktop is flat, the value of θ should be 0 degrees. The mobile phone is raised from a left side gradually, and the value of θ gradually decreases until the mobile phone is placed perpendicularly on the desktop. In this case, the value of θ is −90 degrees. The mobile phone is raised from a right side gradually, and the value of θ gradually increases until the mobile phone is placed perpendicularly on the desktop. In this case, the value of θ is 90 degrees. If the mobile phone continues to scroll rightward or leftward when the mobile phone is perpendicular to the desktop, the value of θ continues to change between −90 degrees and 90 degrees.

Figure 16:
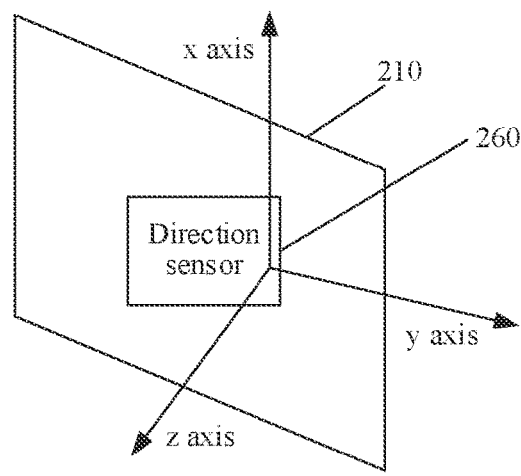
FIG. 16 is a schematic diagram of an x axis, a y axis, and a z axis on a display screen according to an embodiment.

Euler angle of the display screen of the electronic device: Values of an x axis and a y axis of the direction sensor on the electronic device are obtained, where the value of the x axis represents an amplitude at which the display screen tilts upward or downward, and the value of the y axis represents an amplitude at which the display screen tilts leftward or rightward. FIG. 16 is a schematic diagram of the x axis, the y axis, and a z axis on the display screen. The z axis is perpendicular to the display screen 210, and the x axis and the z axis lie on the plane on which the display screen 210 is located, and are parallel to the display screen 210.

Figure 17:
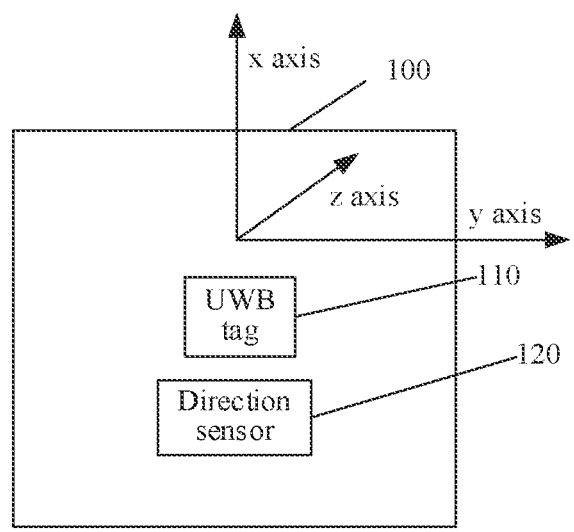
FIG. 17 is a schematic diagram of an x axis, a y axis, and a z axis on an air mouse according to an embodiment.

Euler angle of the air mouse: The direction sensor on the air mouse obtains values of an x axis and a y axis, where the x axis represents an amplitude at which the air mouse tilts upward and downward, and the value of the y axis represents an amplitude at which the air mouse tilts leftward and rightward. FIG. 17 is a schematic diagram of the x axis, the y axis, and a z axis on the air mouse. The z axis is perpendicular to a surface of the air mouse 100, the x axis and the y axis lie on a same plane, and the z axis is perpendicular to the plane on which the x axis and the y axis lie.

Because the electronic device is basically fixed (for example, is a smart television mounted on a wall), in embodiments of this disclosure, the direction sensor may alternatively not be deployed on the electronic device (for example, on the display screen of the electronic device), and the Euler angle of the display screen is calibrated by using the direction sensor disposed on the air mouse. For example:

An example in which the air mouse is a mobile phone and the display screen is a rectangular display screen is used.

When an upper surface of the mobile phone (namely, a surface that a user faces when the user uses the mobile phone) is parallel to the upper edge and the lower edge of the display screen, and is perpendicular to the left edge and the right edge of the display screen, an included angle between the air mouse and each of the upper edge and the lower edge of the display screen is 0 degrees, an included angle between the air mouse and each of the left edge and the right edge of the display screen is 90 degrees, and the air mouse is perpendicular to the display screen.

If the air mouse tilts towards the upper edge of the display screen, a tilt angle is denoted as W.

If the air mouse tilts towards the lower edge of the display screen, a tilt angle is denoted as k.

If the air mouse tilts towards the left edge of the display screen, a tilt angle is denoted as a.

If the air mouse tilts towards the right edge of the display screen, a tilt angle is denoted as ω.

Optionally, in embodiments of this disclosure, when the air mouse tilts towards the lower edge of the display screen, the tilt angle is denoted as a negative value. When the air mouse tilts towards the upper edge of the display screen, the tilt angle is denoted as a positive value. When the air mouse tilts towards the left edge of the display screen, the tilt angle is denoted as a positive value. When the air mouse tilts towards the right edge of the display screen, the tilt angle is denoted as a negative value. The upper edge, the lower edge, the left edge, and the right edge are four edges (which may also be referred to as four boundaries) of the display screen.

In embodiments of this disclosure, $\psi$ and $\lambda$ may be understood as actual yaw angles between the air mouse and the display screen. Optionally, a value of $\lambda$ is defined as a negative value, and a value of $\psi$ is defined as a positive value. For example, the value of $\lambda$ may be $-40°$, and the value of $\psi$ may be $+60°$.

$\sigma$ and $\omega$ may be understood as actual roll angles between the air mouse and the display screen. Optionally, a value of $\sigma$ is defined as a positive value, and a value of $\omega$ is defined as a negative value. For example, the value of $\sigma$ is $+30°$, and the value of $\omega$ is $-45°$.

In embodiments of this disclosure, the actual angle at which the air mouse rotates includes the actual yaw angle ($\psi$ or $\lambda$) between the air mouse and the display screen and the actual roll angle ($\sigma$ or $\omega$) between the air mouse and the display screen.

In embodiments of this disclosure, the actual roll angle between the air mouse and the display screen represents the included angle that is in the first direction (the horizontal direction) and that is between the straight line in the direction to which the air mouse points and the perpendicular between the air mouse and the display screen.

The actual yaw angle between the air mouse and the display screen represents the included angle that is in the second direction (the vertical direction) and that is between the straight line in the direction to which the air mouse points and the perpendicular between the air mouse and the display screen.

For descriptions of the perpendicular between the air mouse and the display screen, refer to the foregoing descriptions of the perpendicular between the air mouse and the plane of the display screen (or from the air mouse to the plane of the display screen). Details are not described herein again.

The straight line in the direction to which the air mouse points may be understood as: Any point on the air mouse (for example, any point on the UWB tag on the air mouse or the central point at the top of the air mouse) is used as a start point of the straight line, and a direction of the straight line is the direction to which the air mouse actually points. In addition, the start point of the straight line in the direction to which the air mouse points is the same as the start point (point Q) of the perpendicular between the air mouse and the display screen. In other words, the air mouse may be considered as a point, the point (the point Q) is used as the start point of the straight line in the direction to which the air mouse points, and the direction of the straight line (which may alternatively be understood as a ray using the point Q as a start point) is the direction to which the air mouse actually points.

Figure 18:
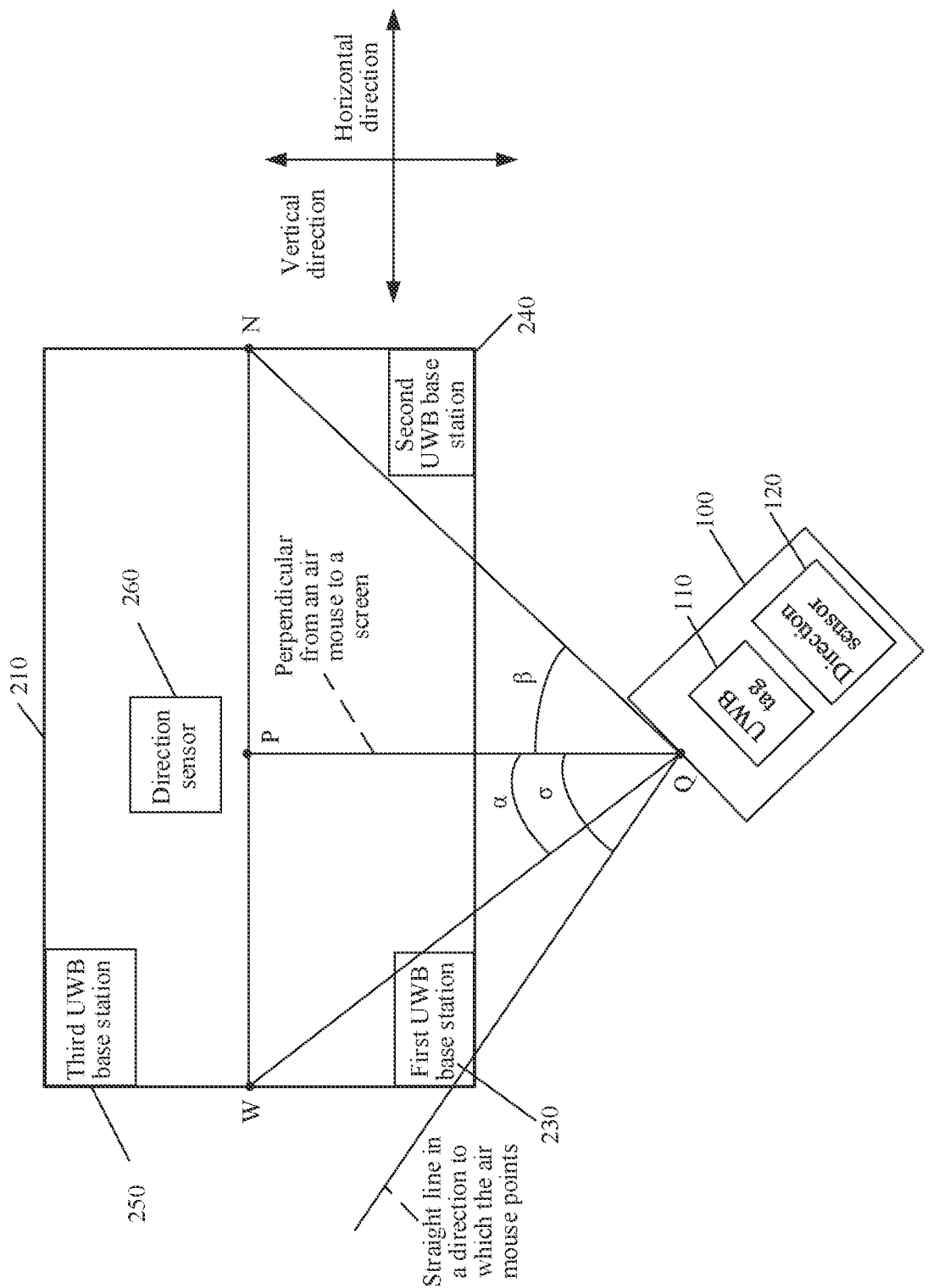
FIG. 18 is a schematic diagram of an actual roll angle σ between an air mouse and a display screen according to an embodiment.

For example, FIG. 18 is a schematic diagram of the actual roll angle $\sigma$ between the air mouse and the display screen according to this disclosure. Meanings of points and reference numerals shown in FIG. 18 are the same as those of the points and the reference numerals in FIG. 8. When the air mouse 100 is at a position shown in FIG. 18, the roll angle $\sigma$ between the air mouse 100 and the display screen 210 changes when the air mouse 100 rotates leftward or rightward about the point Q in the horizontal direction.

Figure 19:
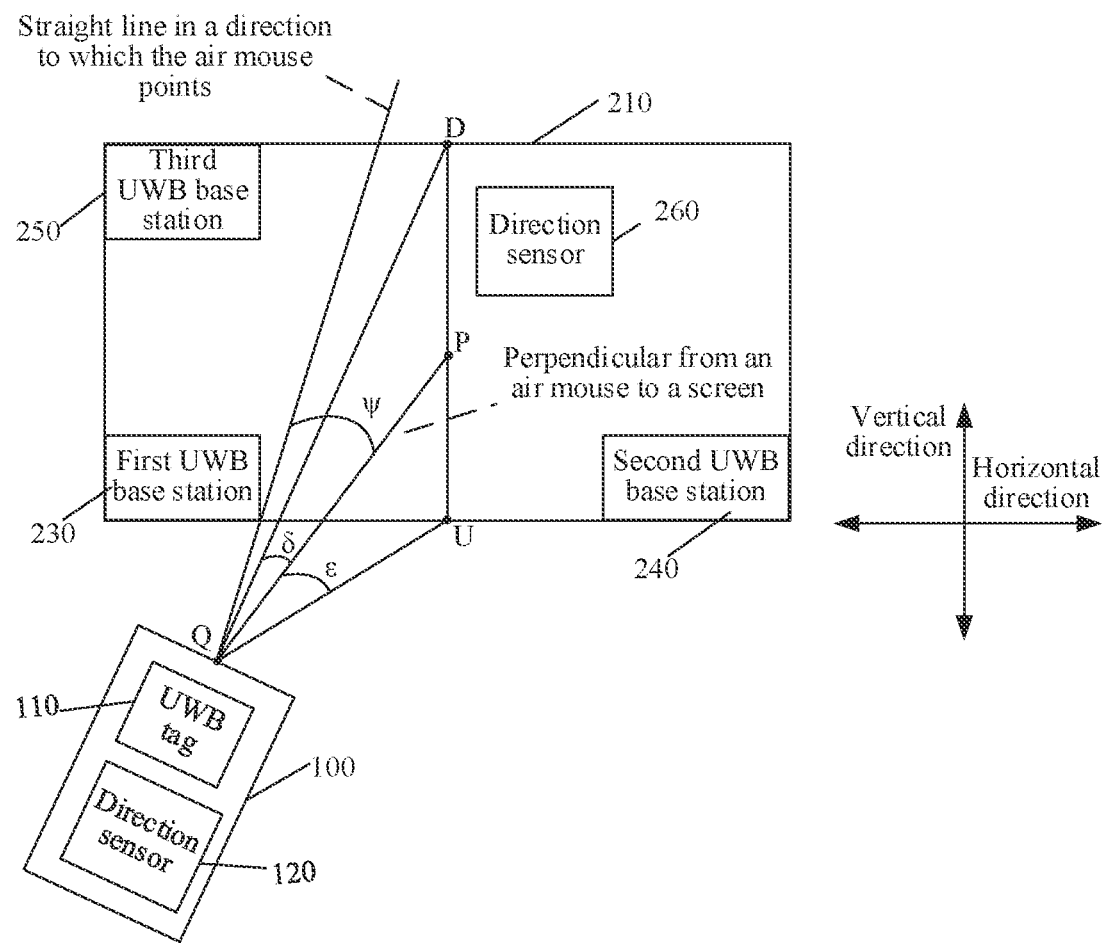
FIG. 19 is a schematic diagram of an actual yaw angle ψ between an air mouse and a display screen according to an embodiment.

FIG. 19 is a schematic diagram of the actual yaw angle $\psi$ between the air mouse and the display screen according to this disclosure. Meanings of points and reference numerals shown in FIG. 19 are the same as those of the points and the reference numerals in FIG. 10. When the air mouse 100 is at a position shown in FIG. 19, the yaw angle between the air mouse 100 and the display screen 210 changes when the air mouse 100 rotates upward or downward about the point Q in the vertical direction.

Optionally, in embodiments of this disclosure, the straight line in the direction to which the air mouse points may also be referred to as an extension line of a central axis of the air mouse. The straight line in the direction to which the air mouse points means: There is a straight line that uses a shape of an outer edge contour of the air mouse as a reference and that makes the air mouse axisymmetric to the central axis. To be specific, perpendicular distances from a point on the central axis to an upper surface and a lower surface of the air mouse are equal, and perpendicular distances from a point on the central axis to a left surface and a right surface of the air mouse are equal. For example, the air mouse is a mobile phone with a touchscreen, and a shape of an outer edge contour of the mobile phone is generally symmetrical. For example, the shape of the outer edge contour of the mobile phone is a cuboid. A start point of the extension line of the central axis is the same as the start point (the point Q) of the perpendicular between the air mouse and the display screen.

In a possible implementation, in S380, if no direction sensor is deployed on the electronic device, the direction sensor (the first direction sensor) on the air mouse is needed to calibrate the Euler angle of the display screen. A calibration process is described above. After the Euler angle of the display screen is calibrated, the air mouse may send the measurement message (the first direction measurement message) of the first direction sensor on the air mouse to the electronic device after the air mouse rotates. In S390, a processor of the electronic device may determine, based on the measurement message, the actual yaw angle $\psi$ or $\lambda$ between the air mouse and the display screen and the actual roll angle $\sigma$ or $\omega$ between the air mouse and the display screen.

Specifically, in S380, after the straight line in the direction to which the air mouse points is perpendicular to the display screen of the electronic device, the air mouse may send an initial first direction measurement message to the electronic device.

The electronic device may determine an initial included angle based on the initial first direction measurement message.

After the air mouse rotates, the air mouse may send a current first direction measurement message to the electronic device.

The electronic device determines a current included angle based on the current first direction measurement message.

The electronic device determines an included angle based on the current included angle and the initial included angle.

For example, the initial included angle may be subtracted from the current included angle to obtain the included angle. Further, the yaw angle $\psi$ or $\lambda$ and the actual roll angle $\sigma$ or $\omega$ between the air mouse and the display screen are determined by using the included angle.

In another possible implementation, if the direction sensor (the second direction sensor) is also deployed on the electronic device, the Euler angle of the display screen may not need to be calibrated. In S380, after the air mouse rotates, the air mouse may send the measurement message (the first direction measurement message) of the first direction sensor on the air mouse to the electronic device. A processor of the electronic device receives the first direction measurement message. In combination with the measurement message (the second direction measurement message) of the second direction sensor on the electronic device, the electronic device may determine the actual yaw angle $\psi$ or $\lambda$ between the air mouse and the display screen and the actual roll angle $\sigma$ or $\omega$ between the air mouse and the display screen.

For example, an included angle may be obtained by subtracting a measurement value of a current second direction measurement message from a measurement value of a current first direction measurement message. Further, the yaw angle $\psi$ or $\lambda$ and the actual roll angle $\sigma$ or $\omega$ between the air mouse and the display screen are determined by using the included angle.

It should be understood that, in embodiments of this disclosure, the second direction sensor is located at a position at front or back of the display screen, and all or a part of a perpendicular projection that is of the second direction sensor and that is on the display screen is located on the display screen.

In embodiments of this disclosure, the first included angle $\alpha$ and the second included angle $\beta$ may be understood as the largest angle at which the air mouse rotates leftward and the largest angle at which the air mouse rotates rightward when the air mouse is located at the position shown in FIG. 8 or FIG. 9 (in other words, the coordinates remain unchanged), to control the cursor on the display screen in the horizontal direction dimension of the display screen. The positive value indicates the leftward rotation, and the negative value indicates the rightward rotation.

In other words, [$\beta,\alpha$] may be understood as a range of the roll angle between the air mouse and the display screen. If the actual roll angle $\sigma$ or $\omega$ between the air mouse and the display screen is within the range of the roll angle, in the horizontal direction dimension of the display screen, the movement of the cursor on the display screen can be controlled based on rotation or movement of the air mouse.

The third included angle $\delta$ and the fourth included angle F are the largest angle at which the air mouse rotates upward and the largest angle at which the air mouse rotates downward when the air mouse is located at the position shown in FIG. 10 or FIG. 11 (in other words, the coordinates remain unchanged), to control the cursor on the display screen in the vertical direction dimension of the display screen. The positive value indicates the upward rotation, and the negative value indicates the downward rotation. In other words, [$\varepsilon,\delta$] may be understood as a range of the yaw angle between the air mouse and the display screen. If the actual yaw angle $\psi$ or $\lambda$ between the air mouse and the display screen is within the range of the yaw angle, in the vertical direction dimension of the display screen, the movement of the cursor on the display screen can be controlled based on rotation or movement of the air mouse.

In S391, when the electronic device determines that the roll angle $\sigma$ or $\omega$ is within the range of [$\beta,\alpha$], and the yaw angle $\psi$ or $\lambda$ is within the range of [$\varepsilon,\delta$], the electronic device controls the movement of the cursor on the display screen based on the rotation of the air mouse. Alternatively, when the electronic device determines that the roll angle $\sigma$ or $\omega$ is beyond the range of [$\beta,\alpha$], and the yaw angle $\psi$ or $\lambda$ is beyond the range of [$\varepsilon,\delta$], the electronic device does not respond to the rotation of the air mouse, so that the movement of the cursor on the display screen cannot be controlled based on the rotation of the air mouse.

Specifically, after the electronic device determines $\psi$ or $\lambda$ and $\sigma$ or $\omega$, the electronic device may compare $\psi$ or $\lambda$ with the included angle range [$\varepsilon,\delta$], compare $\sigma$ or $\omega$ with the included angle range [$\beta,\alpha$], and determine, based on a comparison result, whether the air mouse can control the movement of the cursor on the display screen. There may be the following four cases:

In a first case, if the actual yaw angle $\psi$ or $\lambda$ between the air mouse and the display screen is between $\varepsilon$ and $\delta$, in other words, the actually measured yaw angle $\psi$ or $\lambda$ is within the included angle range determined based on $\varepsilon$ and $\delta$ (where $\psi$ or $\lambda\in[\varepsilon,\delta]$), and the actual roll angle $\sigma$ or $\theta$ between the air mouse and the display screen is between $\beta$ and $\alpha$, in other words, the actually measured roll angle $\sigma$ or $\omega$ is within the included angle range determined based on $\beta$ and $\alpha$ (where $\sigma$ or $\omega\in[\beta,\alpha]$), the electronic device determines that the air mouse can control the movement of the cursor on the display screen. To be specific, when the actual yaw angle $\psi$ or $\lambda$ between the air mouse and the display screen is within the angle range determined based on $\varepsilon$ and $\delta$, and the actual roll angle $\sigma$ or $\omega$ between the air mouse and the display screen is within the angle range determined based on $\beta$ and $\alpha$, it is determined that the straight line in the direction to which the air mouse points is within the range of the display screen (to be specific, regardless of the vertical direction dimension and the horizontal direction dimension of the display screen, the straight line in the direction to which the air mouse points is within the range of the display screen), and the movement of the cursor in the vertical direction dimension and the horizontal direction dimension of the display screen can be controlled based on the rotation or the movement of the air mouse, in other words, the electronic device controls the movement of the cursor on the display screen based on the rotation of the air mouse in the horizontal direction and the vertical direction of the display screen.

In other words, after the roll angle is greater than the second included angle and less than the first included angle, the cursor moves with the mobile device; and after the yaw angle is greater than the fourth included angle and less than the third included angle, the cursor moves with the mobile device.

For example, assuming that $\delta$ is equal to +50° and $\varepsilon$ is equal to −45°, the range of the yaw angle between the air mouse and the display screen is [−45°,+50°].

Assuming that $\alpha$ is equal to +65° and $\beta$ is equal to −75°, the range of the roll angle between the air mouse and the display screen is [−75°,+65°].

If $\psi$ is equal to +30° and $\sigma$ is equal to +55°, because +30°∈[−45°,+50°], and +55° ∈[−75°,+65°], it is determined that the straight line in the direction to which the air mouse points is within the range of the display screen (to be specific, regardless of the vertical direction dimension and the horizontal direction dimension of the display screen, the straight line in the direction to which the air mouse points is within the range of the display screen), and the movement of the cursor in the vertical direction dimension and the horizontal direction dimension of the display screen can be controlled based on the rotation or the movement of the air mouse.

In a second case, the actual yaw angle $\psi$ or $\lambda$ between the air mouse and the display screen is between $\varepsilon$ and $\delta$, in other words, the actually measured yaw angle $\psi$ or $\lambda$ is within the included angle range determined based on $\varepsilon$ and $\delta$ (where $\psi$ or $\lambda$∈[$\varepsilon$,$\delta$]), and the actual roll angle $\sigma$ or $\omega$ between the air mouse and the display screen is not between $\beta$ and $\alpha$, in other words, the actually measured roll angle $\sigma$ or $\omega$ is beyond the included angle range determined based on $\beta$ and $\alpha$ (where $\sigma$ or $\omega$∉[$\beta$,$\alpha$]). To be specific, in the vertical direction dimension of the display screen, the straight line in the direction to which the air mouse points is within the range of the display screen, but in the horizontal direction dimension of the display screen, the straight line in the direction to which the air mouse points is beyond the range of the display screen, the air mouse can control the movement of the cursor on the display screen in the vertical direction dimension of the display screen, in other words, the movement of the cursor on the display screen can be controlled in the vertical direction dimension of the display screen based on the rotation or the movement of the air mouse. However, in the horizontal direction dimension of the display screen, the movement of the cursor on the display screen cannot be controlled based on the rotation or the movement of the air mouse. In other words, the electronic device controls the movement of the cursor in the vertical direction dimension of the display screen based on the rotation of the air mouse in the vertical direction dimension of the display screen. When the air mouse rotates in the horizontal dimension of the display screen, the electronic device controls the cursor not to respond to the rotation of the air mouse in the horizontal dimension of the display screen, so that the movement of the cursor cannot be controlled in the horizontal dimension of the display screen based on the rotation of the air mouse.

In other words, after the yaw angle is greater than the fourth included angle and less than the third included angle, the cursor moves with the mobile device.

For example, assuming that $\delta$ is equal to +50° and $\varepsilon$ is equal to −45°, the range of the yaw angle between the air mouse and the display screen is [−45°,+50°].

Assuming that $\alpha$ is equal to +65° and $\beta$ is equal to −75°, the range of the roll angle between the air mouse and the display screen is [−75°,+65°].

If $\psi$ is equal to +30° and $\omega$ is equal to −80°, because +30°∈[−45°,+50°], and −80°∉[−75°,+65°], in the horizontal direction dimension of the display screen, the movement of the cursor on the display screen can be controlled based on the rotation or the movement of the air mouse. In the horizontal direction dimension of the display screen, the movement of the cursor on the display screen cannot be controlled based on the rotation or the movement of the air mouse.

In a third case, if the actual yaw angle $\psi$ or $\lambda$ between the air mouse and the display screen is not between $\varepsilon$ and $\delta$, in other words, the actually measured yaw angle $\psi$ or $\lambda$ is beyond the included angle range determined based on $\varepsilon$ and $\delta$ (where $\psi$ or $\lambda$∉[$\varepsilon$,$\delta$]), and the actual roll angle $\sigma$ or $\omega$ between the air mouse and the display screen is between $\beta$ and $\alpha$, in other words, the actually measured roll angle $\sigma$ or $\omega$ is within the included angle range determined based on $\beta$ and $\alpha$ (where $\sigma$ a or $\omega$∈[$\beta$,$\alpha$], it is proved that the straight line in the direction to which the air mouse points is beyond the range of the display screen in the vertical direction dimension of the display screen, but is within the range of the display screen in the horizontal direction dimension of the display screen. In this way, the air mouse can control the movement on the display screen in the horizontal direction dimension of the display screen, to be specific, in the horizontal direction dimension of the display screen, the movement of the cursor on the display screen can be controlled based on the rotation or the movement of the air mouse; in the vertical direction dimension of the display screen, the movement of the cursor on the display screen cannot be controlled based on the rotation or the movement of the air mouse. In other words, the electronic device controls the movement of the cursor in the horizontal direction dimension of the display screen based on the rotation of the air mouse in the horizontal direction dimension of the display screen. When the air mouse rotates in the vertical dimension of the display screen, the electronic device controls the cursor not to respond to the rotation of the air mouse in the vertical dimension of the display screen, so that the movement of the cursor cannot be controlled in the vertical dimension of the display screen based on the rotation of the air mouse.

For example, assuming that $\delta$ is equal to +50° and $\varepsilon$ is equal to −45°, the range of the yaw angle between the air mouse and the display screen is [−45°,+50°].

Assuming that $\alpha$ is equal to +65° and $\beta$ is equal to −75°, the range of the roll angle between the air mouse and the display screen is [−75°,+65°].

If $\psi$ is equal to +56° and $\sigma$ is equal to +55°, because +55°∉[−45°,+50°], and +55°∈[−75°,+65°], the air mouse can control the movement on the display screen in the horizontal direction dimension of the display screen, to be specific, in the horizontal direction dimension of the display screen, the movement of the cursor on the display screen can be controlled based on the rotation or the movement of the air mouse; in the vertical direction dimension of the display screen, the movement of the cursor on the display screen cannot be controlled based on the rotation or the movement of the air mouse.

In other words, after the roll angle is greater than the second included angle and less than the first included angle, the cursor moves with the mobile device.

In a fourth case, when the actual yaw angle $\psi$ or $\lambda$ between the air mouse and the display screen is not between $\varepsilon$ and $\delta$, in other words, the actually measured yaw angle $\psi$ or $\lambda$ is beyond the included angle range determined based on $\varepsilon$ and $\delta$ (where $\psi$ or $\lambda$∉[$\varepsilon$,$\delta$]), and the actual roll angle $\sigma$ or $\omega$ between the air mouse and the display screen is not between $\beta$ and $\alpha$, in other words, the actually measured roll angle $\sigma$ or $\omega$ is beyond the included angle range determined based on $\beta$ and $\alpha$ (where $\sigma$ or $\omega$∉[$\beta$,$\alpha$]), the air mouse cannot control the movement of the cursor on the display screen. To be specific, when the actual yaw angle $\psi$ or $\lambda$ between the air mouse and the display screen is beyond the angle range determined based on $\varepsilon$ and $\delta$, and the actual roll angle $\sigma$ or $\omega$ between the air mouse and the display screen is beyond the angle range determined based on $\beta$ and $\alpha$, it is determined that the straight line in the direction to which the air mouse points is beyond the range of the display screen (to be specific, regardless of the vertical direction dimension and the horizontal direction dimension of the display screen, the straight line in the direction to which the air mouse points is beyond the range of the display screen), and the movement of the cursor in the vertical direction dimension and the horizontal direction dimension of the display screen cannot be controlled based on the rotation or the movement of the air mouse. In other words, regardless of the rotation of the air mouse in the horizontal direction dimension and the vertical direction dimension of the display screen, the electronic device controls the cursor not to respond to the rotation of the air mouse, so that the movement of the cursor can be controlled neither in the vertical dimension nor the horizontal direction dimension of the display screen based on the rotation of the air mouse.

To be specific, after the roll angle is greater than the first included angle, the cursor no longer moves with movement of the mobile device to outside of the third edge in the first direction, but moves with movement of the mobile device in a non-first direction and movement of the mobile device in the first direction not to the outside of the third edge.

After the roll angle is less than the second included angle, the cursor no longer moves with movement of the mobile device to outside of the fourth edge in the first direction, but moves with the movement of the mobile device in the non-first direction and movement of the mobile device in the first direction not to the outside of the fourth edge.

After the yaw angle is greater than the third included angle, the cursor no longer moves with movement of the mobile device to outside of the first edge in the second direction, but moves with movement of the mobile device in a non-second direction and movement of the mobile device in the second direction not to the outside of the first edge.

After the yaw angle is less than the fourth included angle, the cursor no longer moves with movement of the mobile device to outside of the second edge in the second direction, but moves with the movement of the mobile device in the non-second direction and movement of the mobile device in the second direction not to the outside of the second edge.

For example, assuming that $\delta$ is equal to +50° and $\varepsilon$ is equal to −45°, the range of the yaw angle between the air mouse and the display screen is [−45°,+50°].

Assuming that $\alpha$ is equal to +65° and $\beta$ is equal to −75°, the range of the roll angle between the air mouse and the display screen is [−75°,+65°].

If $\psi$ is equal to −50° and $\sigma$ is equal to +80°, because −50°$\notin$[−45°,+50°], and +80°$\notin$[−75°,+65°], it is determined that the straight line in the direction to which the air mouse points is beyond the range of the display screen (to be specific, regardless of the vertical direction dimension and the horizontal direction dimension of the display screen, the straight line in the direction to which the air mouse points is beyond the range of the display screen), and the movement of the cursor in the vertical direction dimension and the horizontal direction dimension of the display screen cannot be controlled based on the rotation or the movement of the air mouse.

For example, in the example shown in FIG. 18, the actual roll angle $\sigma$ between the air mouse and the display screen >$\alpha$, and the straight line in the direction to which the air mouse points is beyond the range of the display screen in the horizontal direction. In this case, the air mouse cannot control the movement of the cursor on the display screen in the horizontal direction. In the example shown in FIG. 19, the actual yaw angle $\psi$ between the air mouse and the display screen >$\delta$, and the straight line in the direction to which the air mouse points is beyond the range of the display screen in the vertical direction. In this case, the air mouse cannot control the movement of the cursor on the display screen in the vertical direction.

Figure 20:
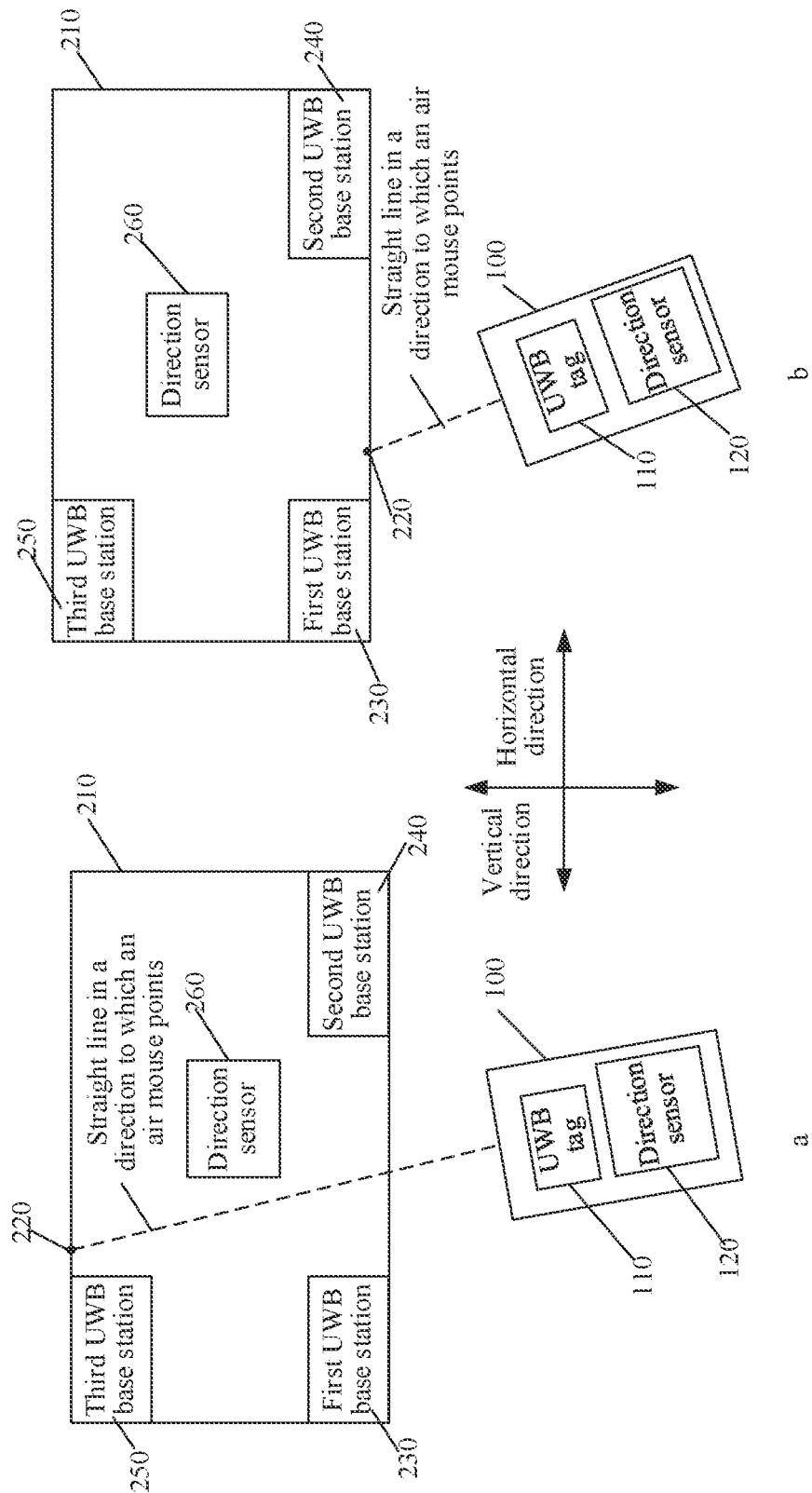
FIG. 20 is a schematic diagram showing that a cursor corresponding to an air mouse is at an upper edge and a lower edge of a display screen according to an embodiment.

In this embodiment of this disclosure, as shown in FIG. 20, in the horizontal direction of the display screen 210, the extension line (shown by dashed lines in a and b in FIG. 20) of the central axis of the air mouse 100 does not exceed the boundaries of the display screen 210 (where in the horizontal direction dimension of the display screen 210, the extension line of the central axis of the air mouse 100 is within the range of the display screen 210, in other words, $\sigma$ or $\omega \in [\beta,\alpha]$). In addition, in the vertical direction of the display screen 210, the extension line of the central axis of the air mouse 100 extends to the edge of the display screen 210 (where a in FIG. 20 shows that the extension line of the central axis reaches the upper edge of the display screen 210, in other words, $\psi=\delta$).

b in FIG. 20 shows that the extension line of the central axis reaches the lower edge of the display screen 210. When $\psi=\delta$, in other words, the yaw angle is equal to the third included angle, the cursor moves to the first edge in the second direction. When $\lambda=\varepsilon$, in other words, the yaw angle is equal to the fourth included angle, the cursor moves to the second edge in the second direction. In this case, the air mouse 100 rotates in the horizontal direction, and the cursor 220 is movable in the horizontal direction of the display screen 210. For example, the user rotates the air mouse 100 in the horizontal direction, the cursor 220 shown in a in FIG. 20 may move at the upper edge of the display screen 210 in the horizontal direction, and the cursor 220 shown in b in FIG. 20 may move at the lower edge of the display screen 210 in the horizontal direction. In other words, in the horizontal direction dimension of the display screen 210, the air mouse 100 rotates or moves to control the cursor 220 to move along the upper boundary or the lower boundary of the display screen 210. As shown in a in FIG. 20, in the vertical direction dimension of the display screen 210, when the user tilts the air mouse 100 towards the upper edge of the display screen, upward movement of the cursor 220 on the display screen 210 cannot be controlled based on the rotation of the air mouse 100. When the user tilts the air mouse 100 towards the lower edge of the display screen, downward movement of the cursor 220 on the display screen 210 can be controlled based on the rotation of the air mouse 100. As shown in b in FIG. 20, in the vertical direction dimension of the display screen 210, when the user tilts the air mouse 100 towards the lower edge of the display screen, downward movement of the cursor 220 on the display screen 210 cannot be controlled based on the rotation of the air mouse 100. When the user tilts the air mouse 100 towards the upper edge of the display screen, upward movement of the cursor 220 on the display screen 210 can be controlled based on the rotation of the air mouse 100.

To be specific, as shown in a in FIG. 20, after the electronic device determines that the cursor 220 moves in the vertical direction (the second direction) to the upper edge (the first edge) of the display screen, the cursor 220 no longer moves with the movement of the air mouse 100 in the vertical direction to the outside of the upper edge. The cursor 220 moves with the movement of the air mouse 100 in the non-second direction (where the non-second direction is the horizontal direction), and moves with the movement of the air mouse 100 in the vertical direction not to the outside of the upper edge (in other words, in the vertical direction to the lower edge).

As shown in b in FIG. 20, after the electronic device determines that the cursor 220 moves in the vertical direction (the second direction) to the lower edge (the second edge) of the display screen, the cursor 220 no longer moves with the movement of the air mouse 100 in the vertical direction to the outside of the lower edge. The cursor 220 moves with the movement of the air mouse 100 in the non-second direction (where the non-second direction is the horizontal direction), and moves with the movement of the air mouse 100 in the vertical direction not to the outside of the lower edge (in other words, in the vertical direction to the upper edge).

Figure 21:
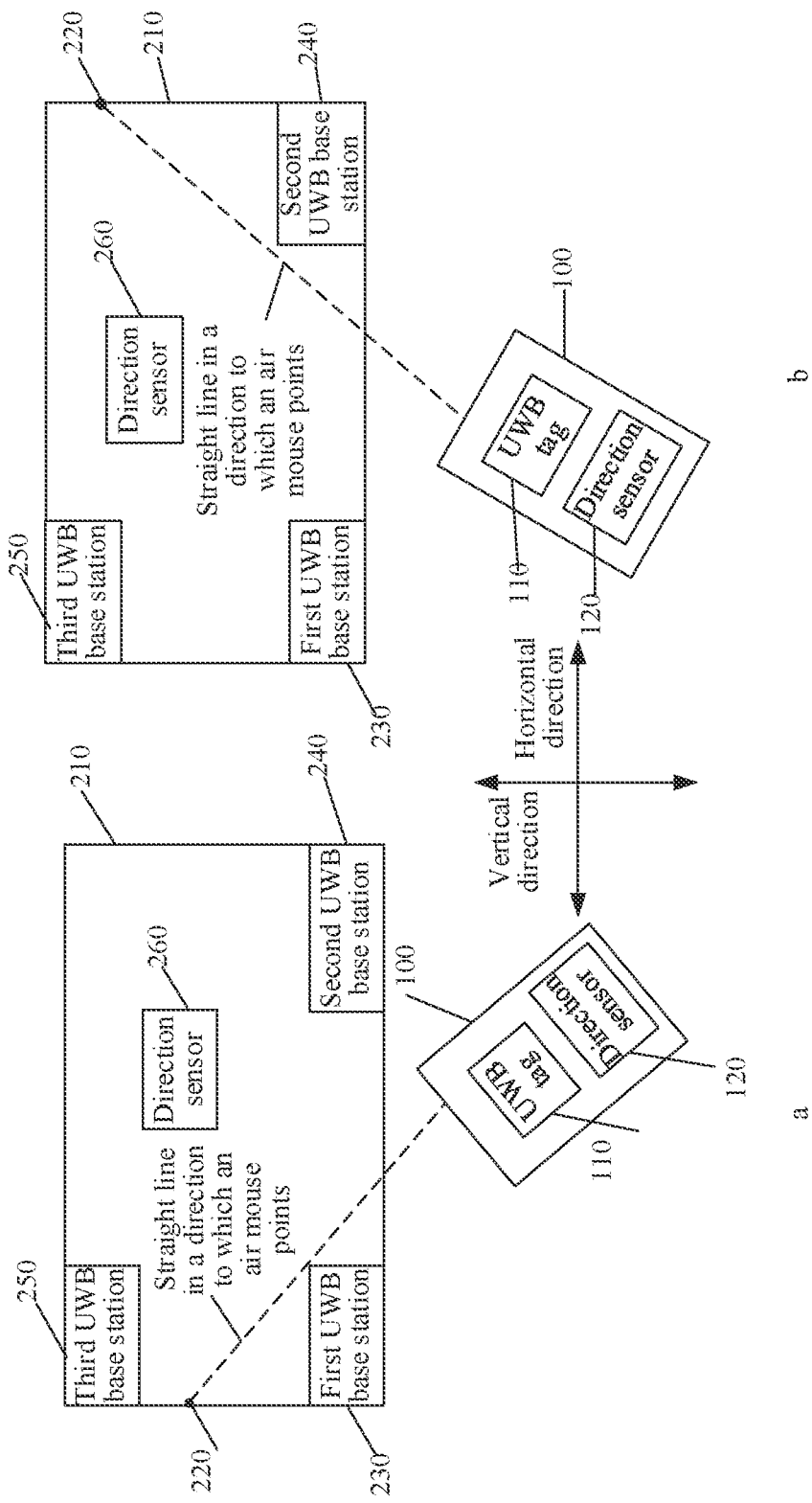
FIG. 21 is a schematic diagram showing that a cursor corresponding to an air mouse is at a left edge and a right edge of a display screen according to an embodiment.

In this embodiment of this disclosure, as shown in FIG. 21, the extension line (shown by dashed lines in a and b in FIG. 21) of the central axis of the air mouse 100 does not exceed the boundaries of the display screen 210 in the vertical direction of the display screen 210 (in other words, in the vertical direction dimension of the display screen 210, the extension line of the central axis of the air mouse 100 is within the range of the display screen 210, in other words, $\psi$ or $\lambda \in [\varepsilon, \delta]$. In addition, the extension line of the central axis of the air mouse 100 reaches the edge of the display screen 210 in the horizontal direction of the display screen 210 (where a in FIG. 21 shows that the extension line of the central axis reaches the left edge of the display screen 210, in other words, $\sigma = \alpha$; and b in FIG. 21 shows that the extension line of the central axis reaches the right edge of the display screen 210, in other words, $\omega = \beta$). When $\sigma = \alpha$, in other words, the roll angle is equal to the first included angle, the cursor moves to the third edge in the first direction. When $\omega = \beta$, in other words, the roll angle is equal to the second included angle, the cursor moves to the fourth edge in the first direction. In this case, the air mouse 100 rotates in the vertical direction, and the cursor 220 is movable in the vertical direction of the display screen 210. For example, the user rotates the air mouse 100 in the vertical direction, the cursor 220 shown in a in FIG. 21 may move along the left edge of the display screen 210 in the vertical direction, and the cursor 220 shown in b in FIG. 21 may move along the right edge of the display screen 210 in the vertical direction. In other words, movement the cursor 220 along the left edge (which may also be referred to as the left boundary) or the right edge (which may also be referred to as the right boundary) of the display screen 210 in the vertical direction can be controlled based on the rotation or the movement of the air mouse 100. As shown in a in FIG. 21, when the user tilts the air mouse 100 towards the left edge of the display screen, leftward movement of the cursor 220 in the horizontal direction of the display screen 210 cannot be controlled based on the rotation of the air mouse 100. When the user tilts the air mouse 100 towards the right edge of the display screen, rightward movement of the cursor 220 in the horizontal direction of the display screen 210 can be controlled based on the rotation of the air mouse 100. As shown in b in FIG. 21, when the user tilts the air mouse 100 towards the right edge of the display screen, rightward movement of the cursor 220 in the horizontal direction of the display screen 210 cannot be controlled based on the rotation of the air mouse 100. When the user tilts the air mouse 100 towards the left edge of the display screen, leftward movement of the cursor 220 in the horizontal direction of the display screen 210 can be controlled based on the rotation of the air mouse 100.

To be specific, as shown in a in FIG. 21, after the electronic device determines that the cursor 220 moves in the horizontal direction (the first direction) to the left edge (the third edge) of the display screen, the cursor 220 no longer moves with movement of the air mouse 100 in the horizontal direction to outside of the left edge. The cursor 220 moves with movement of the air mouse 100 in a non-first direction (where the non-first direction is the vertical direction), and moves with movement of the air mouse 100 in the horizontal direction not to the outside of the left edge (in other words, in the horizontal direction to the right edge).

As shown in b in FIG. 21, after the electronic device determines that the cursor 220 moves in the horizontal direction (the first direction) to the right edge (the fourth edge) of the display screen, the cursor 220 no longer moves with movement of the air mouse 100 in the horizontal direction to outside of the right edge. The cursor 220 moves with movement of the air mouse 100 in a non-first direction (where the non-first direction is the vertical direction), and moves with movement of the air mouse 100 in the horizontal direction not to the outside of the right edge (in other words, in the horizontal direction to the left edge).

According to the method that is for controlling movement of a cursor on an electronic device and that is provided in this disclosure, a first angle range in the first direction and a second angle range in the second direction are determined. The first angle range is a largest angle range in which the mobile device (for example, the air mouse) controls the cursor on the display screen of the electronic device (for example, the smart television) to move in the first direction, and the second angle range is a largest angle range in which the mobile device controls the cursor on the display screen of the electronic device to move in the second direction. If the actual angle between the mobile device and the display screen in the first direction is within the first angle range, the mobile device can control the movement of the cursor on the electronic device in the first direction. If the actual angle between the mobile device and the display screen in the second direction is within the second angle range, the mobile device can control the movement of the cursor on the electronic device in the second direction. If the actual angle between the mobile device and the display screen in the first direction is beyond the first angle range, the mobile device cannot control the movement of the cursor on the electronic device in the first direction. If the actual angle between the mobile device and the display screen in the second direction is beyond the second angle range, the mobile device cannot control the movement of the cursor on the electronic device in the second direction. The first direction is perpendicular to the second direction. This resolves a problem of out-of-focus between the mobile device and the cursor on the display screen, and the user does not need to perform re-calibration by repeatedly using a calibration key on the mobile device, to improve user experience.

It should be understood that the foregoing descriptions are merely intended to help a person skilled in the art better understand embodiments of this disclosure, but are not intended to limit the scope of embodiments of this disclosure. It is clear that a person skilled in the art may make various equivalent modifications or changes based on the foregoing examples. For example, some steps in embodiments of the foregoing methods may not be necessary, some steps may be added, or any two or more of the foregoing embodiments may be combined. Such modified, changed, or combined solutions also fall within the scope of the embodiments of this disclosure.

It should be further understood that, the foregoing descriptions of embodiments of this disclosure focus on differences between the embodiments. For same or similar parts that are not mentioned, refer to each other. For brevity, details are not described herein again.

It should be further understood that sequence numbers of the foregoing processes do not mean execution sequences. The execution sequences of the processes should be determined according to functions and internal logic of the processes, and should not be construed as any limitation on the implementation processes of embodiments of this disclosure.

It should be further understood that in embodiments of this disclosure, "preset" and "predefined" may be implemented by pre-storing corresponding code or a corresponding table in the electronic device or the mobile device or in another manner that can indicate related information. A specific implementation is not limited in this disclosure.

It should be understood that division into manners, cases, types, and embodiments in embodiments of this disclosure is merely for ease of description, but should not constitute any special limitation, and features in various manners, types, cases, and embodiments may be combined when there is no contradiction.

It should be further understood that in embodiments of this disclosure, unless otherwise stated or there is a logic conflict, terms and/or descriptions in different embodiments are consistent and may be mutually referenced, and technical features in different embodiments may be combined based on an internal logical relationship thereof, to form a new embodiment.

With reference to FIG. 1 to FIG. 21, the foregoing describes the embodiments of the method for controlling movement of a cursor on an electronic device according to embodiments of this disclosure. The following describes the electronic device and the mobile device according to embodiments of this disclosure.

An electronic device provided in an embodiment of this disclosure includes a display screen, and a plurality of UWB base stations are disposed on the display screen. Optionally, a direction sensor may be further disposed on the electronic device (for example, on the display screen of the electronic device). In this embodiment, the electronic device may be divided into functional modules according to the foregoing methods. For example, each functional module may be obtained through division based on a corresponding function, or two or more functions may be integrated into one processing module. The integrated module may be implemented in a form of hardware. It should be noted that, in embodiments, division into modules is an example and is merely logical function division. During actual implementation, there may be another division manner.

It should be noted that related content of the steps in the foregoing method embodiments may be cited in function descriptions of the corresponding functional modules. Details are not described herein again.

The electronic device provided in this embodiment is configured to perform the foregoing method for controlling movement of a cursor on an electronic device, to achieve same effects as the foregoing implementation method. When an integrated unit is used, the electronic device may include a processing module, a storage module, and a communication module. The processing module may be configured to control and manage an action of the electronic device. For example, the processing module may be configured to support the electronic device in performing a step performed by the processing module. The storage module may be configured to support storage of program code, data, and the like. The communication module may be used for communication between the electronic device and another device (for example, a mobile device).

The processing module may be a processor or a controller. The processing module may implement or execute various examples of logical blocks, modules, and circuits described with reference to content disclosed in this disclosure. The processor may alternatively be a combination of processors implementing a computing function, for example, a combination of one or more microprocessors or a combination of a digital signal processor (DSP) and a microprocessor. The storage module may be a memory. The communication module may be specifically a device, for example, a radio frequency circuit, a Bluetooth chip, or a Wi-Fi chip, that interacts with another electronic device.

Figure 22:
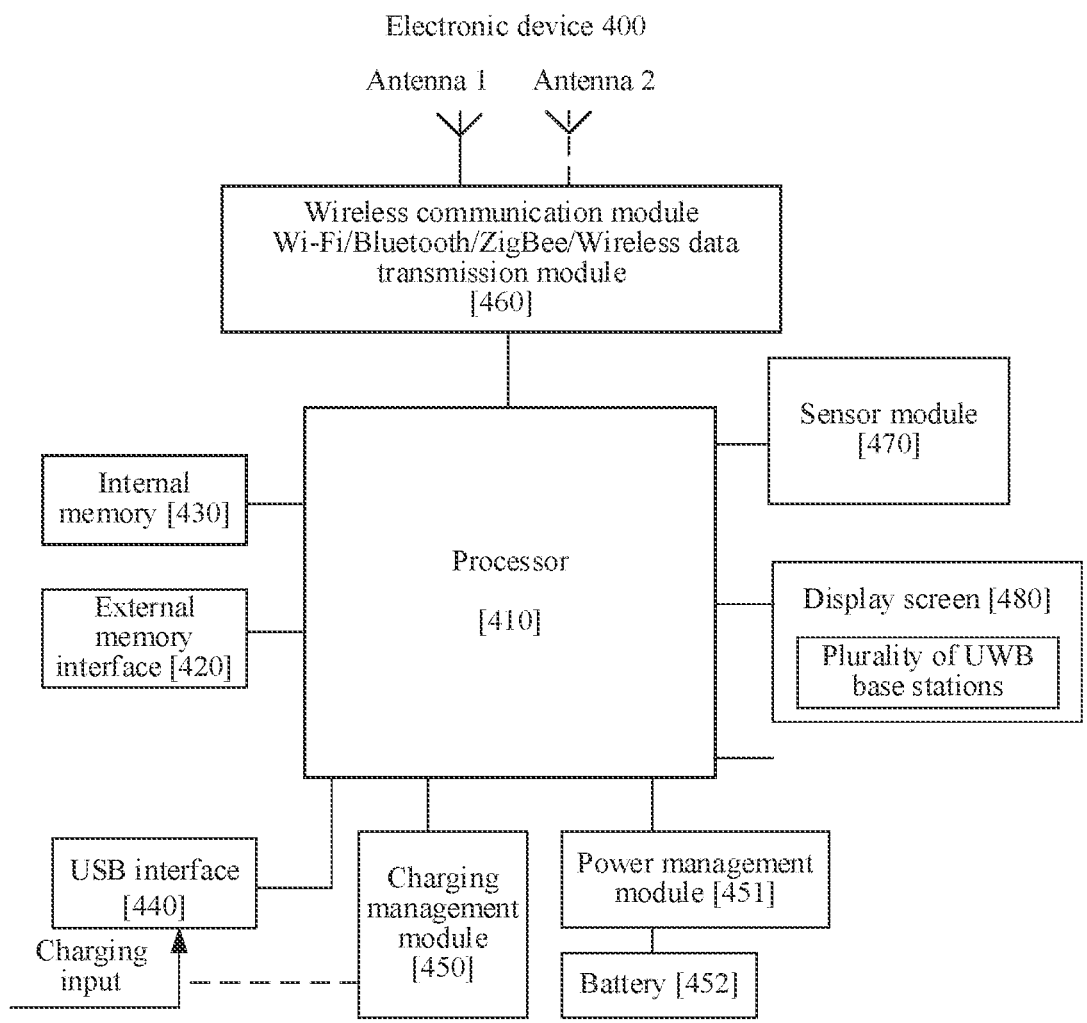
FIG. 22 is a schematic diagram of a structure of an electronic device according to an embodiment.

For example, FIG. 22 is a schematic diagram of a hardware structure of an electronic device 400. As shown in FIG. 22, the electronic device 400 may include a processor 410, an external memory interface 420, an internal memory 430, a universal serial bus (USB) interface 440, a charging management module 450, a power management module 451, a battery 452, an antenna 1, an antenna 2, a wireless communication module 460, a sensor module 470, and a display screen 480. A plurality of UWB base stations are deployed on the display screen 480. For example, the plurality of UWB base stations may be three UWB base stations, and positions of the UWB base stations may be, for example, as shown in FIG. 3. Optionally, the sensor module 470 may include a direction sensor.

It may be understood that the structure illustrated in this embodiment of this disclosure does not constitute a specific limitation on the electronic device 400. In some other embodiments of this disclosure, the electronic device 400 may include more or fewer components than those shown in the figure, some components may be combined, some components may be split, or there may be a different component layout. The components shown in the figure may be implemented by hardware, software, or a combination of software and hardware.

The processor 410 may include one or more processing units. For example, the processor 410 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be independent components, or may be integrated into one or more processors. In some embodiments, the electronic device 400 may alternatively include one or more processors 410. The controller may generate an operation control signal based on instruction operation code and a time sequence signal, to control instruction reading and instruction execution.

In some embodiments, the processor 410 may include one or more interfaces. The interface may include an inter-integrated circuit (I2C) interface, an integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a SIM card interface, a USB interface, and/or the like. The USB interface 440 is an interface that conforms to a USB standard specification, and may be specifically a mini USB interface, a micro USB interface, a USB type-C interface, or the like. The USB interface 440 may be configured to transmit data between the electronic device 400 and a peripheral device.

It may be understood that an interface connection relationship between the modules that is illustrated in this embodiment of this disclosure is merely an example for description, and constitutes no limitation on the structure of the electronic device 400. In some other embodiments of this disclosure, the electronic device 400 may alternatively use an interface connection manner different from that in the foregoing embodiment, or use a combination of a plurality of interface connection manners.

A wireless communication function of the electronic device 400 may be implemented through the antenna 1, the antenna 2, the wireless communication module 460, or the like.

The wireless communication module 460 may provide a wireless communication solution that is applied to the electronic device 400 and that includes Wi-Fi (including Wi-Fi awareness and a Wi-Fi AP), Bluetooth (BT), and a wireless data transmission module (for example, at 433 MHz, 868 MHz, or 915 MHz). The wireless communication module 460 may be one or more components integrating at least one communication processing module. The wireless communication module 460 receives an electromagnetic wave through the antenna 1 or the antenna 2 (or the antenna 1 and the antenna 2), performs filtering and frequency modulation on an electromagnetic wave signal, and sends a processed signal to the processor 410. The wireless communication module 460 may further receive a to-be-sent signal from the processor 410, perform frequency modulation and amplification on the signal, convert, through the antenna 1 or the antenna 2, the signal into an electromagnetic wave, and radiate the electromagnetic wave.

The external memory interface 420 may be configured to connect to an external storage card, for example, a micro SD card, to expand a storage capability of the electronic device 2600. The external storage card communicates with the processor 410 through the external memory interface 420, to implement a data storage function, for example, store files such as music and a video in the external storage card.

The internal memory 430 may be configured to store one or more computer programs, where the one or more computer programs include instructions. The processor 410 may run the instructions stored in the internal memory 430, so that the electronic device 400 performs the methods provided in some embodiments of this disclosure, various applications, data processing, and the like. The internal memory 430 may include a code storage area and a data storage area. The code storage area may store an operating system. The data storage area may store data created in a use process of the electronic device 400, and the like. In addition, the internal memory 430 may include a high-speed random access memory, and may further include a non-volatile memory, for example, one or more magnetic disk storage components, a flash memory, or a universal flash storage (UFS). In some embodiments, the processor 410 may run the instructions stored in the internal memory 430 and/or instructions stored in a memory that is configured in the processor 410, to enable the electronic device 400 to perform the method provided in embodiments of this disclosure, other applications, and data processing.

The electronic device 400 includes but is not limited to a tablet computer, a desktop computer, a portable electronic device (for example, a laptop computer, Laptop), a smart television (for example, a smart screen), a vehicle-mounted computer, a smart speaker, an augmented reality (AR) device, a virtual reality (VR) device, another intelligent device having a display screen, or the like.

Figure 23:
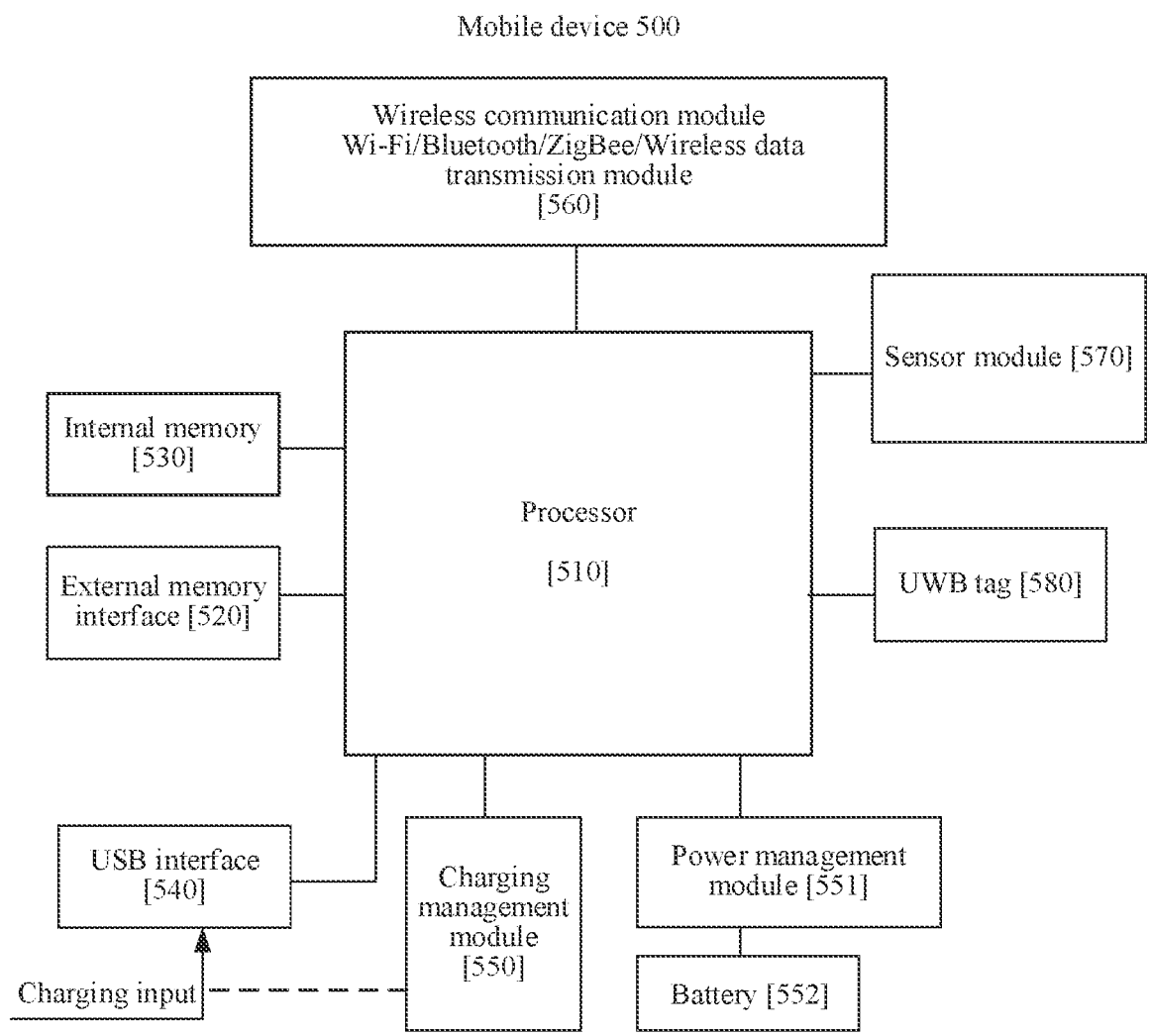
FIG. 23 is a schematic diagram of a structure of a mobile device according to an embodiment.

For example, FIG. 23 is a schematic diagram of a hardware structure of a mobile device 500. As shown in FIG. 23, the mobile device 500 may include a processor 510, an external memory interface 520, an internal memory 530, a USB interface 540, a charging management module 550, a power management module 551, a battery 552, a wireless communication module 560, a sensor module 570, a UWB tag 580, and the like. The sensor module 570 may include a direction sensor.

It may be understood that the structure illustrated in this embodiment of this disclosure does not constitute a specific limitation on the mobile device 500. In some other embodiments of this disclosure, the mobile device 500 may include more or fewer components than those shown in the figure, some components may be combined, some components may be split, or there may be a different component layout. The components shown in the figure may be implemented by hardware, software, or a combination of software and hardware.

It may be understood that an interface connection relationship between the modules that is illustrated in this embodiment of this disclosure is merely an example for description, and constitutes no limitation on the structure of the mobile device 500. In some other embodiments of this disclosure, the mobile device 500 may alternatively use an interface connection manner different from that in the foregoing embodiment, or use a combination of a plurality of interface connection manners.

The mobile device provided in this embodiment is configured to perform the foregoing method for controlling movement of a cursor on an electronic device, to achieve same effects as the foregoing implementation method. When an integrated unit is used, the mobile device may include a processing module, a storage module, and a communication module. The processing module may be configured to control and manage an action of the mobile device. For example, the processing module may be configured to support the mobile device in performing a step performed by the processing module. The storage module may be configured to support storage of program code, data, and the like. The communication module may be used for communication between the mobile device and another device (for example, an electronic device).

For example, the mobile device may be an air mouse, a smart remote control, or a smartphone.

An embodiment of this disclosure further provides a system for controlling movement of a cursor on an electronic device. The system includes the electronic device and the mobile device in the foregoing method embodiments.

An embodiment of this disclosure further provides a computer-readable storage medium, configured to store computer program code. The computer program includes instructions for performing the method for controlling movement of a cursor on an electronic device in the foregoing method embodiments. The readable medium may be a read-only memory (ROM) or a random access memory (RAM). This is not limited in embodiments of this disclosure.

This disclosure further provides a computer program product. The computer program product includes instructions; and when the instructions are executed, an electronic device and a mobile device are enabled to perform corresponding operations in the foregoing methods.

An embodiment of this disclosure further provides a chip located in a communication apparatus. The chip includes a processing unit and a communication unit. The processing unit may be, for example, a processor, and the communication unit may be, for example, an input/output interface, a pin, or a circuit. The processing unit may execute computer instructions, so that the communication apparatus performs the method for controlling movement of a cursor on an electronic device in the foregoing embodiments of this disclosure.

Optionally, the computer instructions are stored in a storage unit.

Optionally, the storage unit is a storage unit in the chip, for example, a register or a cache; or the storage unit may be a storage unit in the communication apparatus but outside the chip, for example, a read-only memory (ROM), another type of static storage device capable of storing static information and instructions, or a random access memory (RAM). Any processor above may be a CPU, a microprocessor, an ASIC, or one or more integrated circuits configured to control program execution of the foregoing method for controlling movement of a cursor on an electronic device. The processing unit and the storage unit may be decoupled, separately disposed on different physical devices, and connected in a wired or wireless manner to implement functions of the processing unit and the storage unit, to support the system chip in implementing various functions in the foregoing embodiments. Alternatively, the processing unit and the storage unit may be coupled to a same device.

The electronic device, the mobile device, the computer storage medium, the computer program product, or the chip provided in embodiments are all configured to perform the corresponding methods provided above. Therefore, for beneficial effects that can be achieved by the electronic device, the mobile device, the computer storage medium, the computer program product, or the chip, refer to the beneficial effects in the corresponding methods provided above. Details are not described herein again.

Based on the descriptions of the foregoing implementations, a person skilled in the art may understand that, for convenience and brevity of description, division into the foregoing functional modules is merely used as an example for description. During actual application, the foregoing functions may be allocated, based on a requirement, to different functional modules for implementation, in other words, an internal structure of an apparatus is divided into different functional modules to implement all or a part of the functions described above.

It should be understood that the apparatus and method disclosed in the several embodiments provided in this disclosure may be implemented in other manners. The foregoing apparatus embodiments are merely examples. For example, the division into modules or units is merely logical function division. During actual implementation, there may be another division manner. For example, a plurality of units or components may be combined or integrated into another apparatus. In addition, some features may be ignored or not performed. In addition, the displayed or discussed mutual couplings or direct couplings or communication connections may be implemented by using some interfaces. The indirect couplings or communication connections between the apparatuses or units may be implemented in an electrical form, a mechanical form, or other forms.

The units described as separate components may or may not be physically separate. A component displayed as a unit may be one or more physical units. To be specific, the component may be located in one place, or may be distributed in multiple different places. Some or all of the units may be selected based on an actual requirement to achieve the objectives of the solutions.

In addition, the functional units in embodiments of this disclosure may be integrated into one processing unit or may exist alone physically; or a part of the units may be integrated into one unit, and the other part of the units exist alone physically. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, all or some of the technical solutions of embodiments of this disclosure may be implemented in a form of a software product. The software product is stored in a storage medium. The software product includes several instructions for instructing a device (which may be a single-chip microcomputer, a chip, or the like) or a processor to perform all or some of the steps of the methods in embodiments of this disclosure. The foregoing storage medium includes any medium that can store program code, such as a USB flash drive, a removable hard disk, a ROM, a RAM, a magnetic disk, or an optical disc.

It should be noted that all or a part (for example, a part or all of any feature) of the foregoing embodiments provided in this disclosure may be used in any manner or in combination with each other.

The foregoing content is merely specific implementations of this disclosure, but is not intended to limit the protection scope of this disclosure. Any variation or replacement readily figured out by a person skilled in the art within the technical scope disclosed shall fall within the protection scope of this disclosure. Therefore, the protection scope of this disclosure shall be subject to the protection scope of the claim.

What is claimed is:

1. An electronic device comprising:
   a display screen, wherein the display screen comprises:
      a first edge;
      a second edge parallel to the first edge, wherein the first edge and the second edge are parallel to a first direction;
      a third edge; and
      a fourth edge parallel to the third edge, wherein the third edge and the fourth edge are parallel to a second direction, and wherein the first direction is perpendicular to the second direction;
   at least two ultra-wide band (UWB) base stations, wherein the at least two UWB base stations are located at different positions at a front or a back of the display screen, and configured wherein all or part of a perpendicular projection from each of the at least two UWB base stations is located adjacent to at least one edge of the display screen;
   one or more computer programs; and
   one or more processors configured to execute the one or more computer programs to cause the electronic device to:
      display a cursor on the display screen, wherein the cursor is moveable on the display screen in response to movement of a mobile device;
      receive a cursor indication message from the mobile device, wherein the cursor indication message indicates a movement direction of the cursor on the display screen;
      control the cursor to move in the first direction or the second direction in response to the cursor indication message; and
      control the cursor to stop moving in the first direction when the cursor moves to the third edge or the fourth edge and an intersection point between a straight line in a direction to which the mobile device points and a plane on which the display screen is located is not between the third edge and the fourth edge.

2. The electronic device of claim 1, wherein the one or more processors are further configured to execute the one or more computer programs to cause the electronic device to control the cursor to move, with the mobile device, in the first direction when the mobile device moves from outside of the third edge or the fourth edge to inside of the third edge or the fourth edge and the intersection point between the straight line in the direction to which the mobile device points and the plane on which the display screen is located is between the third edge and the fourth edge.

3. The electronic device of claim 1, wherein the one or more processors are further configured to execute the one or more computer programs to cause the electronic device to control the cursor to stop movement in the second direction with the mobile device when the cursor moves to the first edge or the second edge and the intersection point between the straight line in the direction to which the mobile device points and the plane on which the display screen is located is not between the first edge and the second edge.

4. The electronic device of claim 1, wherein the one or more processors are further configured to execute the one or more computer programs to cause the electronic device to control the cursor to move in the second direction with the mobile device when the mobile device moves from outside of the first edge or the second edge to inside of the first edge or the second edge and the intersection point between the straight line in the direction to which the mobile device points and the plane on which the display screen is located is between the first edge and the second edge.

5. The electronic device of claim 1, wherein after receiving the cursor indication message, the one or more processors are further configured to execute the one or more computer programs to cause the electronic device to:
   send, respectively through the at least two UWB base stations, distance measurement messages to the mobile device;
   receive, respectively through the at least two UWB base stations, distance measurement response messages from the mobile device;
   determine, based on the distance measurement response messages, a distance between each of the at least two UWB base stations and the mobile device, a distance between each of the at least two UWB base stations, a first included angle, and a second included angle, wherein the first included angle is an included angle between a perpendicular from the mobile device to the plane on which the display screen is located and a connecting line between the mobile device and the third edge, and wherein the second included angle is an included angle between the perpendicular from the mobile device to the plane on which the display screen is located and a connecting line between the mobile device and the fourth edge;
   determine a tilt angle between the straight line in the direction to which the mobile device points and the perpendicular from the mobile device to the plane on which the display screen is located;
   determine, based on the tilt angle, a yaw angle and a roll angle, wherein the roll angle represents an angle that is in the first direction and that is between the straight line in the direction to which the mobile device points and the perpendicular from the mobile device to the plane on which the display screen is located, and wherein the yaw angle represents an angle that is in the second direction and that is between the straight line in the direction to which the mobile device points and the perpendicular from the mobile device to the plane on which the display screen is located; and
   control the cursor to no longer move in the first direction with the mobile device when the roll angle is greater than the first included angle.

6. The electronic device of claim 5, wherein the one or more processors are further configured to execute the one or more computer programs to cause the electronic device to control the cursor to move in the first direction with the mobile device when the roll angle is greater than the second included angle and less than the first included angle.

7. The electronic device of claim 5, wherein the one or more processors are further configured to execute the one or more computer programs to cause the electronic device to control the cursor to no longer move in the first direction with the mobile device when the roll angle is less than the second included angle.

8. The electronic device of claim 5, wherein the second included angle is a negative value, and wherein the first included angle is a positive value.

9. The electronic device of claim 5, wherein the one or more processors are further configured to execute the one or more computer programs to cause the electronic device to:
   determine, in response to the distance measurement response messages, a third included angle and a fourth included angle, wherein the third included angle is an included angle between the perpendicular from the mobile device to the plane on which the display screen is located and a connecting line between the mobile device and the first edge, and wherein the fourth included angle is an included angle between the perpendicular from the mobile device to the plane on which the display screen is located and a connecting line between the mobile device and the second edge; and
   control the cursor to no longer move in the second direction with the mobile device when the yaw angle is greater than the third included angle.

10. The electronic device of claim 9, wherein the one or more processors are further configured to execute the one or more computer programs to cause the electronic device to control the cursor to move in the second direction with the mobile device when the yaw angle is greater than the fourth included angle and less than the third included angle.

11. The electronic device of claim 9, wherein the one or more processors are further configured to execute the one or more computer programs to cause the electronic device to control the cursor to no longer move in the second direction with the mobile device when the yaw angle is less than the fourth included angle.

12. The electronic device of claim 9, wherein the fourth included angle is a negative value, and wherein the third included angle is a positive value.

13. The electronic device of claim 5, wherein determining an included angle comprises:
   receiving a current first direction measurement message from the mobile device; and
   determining the included angle based on the current first direction measurement message.

14. A method for controlling movement of a cursor on a display screen of an electronic device, wherein the display screen comprises a first edge, second edge, third edge and a fourth edge, and wherein the method comprises:
   displaying a cursor on the display screen, wherein the cursor is moveable on the display screen in response to movement of a mobile device;

receiving a cursor indication message from the mobile device indicating a movement direction of the cursor on the display screen;

controlling, in response to the cursor indication message, the cursor to move in a first direction or a second direction, wherein the first direction is perpendicular to the second direction; and controlling the cursor to stop moving in the first direction when the cursor moves to the third edge or the fourth edge and an intersection point between a straight line in a direction to which the mobile device points and a plane on which the display screen is located is not between the third edge and the fourth edge.

15. The method of claim 14, wherein the method further comprises controlling the cursor to move, with the mobile device, in the first direction when the mobile device moves from outside of the third edge or the fourth edge to inside of the third edge or the fourth edge and the intersection point between the straight line in the direction to which the mobile device points and the plane on which the display screen is located is between the third edge and the fourth edge.

16. The method of claim 15, wherein the method further comprises controlling the cursor to stop movement in the second direction when the cursor moves to the first edge or the second edge and the intersection point between the straight line in the direction to which the mobile device points and the plane on which the display screen is located is not between the first edge and the second edge.

17. The method of claim 16, wherein the method further comprises controlling the cursor to move in the second direction with the mobile device when the mobile device moves from outside of the first edge or the second edge to inside of the first edge or the second edge, and the intersection point between the straight line in the direction to which the mobile device points and the plane on which the display screen is located is between the first edge and the second edge.

18. The method of claim 14, wherein after receiving a cursor indication message from the mobile device, the method further comprises:

sending, by at least two ultra-wide band (UWB) base stations located at different positions at a front or a back of the display screen, and configured wherein all or part of a perpendicular projection from each of the at least two UWB base stations is located adjacent to at least one edge of the display screen, respective distance measurement messages to the mobile device;

receiving, by the at least two UWB base stations, distance measurement response messages from the mobile device;

determining, based on the distance measurement response messages, a distance between each of the at least two UWB base stations and the mobile device, a distance between each of the at least two UWB base stations, a first included angle, and a second included angle, wherein the first included angle is an included angle between a perpendicular from the mobile device to the plane on which the display screen is located and a connecting line between the mobile device and the third edge, and wherein the second included angle is an included angle between the perpendicular from the mobile device to the plane on which the display screen is located and a connecting line between the mobile device and the fourth edge;

determining a tilt angle between the straight line in the direction to which the mobile device points and the perpendicular from the mobile device to the plane on which the display screen is located;

determining, based on the tilt angle, a yaw angle and a roll angle, wherein the roll angle represents an included angle that is in the first direction and that is between the straight line in the direction to which the mobile device points and the perpendicular from the mobile device to the plane on which the display screen is located, and the yaw angle represents an included angle that is in the second direction and that is between the straight line in the direction to which the mobile device points and the perpendicular from the mobile device to the plane on which the display screen is located; and controlling the cursor to no longer move in the first direction with the mobile device after the roll angle is greater than the first included angle.

19. A method for controlling movement of a cursor on a display screen of an electronic device, wherein the method is applied to a control system, and wherein the method comprises:

sending, by a mobile device, a cursor indication message to the electronic device, wherein the cursor indication message indicates a movement direction of the cursor on the display screen;

receiving, by the electronic device, the cursor indication message;

sending, by the electronic device, respective distance measurement messages to the mobile device through at least two ultra-wide band (UWB) base stations adjacent to the display screen;

receiving, by the mobile device, the distance measurement messages;

sending, by the mobile device, respective distance measurement response messages to the at least two UWB base stations;

receiving, by the at least two UWB base stations, the distance measurement response messages;

determining, by the electronic device in response to the distance measurement response messages, a distance between each of the at least two UWB base stations and the mobile device, a distance between each of the at least two UWB base stations, a first included angle, and a second included angle, wherein the first included angle is an included angle between a perpendicular projection from the mobile device to a plane on which the display screen is located and a connecting line between the mobile device and a third edge of the display screen, and the second included angle is an included angle between the perpendicular projection from the mobile device to the plane on which the display screen is located and a connecting line between the mobile device and a fourth edge of the display screen;

determining, by the electronic device, a tilt angle, wherein the tilt angle is an included angle between a straight line in a direction to which the mobile device points and a perpendicular projection from the mobile device to a plane on which the display screen is located;

determining, by the electronic device, based on the tilt angle, a yaw angle and a roll angle, wherein the roll angle represents an included angle that is in the first direction and that is between the straight line in the direction to which the mobile device points and the perpendicular projection from the mobile device to the plane on which the display screen is located, and wherein the yaw angle represents an included angle that is in the second direction and that is between the straight line in the direction to which the mobile device points and the perpendicular projection from the mobile device to the plane on which the display screen is located; and stopping cursor movement in the first direction after the roll angle is greater than the first included angle.

20. A non-transitory computer-readable medium, storing thereon computer-executable instructions, when executed by one or more processors, cause an electronic device to:

display a cursor on a display screen, wherein the display screen comprises a first edge, second edge, third edge and a fourth edge, and wherein the cursor is moveable on the display screen in response to movement of a mobile device;

receive a cursor indication message from the mobile device indicating a movement direction of the cursor on the display screen;

control, in response to the cursor indication message, the cursor to move in a first direction on the display screen; and control the cursor to stop moving in the first direction when the cursor moves to the third edge or the fourth edge and an intersection point between a straight line in a direction to which the mobile device points and a plane on which the display screen is located is not between the third edge and the fourth edge.

* * * * *